US012018132B2

(12) United States Patent
Côté

(10) Patent No.: US 12,018,132 B2
(45) Date of Patent: Jun. 25, 2024

(54) PROCESSES FOR RECYCLING POLYSTYRENE WASTE AND/OR POLYSTYRENE COPOLYMER WASTE

(71) Applicant: POLYSTYVERT INC., Anjou (CA)

(72) Inventor: Roland Côté, St-Antoine-sur-Richelieu (CA)

(73) Assignee: POLYSTYVERT INC., Anjou (CA)

( * ) Notice: Subject to any disclaimer, the term of this patent is extended or adjusted under 35 U.S.C. 154(b) by 65 days.

(21) Appl. No.: 17/857,031

(22) Filed: Jul. 3, 2022

(65) Prior Publication Data

US 2022/0348734 A1 Nov. 3, 2022

Related U.S. Application Data

(63) Continuation of application No. 17/288,896, filed as application No. PCT/CA2019/051512 on Oct. 25, 2019, now Pat. No. 11,407,877.

(60) Provisional application No. 62/760,532, filed on Nov. 13, 2018, provisional application No. 62/751,037, filed on Oct. 26, 2018.

(51) Int. Cl.
*C08J 11/08* (2006.01)
*B29B 17/02* (2006.01)

(52) U.S. Cl.
CPC ............... *C08J 11/08* (2013.01); *B29B 17/02* (2013.01); *B29B 2017/0224* (2013.01); *B29B 2017/0231* (2013.01); *B29B 2017/0293* (2013.01); *C08J 2323/06* (2013.01); *C08J 2325/06* (2013.01); *C08J 2355/02* (2013.01)

(58) Field of Classification Search
CPC .... C08J 11/08; C08J 2323/06; C08J 2325/06; C08J 2355/02; B29B 17/02; B29B 2017/0224; B29B 2017/0231; B29B 2017/0293
USPC ...................................................... 521/44.5
See application file for complete search history.

(56) References Cited

U.S. PATENT DOCUMENTS

| | | |
|---|---|---|
| 3,836,486 A | 9/1974 | Hafner |
| 4,003,881 A | 1/1977 | Sidebotham et al. |
| 4,031,039 A * | 6/1977 | Mizumoto ............... B29B 17/02 |
| | | 521/46.5 |
| 4,067,826 A | 1/1978 | Emery |
| 4,071,479 A | 1/1978 | Broyde et al. |
| 4,360,486 A | 11/1982 | Dibiasi et al. |
| 5,232,954 A | 8/1993 | Peters |
| 5,269,948 A | 12/1993 | Kruthchen |
| 5,278,282 A | 1/1994 | Nauman et al. |
| 5,438,079 A | 8/1995 | Paris |
| 5,552,494 A | 9/1996 | Iwamoto et al. |
| 5,594,035 A | 1/1997 | Walsh |
| 5,596,045 A | 1/1997 | Scherzer et al. |
| 5,629,352 A | 5/1997 | Shiino et al. |
| 5,824,709 A | 10/1998 | Suka |
| 5,859,072 A | 1/1999 | Emori |
| 5,891,403 A | 4/1999 | Badger et al. |
| 5,994,417 A | 11/1999 | Roberts et al. |
| 6,034,142 A | 3/2000 | Varadarajan et al. |
| 6,090,862 A | 7/2000 | Tatsuda et al. |
| 6,169,121 B1 * | 1/2001 | Noguchi .................. C08J 11/08 |
| | | 422/186 |
| 6,326,408 B1 | 12/2001 | Jura |
| 6,403,661 B1 | 6/2002 | Usui et al. |
| 6,440,306 B1 | 8/2002 | Ditter et al. |
| 6,500,872 B1 | 12/2002 | Noguchi et al. |
| 6,548,561 B1 | 4/2003 | Müller et al. |
| 7,728,047 B2 * | 6/2010 | Notari ...................... C08J 11/08 |
| | | 528/495 |
| 7,745,503 B2 | 6/2010 | Notari et al. |
| 7,893,195 B2 | 2/2011 | Fassiau et al. |
| 8,071,656 B2 | 12/2011 | Waibel et al. |
| 8,138,232 B2 | 3/2012 | Maeurer et al. |
| 8,225,937 B2 * | 7/2012 | Schlummer ............... B03B 5/28 |
| | | 209/466 |
| 8,242,212 B2 | 8/2012 | Grossetete et al. |
| 8,314,207 B2 | 11/2012 | Friedlaender |
| 8,389,636 B2 | 3/2013 | Grossetete et al. |
| 8,546,455 B2 | 10/2013 | Poutch et al. |
| 8,609,778 B1 | 12/2013 | Frost et al. |
| 8,809,459 B2 | 8/2014 | Grossetete et al. |
| 8,912,296 B1 | 12/2014 | Bouquet et al. |
| 8,969,638 B2 | 3/2015 | Tippet et al. |
| 9,045,612 B2 | 6/2015 | Fluck et al. |

(Continued)

FOREIGN PATENT DOCUMENTS

| AU | 7989775 | 10/1976 |
|---|---|---|
| AU | 703220 | 3/1997 |

(Continued)

OTHER PUBLICATIONS

Abstract of D. S. Achilias et al., "Recycling of polymers from plastic packaging materials using the dissolution-reprecipitation technique", Polymer Bulletin, 63, 449-465 (May 13, 2009).
English Translation—Machine Translated of CN101367956A, "Method for recycling polystyrene foamed plastic with vegetable fat methyl ester production as volume reduction agent", published on Feb. 18, 2009.
Cowie et al., "Polymer-cosolvent systems: 5. Upper and lower critical solution temperatures of polystyrene in n-alkanes", Polymer, Nov. 1983, vol. 24, pp. 1445-1448.
English Translation—Machine Translated of JP2000248109A, "Method of Recycling Styrene-Based Synthetic Resin", published on Sep. 12, 2000.

(Continued)

*Primary Examiner* — Michael M. Bernshteyn
(74) *Attorney, Agent, or Firm* — Bereskin & Parr LLP/S.E.N.C.R.L., s.r.l.

(57) ABSTRACT

There are provided processes for recycling waste such as polystyrene thermoplastic polymer waste and/or polystyrene thermoplastic copolymer waste as well as recycled polystyrene thermoplastic polymer and/or recycled thermoplastic copolymer that may, for example, be obtained from such processes. The processes can comprise the use of a reducing agent.

25 Claims, 3 Drawing Sheets

(56) References Cited

U.S. PATENT DOCUMENTS

| | | | |
|---|---|---|---|
| 9,650,313 B2 | 5/2017 | Tippet et al. | |
| 9,664,175 B2 | 5/2017 | Vander Lind et al. | |
| 9,695,259 B2* | 7/2017 | Layman | C08G 77/34 |
| 9,890,225 B2 | 2/2018 | Layman et al. | |
| 9,896,556 B2 | 2/2018 | Gila et al. | |
| 10,882,940 B2 | 1/2021 | Moyses et al. | |
| 10,961,367 B2 | 3/2021 | Côté | |
| 11,407,878 B2 | 8/2022 | Côté | |
| 2002/0062054 A1 | 5/2002 | Cistone et al. | |
| 2004/0229965 A1 | 11/2004 | Maurer et al. | |
| 2005/0056813 A1 | 3/2005 | Hamano | |
| 2006/0241193 A1 | 10/2006 | Notari et al. | |
| 2007/0112081 A1 | 5/2007 | Hahn et al. | |
| 2007/0249741 A1 | 10/2007 | Yuan | |
| 2007/0265361 A1 | 11/2007 | Maurer et al. | |
| 2008/0221228 A1* | 9/2008 | Notari | C08J 11/08 521/47 |
| 2008/0281002 A1 | 11/2008 | Maeurer et al. | |
| 2009/0130383 A1* | 5/2009 | Harelle | C08L 25/08 428/206 |
| 2010/0222532 A1 | 9/2010 | Shuler et al. | |
| 2011/0021647 A1 | 1/2011 | Poutch et al. | |
| 2013/0005912 A1 | 1/2013 | Wang et al. | |
| 2017/0022346 A1 | 1/2017 | Weeden, Jr. | |
| 2017/0298207 A1* | 10/2017 | Côté | C08F 112/08 |
| 2017/0299207 A1* | 10/2017 | Trevelyan | F24F 1/035 |
| 2018/0022888 A1 | 1/2018 | Li et al. | |
| 2020/0165407 A1 | 5/2020 | Côté | |
| 2020/0317884 A1 | 10/2020 | Côté | |
| 2021/0380777 A1 | 12/2021 | Côté | |
| 2022/0315749 A1 | 10/2022 | Deleye et al. | |
| 2023/0002583 A1 | 1/2023 | Côté | |

FOREIGN PATENT DOCUMENTS

| | | |
|---|---|---|
| CA | 2297807 | 2/1999 |
| CA | 2274397 | 12/1999 |
| CA | 2615848 | 1/2007 |
| CA | 2959082 | 4/2016 |
| CN | 1143653 | 2/1997 |
| CN | 101307150 | 11/2008 |
| CN | 101367956 | 2/2009 |
| CN | 107641216 | 1/2018 |
| CN | 111257270 A | 6/2020 |
| DE | 4343784 | 7/1994 |
| DE | 19735827 | 2/1999 |
| DE | 10 2005 026451 A1 | 12/2006 |
| EP | 0430496 | 6/1991 |
| EP | 0491836 | 7/1992 |
| EP | 0894818 A1 | 2/1999 |
| EP | 0949293 A2 | 10/1999 |
| EP | 1462474 | 9/2004 |
| EP | 1616903 | 1/2006 |
| EP | 2865708 | 4/2015 |
| EP | 2553017 | 6/2016 |
| EP | 2276801 | 3/2017 |
| EP | 3575353 A1 | 4/2019 |
| EP | 2513212 | 4/2021 |
| EP | 3853297 | 7/2021 |
| GB | 856577 | 12/1960 |
| JP | 093239 A | 1/1997 |
| JP | H10195232 | 7/1998 |
| JP | H10338768 A | 12/1998 |
| JP | H1180418 | 3/1999 |
| JP | 2000248109 | 9/2000 |
| JP | 2001172423 | 6/2001 |
| JP | 2002-264129 A | 9/2002 |
| JP | 2004051620 | 2/2004 |
| JP | 2005154525 A | 6/2005 |
| KR | 20220170372 A | 12/2022 |
| WO | 9424194 | 10/1994 |
| WO | 9500582 | 1/1995 |
| WO | 2003087215 A1 | 1/1995 |
| WO | 200214413 A1 | 2/2002 |
| WO | 0248246 | 6/2002 |
| WO | 03035729 | 5/2003 |
| WO | 2007003691 | 1/2007 |
| WO | 2007009559 | 1/2007 |
| WO | 2010098900 A1 | 9/2010 |
| WO | 2011123597 | 10/2011 |
| WO | 2015199561 | 12/2015 |
| WO | 2016049782 | 4/2016 |
| WO | 2017064292 | 4/2017 |
| WO | 2022144158 A1 | 7/2022 |
| WO | 2023012695 A1 | 2/2023 |

OTHER PUBLICATIONS

English Translation—Machine Translated of JP2001172423A, "Method and Apparatus for Recovering Polystyrene", published on Jun. 26, 2001.

English Translation—Machine Translated of JPH1180418A, "Volume Reduction Method and Recycling Method for Foamed polystyrene", published on Mar. 26, 1999.

English Translation—Machine Translated of JPH10195232A, "Continuous Production for Carrying Out Recycling of Expanded Polystyrene by Precipitation", published on Jul. 28, 1998.

English Translation—Machine Translated of JPH10338768A, "Production for Carrying Out Recycling of Expanded Polystyrene with Dissolution and Precipitation using Simple Substance Solvent", published on Dec. 22, 1998.

Lau et al., "Precipitation studies of polystyrene from solution", Makromol. Chem. 185, 1219-1228 (Jun. 1984).

Tan et al., "Precipitation of Polystyrene from Toluene with HFC-134a by the GAS Process", Ind. Eng. Chem. Res. (Apr. 9, 1998), 37, 1821-1826.

CreaSolv, "Closing the PS Loop: Our contribution to the concept of Circular Economy", CreaSolv process plus a bromine recovery for removal of HBCDD and destruction into bromine to be used in a new sustainable polymeric FR (2018).

English Abstract—Machine Generated of RO88225B, "Process for Purifying Sewage Resulting From Polystyren Fabrication", published on Dec. 31, 1985.

English Abstract of WO2006098287(A1), "Method and apparatus for recovering (rubber-reinforced) styrene resin composition", published on Sep. 21, 2006.

English Translation—Machine Generated of DE19735827A1, "Polymerization of Styrene in Presence of Ethyl Benzene and Contaminants", published on Feb. 25, 1999.

English Translation—Machine Translation of CN101307150(A), "Novel method for recovering waste and old polystyrol", published on Nov. 19, 2008.

English Translation—Machine Translation of CN107641216(A), "Recycling method of expanded polystyrene waste", published on Jan. 30, 2018.

English Translation—Machine Translation of EP3016998A1, "Method for increasing the concentration of at least one polymer from a polymer-containing waste material, and polymer recyclate", published on May 11, 2016.

English Translation—Machine Translation of WO03035729A2, "Recycling of waste expanded polystyrene foams to give products which may be re-expanded", published on May 1, 2003.

Fe et al., "Destruction of the flame retardant hexabromocyclododecane in a full-scale municipal solid waste incinerator", Waste Manag Res., Feb. 2015; 33(2): 165-74.

Feng et al., "Synthesis and Surface Properties of Polystyrene-graft-poly(ethylene glycol) Copolymers", Journal of Applied Polymer Science, vol. 103, 1458-1465 (2007). The year of publication is sufficiently earlier than the effective U.S. filing date so that the particular month of publication is not an issue).

Garcia et al., "Study of the solubility and stability of polystyrene wastes in a dissolution recycling process", Waste Management 29 (Feb. 2009) 1814-1818.

Gonzalez et al., "Waste expanded polystyrene recycling by cymene using liquid or super critical CO2 for solvent recovery", published on Apr. 23, 2018.

(56) References Cited

OTHER PUBLICATIONS

Gutierrez et al., "Determination of the high-pressure phase equilibria of Polystyrene/p-Cymene in presence of CO2", J. of Supercritical fluids 92 (Jun. 2014) 288-298.
Hadi et al., "Reconditioning process of waste low density polyethylene using new technique", Journal of Purity, Utility Reaction and Environment, vol. 1, No. 8, Oct. 2012, pp. 400-410.
Kampouris et al., "Solvent Recycling of Rigid Poly(Vinyl Chloride) Bottles", Journal of Vinyl Technology, Jun. 1986, vol. 8, No. 2.
Notice of Opposition dated Jun. 3, 2020, European Patent 3 201 246 (Application No. 15 845.1), Proprietor: Polystyvert Inc., Opponent: Kraus & Weisert.
Technical Data Sheet of STYRON 678E, retrieved from the internet on Jan. 31, 2022.
English Translation—Machine Translated of CN1143653A, "Method for recovering waste polystyrene plastics", published on Feb. 26, 1997.
English Translation—Machine Translated of DE4343784A1, "Polyamid-Rückgewinnung", published on Jul. 14, 1994.
English Translation—Machine Translated of JP2004051620A, "Method for Recovering Useful Product from Waste Plastic", published on Feb. 19, 2004.
English Translation—Machine Translated of WO9500582A1, "Processes for Recycling Waste Polystyrene Foam", published on Jan. 5, 1995.
Mark et al., "Destruction of the flame retardant hexabromocyclododecane in a full-scale municipal solid waste incinerator", Waste Management & Research 2015, vol. 33(2) 165-174, Feb. 3, 2015.
Schlummer et al., "Recycling of Flame Retarded Waste Polystyrene Foams (EPS and XPS) to PS Granules Free of Hexabromocyclododecane (HBCDD)", Adv Recycling Waste Manag 2017, 2:2., May 15, 2017.
Anderson et al., "Chemical Recycling of Mixed Plastics in Electronic Waste Using Solvent-Based Processing", Processes, Jan. 10, 2022, 66.
Cigna et al., "Dynamic Mechanical Properties, Structure, and Composition of Impact Polystyrene", Journal of Applied Polymer Science, vol. 14, pp. 1781-1793 (1970). (The year or publication is sufficiently earlier than the effective U.S. filing date so that the particular month of publication is not an issue).
Gesner et al., "Phase Separation of Some Acrylonitrile-Butadiene-Styrene Resins", Journal of Polymer Science: Part A, vol. 3, pp. 3825-3831 (1965). (The year or publication is sufficiently earlier than the effective U.S. filing date so that the particular month of publication is not an issue).
Leal et al., "Evolution of the morphology of HIPS particles", Polymer 50 (2009) 68-76. (The year or publication is sufficiently earlier than the effective U.S. filing date so that the particular month of publication is not an issue).
Schlummer et al., "Report: Recycling of flame-retarded plastics from waste electric and electronic equipment (WEEE)", Waste Manage Res Jan. 2006: 24: 573-583. (The year or publication is sufficiently earlier than the effective U.S. filing date so that the particular month of publication is not an issue).
Strobl et al., "Recycling Potential for Non-Valorized Plastic Fractions from Electrical and Electronic Waste", Recycling Apr. 6, 2021, 33.
Turner et al., "Determination of Ungrafted Rubber in ABS Polymers", J. of Elastomers and Plastics, vol. 6 (Apr. 1974), p. 94.
English Translation—Machine Generated of JP2005154525A, "Method and Apparatus for Treating Polystyrene-Based Resin Composition", published on Jun. 16, 2005.
CreaCycle GmbH, "CreaSolv Closing the PS Loop: Our contribution to the concept of Circular Economy". Retrieved from the Internet <URL: http://www.creacycle.de/en/projects/recycling-of-expanded-poly-styrene-eps/polystyrene-loop-2016.html>, May 25, 2016.
Meuwissen et al. "CreaSolv closing the PS Loop Contribution to the concept of Circular Economy", Nairobi, UNEP Basel OEWG side event, May 30, 2016.
CreaCycle GmbH, "PolyStyrene-Loop (2016)—CreaSolv Pilot Plant", [online], [retrieved on Mar. 30, 2017]. Retrieved from the Internet <URL:http://www.creacycle.de/en/projects/recycling-of-expanded-poly-styrene-eps/polystyrene-loop-2016.html>, Jan. 1, 2016.
English Abstract and claims of EP1438351A2, "Recycling of waste expanded polystyrene foams to give products which may be re-expanded", published on Jan. 21, 2004.
English Abstract of JP2009120682(A), "Natural solvent for reducing volume of foamed polystyrene, and method for volume-reducing treatment of foamed polystyrene using the same", published on Jun. 4, 2009.
Hattori et al., "Dissolution of polystyrene into p-cymene and related substances in tree leaf oils", Journal of wood science, 56(2): 169-171, Oct. 2010.
Schlummer et al., "Recycling of flame retarded waste polystyrene foams (EPS and XPS) to PS granules free of hexabromocyclododecane (HBCDD)",Fraunhofer IVV, Recycling Plastics, Germany.Based on http://www.creacycle.de/en/projects/recycling-of-expanded-poly-styrene-eps/polystyrene-loop-2016.html, no date is provided for publication. However, Schlummer et al cites as reference #14 Mark et al. "Destruction of the flame retardant hexabromocyclododecane in a full-scale municipal solid waste incinerator", Waste Man Res. Feb. 2015;33(2):165-74.
Samper et al., "Recycling of Expanded Polystyrene from Packaging", Progress in Rubber, Plastics and Recycling Technology, vol. 26, No. 2, 2010. (The year of publication is sufficiently earlier than the effective U.S. filing date so that the particular month of publication is not in issue).
CreaCycle GmbH, "The CreaSolv Process", [online], [retrieved on Mar. 30, 2017]. Retrieved from the Internet <URL: http://www.creacycle.de/en/the-process.html>, Mar. 30, 2017.
English Abstract of DE10207336(A1), "Densification and purification of foamed polystyrene waste for recycling, by dissolution in specific solvent, e.g. alkylene glycol dialkyl ether, and precipitation, preferably with alcohol", published on May 15, 2003.
English Abstract of DE10207333(A1), "Re-expandable polystyrene production involves dissolving expanded polystyrene waste in polar solvent and precipitation with less polar precipitant also acting as blowing agent", published on May 15, 2003.
Abstract of Garcia et al., "Recycling extruded polystyrene by dissolution with suitable solvents", Journal of Material Cycles and Waste Management, Jan. 2009, vol. 11, Issue 1, pp. 2-5.
Kampouris et al., "A model recovery process for scrap polystyrene foam by means of solvent systems", Conservation & Recycling, vol. 10, No. 4, pp. 315-319, 1987. (The year of publication is sufficiently earlier than the effective U.S. filing date so that the particular month of publication is not an issue).
English Abstract of CN1063883(A), "Method for preparation of coating from recovered foam polystyrene", published on Aug. 26, 1992.
English Abstract of CN1080645(A), "Waste polystyrene recovery and utilization device and process", published on Jan. 12, 1994.
English Abstract of CN1103874(A), "Recovering waste foam polystyrene by gel foam remolding method and regenerating foamable polystyrene", published on Jun. 21, 1995.
English Abstract of CN1749297(A), "Method for recovering waste polystyrene foam plastic", published on Mar. 22, 2006.
English Abstract of CN86100803(A), "Method for recovering waste polystyrene", published on Sep. 23, 1987.
English Abstract of CN101928405(A), "Method for reproducing PS (Polystyrene) raw material by recovering and separating high-polymer film composite waste plastics", published on Dec. 29, 2010.
English Abstract of CN102675684(A), "Method for extracting polycarbonate from polycarbonate blending modification material", published on Sep. 19, 2012.
English Abstract of CN103224646(A), "Novel technological method for recovering waste polystyrene foam plastics", published on Jul. 31, 2013.

(56) References Cited

OTHER PUBLICATIONS

English Abstract of CN107443614(A), "Method of improving transparency of regenerated plastics", published on Dec. 8, 2017.
English Abstract of DE2434925(A1), "Polyvinyl chloride recovery from plastic waste—by dissolving in solvent pptg. with non-solvent, sep. solid and recovering plasticiser", published on Feb. 12, 1976.
English Abstract of Poulakis et al., "Dissolution/reprecipitation: A model process for PET bottle recycling", Journal of Applied Polymer Science 81(1):91-95, Jul. 2001.
English Abstract of DE19751442(A1), "Recovery of polystyrene from waste material", published on May 27, 1999.
English Abstract of EP0894818(A1), "Process for recycling soluble polymers or polymer blends from plastic containing materials", published on Feb. 3, 1999.
English Abstract of JP2005179466(A), "Recycling apparatus for foamed polystyrene", published on Jul. 7, 2005.
English Abstract of TW200502282(A), "Method of recycling solid waste polystyrene packing materials", published on Jan. 16, 2005.
English Abstract of Poulakis et al., "The dissolution/reprecipitation technique applied on high-density polyethylene: I. Model recycling experiments", Advanced in Polymer Technology, First published: Autumn (Fall) 1995. (The year of publication is sufficiently earlier than the effective U.S. filing date so that the particular month of publication is not an issue).
English Abstract of Poulakis et al., "Recycling of polypropylene by the dissolution/reprecipitation technique: I. A model study", Resources Conservation and Recycling 20(1):31-41, Jun. 1997.
Schlummer et al., "Characterisation of polymer fractions from waste electrical and electronic equipment (WEEE) and implications for waste management", Chemosphere 67 (2007) 1866-1876, Jan. 17, 2007.
"Toxicological Risks of Selected Flame-Retardant Chemicals", Subcommittee on Flame-Retardant Chemicals; Committee on Toxicology; Board on Environmental Studies and Toxicology; Commission on Life Sciences; National Research Council (2000). (The year or publication is sufficiently earlier than the effective U.S. filing date so that the particular month of publication is not an issue).
English Translation—Machine Generated of KR20220170372A, "Waste Plastic Recycling Process", published on Dec. 29, 2022.
Arends, Dahmar et al. Removal of inorganic colour pigments from acrylonitrile butadiene styrene by dissolution- based recycling. J Master Cycles Waste Manag (2012) 14:85-93.
Rovere, Juliana et al. Role of the rubber particle and polybutadiene cis content on the toughness of high impact polystyrene. J Mater Sci (2008) 43:952-959.
Arostegui et al. Effect of Dissolution-Based Recycling on the Degradation and the Mechanical Properties of Acrylonitrileebutadieneestyrene Copolymer. Polymer Degradation and Stability 91 (2006) 2768-2774.
English Translation—Machine Translation of JP2002-264129. Published on Sep. 18, 2002.
English Translation—Machine Translation of CN111257270. Published on Jun. 9, 2020.
English Translation—Machine Translation of JP 093239. Published on Jan. 7, 1997.
Schlummer et al. Recycling of Styrene Polymers from Shredded Screen Housings Containing Brominated Flame Retardants. Journal of Applied Polymer Science, vol. 102, 1262-1273 (2006).
Grause et al. A novel process for the removal of bromine from styrene polymers containing brominated flame retardant. Polymer Degradation and Stability 112 (2015) 86-93.

* cited by examiner

PROCESSES FOR RECYCLING POLYSTYRENE WASTE AND/OR POLYSTYRENE COPOLYMER WASTE

CROSS-REFERENCE TO RELATED APPLICATIONS

The present application is a continuation of U.S. application Ser. No. 17/288,896 filed on Apr. 26, 2021, that is a 35 USC 371 national stage entry of PCT/CA2019/051512 filed on Oct. 25, 2019, and which claims priority to U.S. application No. 62/751,037 filed on Oct. 26, 2018 and to U.S. application No. 62/760,532 filed on Nov. 13, 2018. These documents are hereby incorporated by reference in their entirety.

FIELD OF THE DISCLOSURE

The present disclosure relates to a process for recycling post-industrial or post-consumer thermoplastic waste, such as polyethylene waste, polypropylene waste, polyvinyl chloride waste, acrylonitrile butadiene styrene copolymer waste, acrylonitrile-styrene copolymer waste and polystyrene waste. In an aspect, the present disclosure relates to a process for recycling polystyrene waste such as general-purpose polystyrene (GPPS) waste, expanded polystyrene (EPS) waste or polystyrene copolymer waste such as high impact polystyrene (HIPS) waste. The present disclosure also relates to recycled thermoplastic polymer and/or recycled thermoplastic copolymer obtained from such processes, for example, the present disclosure relates to recycled polystyrene polymer or copolymer obtained from a process for recycling polystyrene waste.

INTRODUCTION

Polystyrene (PS) is used extensively in the fabrication of commercial objects. The worldwide production of PS was about 17.5 million tons in 2014. This includes both general-purpose polystyrene (GPPS, slightly more than 50% of all PS produced) and high impact polystyrene (HIPS). HIPS refers to a class of elastomer-reinforced styrene polymers and typically is a copolymer of styrene and polybutadiene (PBU) where PBU may be present, for example, in a proportion of 2 to 10% and is added, for example, to improve impact resistance.

PS objects (with no added PBU), can be divided into two large families. The first is objects made of GPPS, which account for about 70% of PS and have a material density close to the 1.05 g/cc of pure polystyrene. The second is objects made from expanded polystyrene (EPS) or extruded polystyrene (XPS) that have a much lower material density; that is, close to 0.015 for EPS and 0.5 to 0.7 g/cc for XPS. Examples of commercial objects that include GPPS are cabinet materials or electric appliances. Examples of commercial objects made with EPS are insulation boards and packaging materials.

Most commercial polymeric objects are not wholly made just of a polymer or copolymer. For example, they may also contain chemicals added to modify properties such as but not limited to color and/or flammability, to assist in processing, and/or may even introduce new properties. For example, polystyrene objects often contain gas, flame retardants, coloring agents and/or oils.

Used thermoplastic such as PS may be disposed of by sending it to landfills. However, this may cause pollution problems because most of the thermoplastics, such as PS, are not biodegradable. It may also be disposed of by incineration. However, incineration is carried out at high temperature to avoid the production of toxic chemicals and therefore uses significant energy. Alternatively, used thermoplastics, such as PS, may be disposed of by using a recycling process.

Methods for PS recycling have involved mechanical, chemical and/or dissolution techniques. The mechanical recycling process involves first, a shredding step for volume reduction purposes, and then PS flakes are melted in an extruder and transformed into crude PS pellets upon cooling. However, this crude PS is contaminated and could be used only for the fabrication of low-quality objects. The chemical recycling process involves a thermal depolymerisation of PS with the production of styrene monomer. However, during PS pyrolysis other monocyclic aromatic compounds are formed rendering styrene purification difficult and leading to PS with lower mechanical properties.

Post-industrial waste is mainly trimming or deformed plastic object formed during production startup or malfunction. When post-industrial waste is composed of only one polymer, the unconform material is directly mixed with new polymers and injected in the production process. When post-industrial waste is composed of two or more different materials, for instance, a plastic pot with a label, a separation process has to be applied in order to recycle the polymer component.

PS post-consumer wastes are more difficult to recycle than post-industrial waste since the level of contamination is higher. Typically, post-consumer PS wastes are contaminated with other components such as but not limited to paper, metal, water, food residues, molds, dirt and/or other polymers such as but not limited to HIPS, low-density polyethylene (LDPE), polypropylene (PP) and/or polyethylene terephthalate (PET).

Polystyrene is not biodegradable and from the viewpoint of environmental maintenance, there is, therefore, a need, to develop an efficient recycling process. In order to make the recycling process profitable, it is desirable, for example, that the recycled PS be of highest purity, colorless, free of any foreign solid or polymer and of any significant contamination or additives.

The same applies to other thermoplastics such as polyethylene waste, polypropylene waste, polyvinyl chloride waste, acrylonitrile butadiene styrene copolymer waste and acrylonitrile-styrene copolymer waste. There is a need for a recycling process that allows obtaining recycled material with high purity.

SUMMARY

In an aspect, the present disclosure includes a process for recycling thermoplastic waste including the purification of said thermoplastic waste. In another aspect, the present disclosure includes a process for recycling post-industrial or post-consumer thermoplastic waste, such as polyethylene waste, polypropylene waste, polyvinyl chloride waste, acrylonitrile butadiene styrene copolymer waste, acrylonitrile-styrene copolymer waste and polystyrene waste. In another aspect, the present disclosure includes a recycled thermoplastic material, for example a recycled polyethylene material, a recycled polypropylene material, a recycled polyvinyl chloride material, a recycled acrylonitrile butadiene styrene copolymer material, a recycled acrylonitrile-styrene copolymer material or a recycled polystyrene material with desirable purity.

Therefore, according to an aspect of the present disclosure, there is provided with a process for recycling waste that is thermoplastic polymer waste and/or thermoplastic copolymer waste, the process comprising:

- dissolving the thermoplastic polymer waste and/or thermoplastic copolymer waste in a suitable solvent to obtain a mixture of liquid and solids;
- heating the mixture under acidic conditions then cooling the mixture to obtain a supernatant comprising thermoplastic polymer in solution and/or thermoplastic copolymer in solution and a solid waste residue; in some embodiments, heating said mixture under acidic conditions is made in the presence of a reducing agent;
- separating the supernatant comprising dissolved thermoplastic polymer and/or dissolved thermoplastic copolymer from the solid waste residue;
- optionally treating the supernatant with a filtration aid to remove insoluble gels;
- contacting the supernatant comprising dissolved thermoplastic polymer and/or dissolved thermoplastic copolymer with a first portion of non-solvent to obtain precipitated thermoplastic polymer and/or precipitated thermoplastic copolymer and a first portion of waste solution;
- separating the precipitated thermoplastic polymer and/or precipitated thermoplastic copolymer from the first portion of waste solution;
- washing the precipitated thermoplastic polymer and/or precipitated thermoplastic copolymer with a second portion of non-solvent to obtain a washed thermoplastic polymer and/or washed thermoplastic copolymer and a second portion of waste solution;
- separating the washed thermoplastic polymer and/or washed thermoplastic copolymer from the second portion of waste solution;
- optionally washing the washed thermoplastic polymer and/or washed thermoplastic copolymer with a third portion of non-solvent to obtain a twice-washed thermoplastic polymer and/or twice-washed thermoplastic copolymer and a third portion of waste solution;
- optionally separating the twice-washed thermoplastic polymer and/or twice-washed thermoplastic copolymer from the third portion of waste solution; and
- optionally drying the washed or twice-washed thermoplastic polymer and/or washed or twice-washed thermoplastic copolymer to obtain dried thermoplastic polymer and/or dried thermoplastic copolymer.

In another aspect, the present disclosure provides a process with a precipitation step that can be a flocculation step. The precipitation or flocculation step allows for the removal of the impurities or insoluble particles dispersed in thermoplastic polymer and/or thermoplastic copolymer having a size of less than 1 micrometer. From the removal of the impurities having a size of less than 1 micrometer, the purity of the recycled thermoplastic polymer and/or recycled thermoplastic copolymer obtained from the process according to the present disclosure can be improved.

For example, the process of the present disclosure can remove molds from decomposition of food residues and which usually have a size of less than one micrometers. For the polystyrene copolymer waste, for example, the presence of molds is one of the reasons why the recycled materials may have a grey color and are still contaminated. In one embodiment, the process of the present disclosure can produce a white recycled polystyrene copolymer wherein the molds have been removed, therefore lowering the degree of contamination.

The improved purity of recycled thermoplastic polymer and/or recycled thermoplastic copolymer allows incorporating more recycled material in mixtures comprising the recycled material and virgin material.

The one or more following embodiments can be used to describe the present disclosure in more detail, the embodiments can be taken alone or in any combination:

In some embodiments, the process of the present disclosure is a process for recycling postindustrial or post-consumer thermoplastic polymer waste that is thermoplastic polymer waste and/or thermoplastic copolymer waste obtained from industrial or domestic polymer waste.

In some embodiments, the thermoplastic is selected from polyethylene (PE), polypropylene (PP), polyvinyl chloride (PVC), acrylonitrile butadiene styrene copolymer (ABS), acrylonitrile-styrene copolymer (SAN), polystyrene (PS) and blends of polyethylene (PE) and polypropylene (PP).

In some embodiments, the step of washing the precipitated thermoplastic polymer and/or precipitated thermoplastic copolymer with a second portion of non-solvent to obtain washed thermoplastic polymer and/or washed thermoplastic copolymer and a second portion of waste solution, is selected from batch washing and continuous washing; in some embodiments said step is a continuous washing.

In some embodiments, prior to cooling the mixture to obtain a supernatant comprising thermoplastic polymer in solution and/or thermoplastic copolymer in solution and the solid waste residue, the process further comprises adding a base and heating the mixture under neutral conditions. In some embodiments, the base is calcium hydroxide.

In some embodiments, the step of heating the mixture under acidic conditions is performed in the presence of a reducing agent, adding a base and heating the mixture under neutral conditions.

In some embodiments, the mixture comprises insoluble material having a particle size of 10 micrometers or greater and said process further comprises filtering said mixture to remove said insoluble material prior to heating said mixture under acidic conditions; for example, a particle size of 5 micrometers or greater; in some embodiments, a particle size of 1 micrometer or greater.

In some embodiments, the mixture comprises insoluble material having a particle size of 1 micrometer or greater and said process further comprises filtering said mixture to remove said insoluble material prior to heating said mixture under acidic conditions.

In some embodiments, the mixture comprises said thermoplastic polymer and/or thermoplastic copolymer in an amount of from 20 wt. % to 40 wt. %, based on the total weight of said mixture; for example of from 20 wt. % to 30 wt. %.

In some embodiments, the acidic conditions:
  comprise a pH ranging from about 2 to about 5; and/or
  are obtained by adding a mineral acid, an organic acid or combinations thereof to the mixture; for example, by adding one or more acid selected from HCl, $H_2SO_4$, acetic acid, formic acid and oxalic acid; for example by adding formic acid.

In some embodiments, the mixture is heated at a temperature of from 60° C. to 160° C.; for example, from 60 to 100° C. or from 110 to 160° C.

In another embodiment, the mixture is heated for a time of 1 hour to 4 hours.

In some embodiments, the heating of the mixture under acidic conditions being performed in the presence of a reducing agent, the process being remarkable in that the reducing agent is zinc metal, aluminium metal, calcium metal or magnesium metal; in some embodiments, the reducing agent is zinc metal.

In some embodiments, the cooling comprises allowing said mixture to return to ambient temperature and settle for a time to obtain said supernatant and said solid waste residue; in some embodiments, said time is from about 2 hours to about 24 hours.

In some embodiments, the supernatant is separated from the solid waste residue by centrifugation, or by decantation, or by filtration. For example, the supernatant is separated from the solid waste residue by centrifugation.

In some embodiments, the supernatant is separated from the solid waste residue by filtration, and the filtration comprises:
  treating a filter paper with a solution comprising polyacrylic acid, methanol and water to obtain a modified filter paper; and
  filtering said supernatant through said modified filter paper;
  for example, said supernatant is treated with a filtration aid; for example, said filtration aid is a calcium, magnesium or aluminium oxide, hydroxide, carbonate or sulfate.

In another embodiment, the supernatant is added to said first portion of non-solvent at the boiling point of said non-solvent and agitated for a time for diffusion of said suitable solvent from the supernatant into the non-solvent to proceed to a sufficient extent; in some embodiments, the time is from about 5 minutes to about 10 minutes and/or the ratio by volume of the first portion of non-solvent to the supernatant is from about 2:1 to about 4:1.

In another embodiment, the second portion of non-solvent is added to said precipitated thermoplastic polymer and/or said precipitated thermoplastic copolymer at the boiling point of said non-solvent and agitated for a time for diffusion of said suitable solvent, from the precipitated thermoplastic polymer and/or precipitated thermoplastic copolymer into the non-solvent to proceed to a sufficient extent. For example:
  the time is from about 1 minute to about 15 minutes, and/or
  the ratio by volume of said second portion of non-solvent to said precipitated thermoplastic polymer and/or precipitated thermoplastic copolymer is from 1:2 to 2:1.

In another embodiment, wherein said washed thermoplastic polymer and/or washed thermoplastic copolymer is washed with a third portion of non-solvent and said third portion of non-solvent is added to said washed thermoplastic polymer and/or washed thermoplastic copolymer at the boiling point of said non-solvent and agitated for a time for diffusion of said suitable solvent, from the washed thermoplastic polymer and/or washed thermoplastic copolymer into the non-solvent to proceed to a sufficient extent. For example:
  the time is from 1 minute to 10 minutes; and/or
  the ratio by volume of said third portion of non-solvent to said washed thermoplastic polymer and/or washed thermoplastic copolymer is from 1:2 to 2:1.

According to another aspect of the present disclosure, the thermoplastic is polystyrene (PS), and it would be desirable to be provided with a recycled polystyrene and/or recycled polystyrene copolymer or processes for the preparation of recycled polystyrene and/or recycled polystyrene copolymer that would at least partially solve one of the problems mentioned or that would be an alternative to the known recycled polystyrenes and/or recycled polystyrene copolymers or processes for the preparation thereof.

Thus, in an embodiment the thermoplastic is polystyrene and suitable solvent in the step of dissolving the thermoplastic polymer waste and/or thermoplastic copolymer waste to obtain a mixture of liquid and solids is selected from cymene, xylene, toluene, benzene, ethylbenzene and any combination thereof; for example from cymene, xylene, ethylbenzene and any combination thereof. In some embodiments, wherein the thermoplastic is polystyrene, the non-solvent is a hydrocarbon polystyrene non-solvent.

In another aspect, the present disclosure includes a process for recycling waste that is polystyrene waste and/or polystyrene copolymer waste, wherein the process comprises:
  dissolving the polystyrene waste and/or polystyrene copolymer waste in cymene, xylene, toluene, benzene, ethylbenzene or any combination thereof to obtain a mixture of liquid and solids;
  heating the mixture under acidic conditions then cooling the mixture to obtain a supernatant comprising polystyrene in solution and/or polystyrene copolymer in solution and a solid waste residue; in some embodiments, heating the mixture under acidic conditions is made in the presence of a reducing agent;
  separating the supernatant comprising dissolved polystyrene and/or dissolved polystyrene copolymer from the solid waste residue;
  optionally treating the supernatant with a filtration aid to remove insoluble gels;
  contacting the supernatant comprising dissolved polystyrene and/or dissolved polystyrene copolymer with a first portion of hydrocarbon polystyrene non-solvent to obtain precipitated polystyrene and/or precipitated polystyrene copolymer and a first portion of hydrocarbon waste solution;
  separating the precipitated polystyrene and/or precipitated polystyrene copolymer from the first portion of hydrocarbon waste solution;
  washing the precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;
  separating the washed polystyrene and/or washed polystyrene copolymer from the second portion of hydrocarbon waste solution;
  optionally washing the washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;
  optionally separating the twice-washed polystyrene and/or twice-washed polystyrene copolymer from the third portion of hydrocarbon waste solution; and
  optionally drying the washed or twice-washed polystyrene and/or washed or twice-washed polystyrene copolymer to obtain dried polystyrene and/or dried polystyrene copolymer.

According to another aspect of the present disclosure, there is provided a process for recycling waste that is polystyrene waste and/or polystyrene copolymer waste, the process comprising:
  dissolving the polystyrene waste and/or polystyrene copolymer waste in a suitable solvent to obtain a mixture;

heating the mixture under acidic conditions in the presence of a reducing agent then cooling the mixture to obtain a supernatant comprising polystyrene and/or polystyrene copolymer and a solid waste residue;

separating the supernatant comprising polystyrene and/or polystyrene copolymer from the solid waste residue;

optionally treating the supernatant with a filtration aid to remove insoluble gels;

contacting the supernatant comprising polystyrene and/or polystyrene copolymer with a first portion of hydrocarbon polystyrene non-solvent to obtain precipitated polystyrene and/or precipitated polystyrene copolymer and a first portion of hydrocarbon waste solution;

separating the precipitated polystyrene and/or precipitated polystyrene copolymer from the first portion of hydrocarbon waste solution;

washing the precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;

separating the washed polystyrene and/or washed polystyrene copolymer from the second portion of hydrocarbon waste solution;

optionally washing the optionally washing the washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;

optionally separating the twice-washed polystyrene and/or twice-washed polystyrene copolymer from the third portion of hydrocarbon waste solution; and optionally drying the washed or twice-washed polystyrene and/or washed or twice-washed polystyrene copolymer to obtain dried polystyrene and/or dried polystyrene copolymer.

In an aspect, the present disclosure includes a process for recycling waste that is polystyrene waste and/or polystyrene copolymer waste, the process comprising:

dissolving said polystyrene waste and/or polystyrene copolymer waste in cymene, xylene or ethylbenzene to obtain a mixture;

heating said mixture under acidic conditions in the presence of a reducing agent then cooling said mixture to obtain a supernatant comprising polystyrene and/or polystyrene copolymer and a solid waste residue;

separating said supernatant comprising polystyrene and/or polystyrene copolymer from said solid waste residue;

optionally treating said supernatant with a filtration aid to remove insoluble gels;

contacting said supernatant comprising polystyrene and/or polystyrene copolymer with a first portion of hydrocarbon polystyrene non-solvent to obtain precipitated polystyrene and/or precipitated polystyrene copolymer and a first portion of hydrocarbon waste solution;

separating said precipitated polystyrene and/or precipitated polystyrene copolymer from said first portion of hydrocarbon waste solution;

washing said precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;

separating said washed polystyrene and/or washed polystyrene copolymer from said second portion of hydrocarbon waste solution;

optionally washing said washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;

optionally separating said twice-washed polystyrene and/or twice-washed polystyrene copolymer from said third portion of hydrocarbon waste solution; and optionally drying said washed or twice-washed polystyrene and/or washed or twice-washed polystyrene copolymer to obtain dried polystyrene and/or dried polystyrene copolymer.

In another aspect, the present disclosure includes a process for recycling waste that is polystyrene waste and/or polystyrene copolymer waste, the process comprising:

dissolving said polystyrene waste and/or polystyrene copolymer waste in cymene, xylene or ethylbenzene to obtain a mixture;

heating said mixture under acidic conditions in the presence of a reducing agent, adding a base and heating said mixture under neutral conditions then cooling said mixture to obtain a supernatant comprising polystyrene and/or polystyrene copolymer and a solid waste residue;

separating said supernatant comprising polystyrene and/or polystyrene copolymer from said solid waste residue;

optionally treating said supernatant with a filtration aid to remove insoluble gels;

contacting said supernatant comprising polystyrene and/or polystyrene copolymer with a first portion of hydrocarbon polystyrene non-solvent to obtain precipitated polystyrene and/or precipitated polystyrene copolymer and a first portion of hydrocarbon waste solution;

separating said precipitated polystyrene and/or precipitated polystyrene copolymer from said first portion of hydrocarbon waste solution;

washing said precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;

separating said washed polystyrene and/or washed polystyrene copolymer from said second portion of hydrocarbon waste solution;

optionally washing said washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;

optionally separating said twice-washed polystyrene and/or twice-washed polystyrene copolymer from said third portion of hydrocarbon waste solution; and optionally drying said washed or twice-washed polystyrene and/or washed or twice-washed polystyrene copolymer to obtain dried polystyrene and/or dried polystyrene copolymer.

In another aspect, the present disclosure includes recycled polystyrene and/or recycled polystyrene copolymer prepared according to a process for recycling polystyrene waste and/or polystyrene copolymer waste as defined in the present disclosure.

In another aspect, the present disclosure includes a use of the recycled copolymer of the present disclosure for preparing a mixture comprising said recycled polystyrene copolymer and a virgin polystyrene and/or a virgin polystyrene copolymer.

In another aspect, the present disclosure includes a method of using the recycled polystyrene copolymer as defined the present disclosure, comprising mixing said recycled polystyrene copolymer with a virgin polystyrene and/or a virgin polystyrene copolymer.

The one or more following embodiments can be used to describe the present disclosure in more detail, the embodiments can be taken alone or in any combination. The following embodiments can also be combined with one or more embodiments described above.

In some embodiments, the process is a process for recycling postindustrial or post-consumer polystyrene waste that is polystyrene waste and/or polystyrene copolymer waste obtained from industrial or domestic polymer waste.

In some embodiments, the step of dissolving the polystyrene waste and/or polystyrene copolymer waste is performed in cymene, xylene, ethylbenzene, or any combination thereof; in some embodiments, in cymene, xylene or ethylbenzene; in some embodiments, in xylene and/or ethylbenzene. In an embodiment, the step of dissolving the polystyrene waste and/or polystyrene copolymer waste is performed in a mixture of benzene, toluene and xylene, for example the BTX fraction of petroleum. In an embodiment, the step of dissolving the polystyrene waste and/or polystyrene copolymer waste is performed in a mixture of benzene, toluene, ethylbenzene and xylene, for example the BTEX fraction of petroleum.

In an embodiment, wherein cymene is used as suitable solvent, the cymene is for example p-cymene. p-Cymene is less toxic compared to o-cymene or m-cymene, and is a natural product.

In some embodiments, the step of washing the precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution, is selected from batch washing and continuous washing; in some embodiments, the step is a continuous washing.

In some embodiment, prior to cooling the mixture to obtain a supernatant comprising polystyrene in solution and/or polystyrene copolymer in solution and the solid waste residue, the process further comprises adding a base and heating said the mixture under neutral conditions. In some embodiments, the base is calcium hydroxide.

In some embodiments, the step of heating the mixture comprises heating the mixture under acidic conditions is performed in the presence of a reducing agent, adding a base and heating the mixture under neutral conditions In some embodiments, the mixture comprises said polystyrene and/or polystyrene copolymer in an amount of from 20 wt. % to 40 wt. %, based on the total weight of said mixture.

In some embodiments, said dissolving is carried out at a temperature of from about 60 to 100° C., for example, from about 70° C. to about 90° C.

In some embodiments, the supernatant is added to said first portion of hydrocarbon polystyrene non-solvent at the boiling point of said hydrocarbon polystyrene non-solvent and agitated for a time for diffusion of the cymene, xylene, toluene, benzene, ethylbenzene or any combination thereof from the supernatant into the hydrocarbon polystyrene non-solvent to proceed to a sufficient extent; for example, the time is from about 5 minutes to about 10 minutes and/or the ratio by volume of the first portion of hydrocarbon polystyrene non-solvent to the supernatant is from about 2:1 to about 4:1.

In some embodiments, the second portion of hydrocarbon polystyrene non-solvent is added to said precipitated polystyrene and/or said precipitated polystyrene copolymer at the boiling point of said hydrocarbon polystyrene non-solvent and agitated for a time for diffusion of the cymene, xylene, toluene, benzene, ethylbenzene or any combination thereof, from the precipitated polystyrene and/or precipitated polystyrene copolymer into the hydrocarbon polystyrene non-solvent to proceed to a sufficient extent. For example:

the time is from about 1 minute to about 15 minutes, and/or the ratio by volume of said second portion of hydrocarbon polystyrene non-solvent to said precipitated polystyrene and/or precipitated polystyrene copolymer is from 1:2 to 2:1.

In some embodiments, wherein said washed polystyrene and/or washed polystyrene copolymer is washed with a third portion of hydrocarbon polystyrene non-solvent and said third portion of hydrocarbon polystyrene non-solvent is added to said washed polystyrene and/or washed polystyrene copolymer at the boiling point of said hydrocarbon polystyrene non-solvent and agitated for a time for diffusion of the cymene, xylene, toluene, benzene, ethylbenzene, or any combination thereof, from the washed polystyrene and/or washed polystyrene copolymer into the hydrocarbon polystyrene non-solvent to proceed to a sufficient extent; for example:

the time is from 1 minute to 10 minutes; and/or the ratio by volume of said third portion of hydrocarbon polystyrene non-solvent to said washed polystyrene and/or washed polystyrene copolymer is from 1:2 to 2:1.

In some embodiments, the washed polystyrene and/or washed polystyrene copolymer comprises less than about 0.3 wt. % of cymene, xylene, toluene, benzene, ethylbenzene or any combination thereof, and/or wherein the twice-washed polystyrene and/or twice-washed polystyrene copolymer comprises less than about 0.1 wt. % of cymene, xylene, toluene, benzene, ethylbenzene or any combination thereof.

In some embodiments, at least one of the first portion of hydrocarbon polystyrene non-solvent, said second portion of hydrocarbon polystyrene non-solvent and said third portion of hydrocarbon polystyrene non-solvent comprises, consists essentially of or consists of a hydrocarbon polystyrene non-solvent having a boiling point at 1 atm of pressure of from about 98° C. to about 110° C.; for example, having a boiling point at 1 atm of pressure of from about 105° C. to about 110° C.

In some embodiments, said first portion of hydrocarbon polystyrene non-solvent, said second portion of hydrocarbon polystyrene non-solvent and said third portion of hydrocarbon polystyrene non-solvent comprise, or consist of a $C_6$-$C_8$ alkane or a petroleum distillate; for example, consist of heptane According to another aspect of the present disclosure, the thermoplastic is selected from polyethylene (PE) and/or polypropylene (PP), and it would be desirable to be provided with a recycled polyethylene and/or recycled polyethylene copolymer; or with a recycled polypropylene and/or recycled polypropylene copolymer; or with a blend of recycled polyethylene and polypropylene; or processes for the preparation of the recycled thermoplastic polymer and/or the recycled thermoplastic copolymer that would at least partially solve one of the problems encountered in prior art, such the lack of purity problem in recycled material, or that would be an alternative to the known recycled material or processes for the preparation thereof. Thus, in some embodiments, the thermoplastic is selected from polyethylene (PE) and/or polypropylene (PP), and the suitable solvent in the step of dissolving the thermoplastic polymer waste and/or thermoplastic copolymer waste to obtain a mixture of liquid and solids is selected from cymene, xylene, toluene, benzene, ethylbenzene and any combination thereof; for example from cymene, xylene, ethylbenzene and any combination thereof. In some embodiments, wherein the thermoplastic is selected from polyethylene (PE) and/or polypropylene (PP), the non-solvent is an alcohol non-solvent.

In another aspect, the present disclosure includes a process for recycling waste that is thermoplastic polymer waste and/or thermoplastic copolymer waste, wherein the thermoplastic is selected from polyethylene (PE) and/or polypropylene (PP) the process comprising:

dissolving the thermoplastic polymer waste and/or thermoplastic copolymer waste in cymene, xylene, toluene, benzene, ethylbenzene or any combination thereof to obtain a mixture of liquid and solids;

heating the mixture under acidic conditions then cooling the mixture to obtain a supernatant comprising thermoplastic polymer in solution and/or thermoplastic copolymer in solution and a solid waste residue; in some embodiments, heating said mixture under acidic conditions is made in the presence of a reducing agent;

separating the supernatant comprising dissolved thermoplastic polymer and/or dissolved thermoplastic copolymer from the solid waste residue;

optionally treating the supernatant with a filtration aid to remove insoluble gels;

contacting the supernatant comprising dissolved thermoplastic polymer and/or dissolved thermoplastic copolymer with a first portion of alcohol non-solvent to obtain precipitated thermoplastic polymer and/or precipitated thermoplastic copolymer and a first portion of alcohol waste solution;

separating the precipitated thermoplastic polymer and/or precipitated thermoplastic copolymer from the first portion of alcohol waste solution;

washing the precipitated thermoplastic polymer and/or precipitated thermoplastic copolymer with a second portion of alcohol non-solvent to obtain a washed thermoplastic polymer and/or washed thermoplastic copolymer and a second portion of alcohol waste solution;

separating the washed thermoplastic polymer and/or washed thermoplastic copolymer from the second portion of alcohol waste solution;

optionally washing the washed thermoplastic polymer and/or washed thermoplastic copolymer with a third portion of alcohol non-solvent to obtain a twice-washed thermoplastic polymer and/or twice-washed thermoplastic copolymer and a third portion of alcohol waste solution;

optionally separating the twice-washed thermoplastic polymer and/or twice-washed thermoplastic copolymer from the third portion of alcohol waste solution; and optionally drying the washed or twice-washed thermoplastic polymer and/or washed or twice-washed thermoplastic copolymer to obtain dried thermoplastic polymer and/or dried thermoplastic copolymer.

The one or more following embodiments can be used to describe the present disclosure in more detail, the embodiments can be taken alone or in any combination. The following embodiments can also be combined with one or more embodiments described above.

In some embodiments, the process is a process for recycling postindustrial or post-consumer polyethylene waste that is polyethylene waste and/or polyethylene copolymer waste obtained from industrial or domestic polymer waste.

In some embodiments, the process is a process for recycling postindustrial or post-consumer polypropylene waste that is polypropylene waste and/or polypropylene copolymer waste obtained from industrial or domestic polymer waste.

In some embodiments, the process is a process for recycling postindustrial or post-consumer blends of polyethylene and polypropylene waste that are blends of polyethylene and polypropylene waste, wherein the polyethylene and/or the polypropylene can be either homopolymer or copolymer, the blends of polyethylene and polypropylene waste being obtained from industrial or domestic polymer waste.

In some embodiments, the step of dissolving the thermoplastic waste and/or thermoplastic copolymer waste is performed in cymene, xylene, ethylbenzene, or any combination thereof; for example, in cymene, xylene or ethylbenzene; for example in xylene and/or ethylbenzene. In some embodiments, the step of dissolving said thermoplastic waste and/or thermoplastic copolymer waste is performed in a mixture of benzene, toluene and xylene, for example, of the BTX fraction of petroleum. In some embodiments, the step of dissolving said thermoplastic waste and/or thermoplastic copolymer waste is performed in a mixture of benzene, toluene, ethylbenzene and xylene, for example, of the BTEX fraction of petroleum.

In some embodiments, the dissolving is carried out at a temperature of at least 130° C.; for example, ranging from about 130° C. to about 160° C.

In some embodiments, the alcohol non-solvent to obtain precipitated thermoplastic polymer and/or precipitated thermoplastic copolymer is one or more alcohol; in some embodiments, the one or more alcohol is selected from methanol and/or ethanol; for example, the one or more alcohol is methanol.

In some embodiments, the washed thermoplastic polymer and/or washed thermoplastic copolymer comprises less than about 0.3 wt. % of cymene, xylene, toluene, benzene, ethylbenzene or any combination thereof, and/or wherein the twice-washed thermoplastic polymer and/or twice-washed thermoplastic copolymer comprises less than about 0.1 wt. % of cymene, xylene, toluene, benzene, ethylbenzene or any combination thereof.

In some embodiments, at least one of the first portion of alcohol non-solvent, said second portion of alcohol non-solvent and said third portion of alcohol non-solvent comprises, consists essentially of or consists of a alcohol non-solvent having a boiling point at 1 atm of pressure of from about 55° C. to about 95° C.; for example, having a boiling point at 1 atm of pressure of from about 60° C. to about 80° C.

According to another aspect of the present disclosure, the thermoplastic is selected from acrylonitrile butadiene styrene copolymer (ABS) or acrylonitrile-styrene copolymer (SAN), and it would be desirable to be provided with a recycled acrylonitrile butadiene styrene copolymer or with a recycled acrylonitrile-styrene copolymer; or processes for the preparation of the recycled acrylonitrile butadiene styrene copolymer or recycled acrylonitrile-styrene copolymer that would at least partially solve one of the problems encountered in prior art, such the lack of purity problem in recycled material, or that would be an alternative to the known recycled material or processes for the preparation thereof.

Thus, in some embodiments, the thermoplastic is selected from acrylonitrile butadiene styrene copolymer (ABS) or acrylonitrile-styrene copolymer (SAN), and the suitable solvent in the step of dissolving the thermoplastic polymer waste and/or thermoplastic copolymer waste to obtain a mixture of liquid and solids is one or more selected from chlorinated solvents; for example from chlorinated methane and/or chlorinated ethane; in some embodiments, the suitable solvent is dichloroethane. In some embodiments, wherein the thermoplastic is selected from acrylonitrile butadiene styrene copolymer (ABS) or acrylonitrile-styrene copolymer (SAN), the non-solvent is an alcohol non-solvent.

In another aspect, the present disclosure includes a process for recycling waste that is acrylonitrile butadiene styrene copolymer (ABS) waste or acrylonitrile-styrene copolymer (SAN) waste, the process comprising:

dissolving the acrylonitrile butadiene styrene copolymer (ABS) waste or acrylonitrile-styrene copolymer (SAN) waste in one or more chlorinated solvent to obtain a mixture of liquid and solids; in some embodiments, the one or more chlorinated solvent is selected from chlorinated methane and/or chlorinated ethane; for example, the one or more chlorinated solvent is dichloroethane.

heating the mixture under acidic conditions then cooling the mixture to obtain a supernatant comprising acrylonitrile butadiene styrene copolymer in solution or acrylonitrile-styrene copolymer in solution and a solid waste residue; for example, heating said mixture under acidic conditions is made in the presence of a reducing agent;

separating the supernatant comprising dissolved acrylonitrile butadiene styrene copolymer or dissolved acrylonitrile-styrene copolymer from the solid waste residue;

optionally treating the supernatant with a filtration aid to remove insoluble gels;

contacting the supernatant comprising dissolved acrylonitrile butadiene styrene copolymer or dissolved acrylonitrile-styrene copolymer with a first portion of alcohol non-solvent to obtain precipitated acrylonitrile butadiene styrene copolymer or precipitated acrylonitrile-styrene copolymer and a first portion of alcohol waste solution;

separating the precipitated acrylonitrile butadiene styrene copolymer or precipitated acrylonitrile-styrene copolymer from the first portion of alcohol waste solution;

washing the precipitated acrylonitrile butadiene styrene copolymer or precipitated acrylonitrile-styrene copolymer with a second portion of alcohol non-solvent to obtain a washed acrylonitrile butadiene styrene copolymer or washed acrylonitrile-styrene copolymer and a second portion of alcohol waste solution;

separating the washed acrylonitrile butadiene styrene copolymer or washed acrylonitrile-styrene copolymer from the second portion of alcohol waste solution;

optionally washing the washed acrylonitrile butadiene styrene copolymer or washed acrylonitrile-styrene copolymer with a third portion of alcohol non-solvent to obtain a twice-washed acrylonitrile butadiene styrene copolymer or twice-washed acrylonitrile-styrene copolymer and a third portion of alcohol waste solution;

optionally separating the twice-washed acrylonitrile butadiene styrene copolymer or twice-washed acrylonitrile-styrene copolymer from the third portion of alcohol waste solution; and optionally drying the washed or twice-washed acrylonitrile butadiene styrene or washed or twice-washed acrylonitrile-styrene copolymer to obtain dried acrylonitrile butadiene styrene copolymer or dried acrylonitrile-styrene copolymer.

The one or more following embodiments can be used to describe the present disclosure in more detail, the embodiments can be taken alone or in any combination. The following embodiments can also be combined with one or more embodiments described above.

In some embodiments, the process is a process for recycling postindustrial or post-consumer acrylonitrile butadiene styrene copolymer waste or acrylonitrile-styrene copolymer waste that is acrylonitrile butadiene styrene copolymer waste or acrylonitrile-styrene copolymer waste obtained from industrial or domestic polymer waste.

In some embodiments, the dissolving is carried out at a temperature of at least 60° C.; for example, ranging from about 60° C. to 100° C.; for example, from about 60° C. to about 90° C.

In some embodiments, the alcohol non-solvent to obtain precipitated acrylonitrile butadiene styrene copolymer polymer or precipitated acrylonitrile-styrene copolymer is one or more alcohol; for example, the one or more alcohol is selected from methanol and/or ethanol; for example, the one or more alcohol is methanol.

In some embodiments, prior to cooling the mixture to obtain a supernatant comprising acrylonitrile butadiene styrene copolymer or acrylonitrile-styrene copolymer and the solid waste residue, the process further comprises adding a base and heating the mixture under neutral conditions. In some embodiments, the base is calcium hydroxide.

In some embodiments, the step of heating the mixture comprises heating the mixture under acidic conditions is performed in the presence of a reducing agent, adding a base and heating the mixture under neutral conditions.

According to another aspect of the present disclosure, the thermoplastic is polyvinyl chloride (PVC) and is selected from polyvinyl chloride homopolymer and/or polyvinyl chloride copolymer, and it would be desirable to be provided with a recycled polyvinyl chloride homopolymer and/or with a recycled polyvinyl chloride copolymer; or processes for the preparation of the recycled polyvinyl chloride homopolymer and/or with a recycled polyvinyl chloride copolymer that would at least partially solve one of the problems encountered in prior art, such the lack of purity problem in recycled material, or that would be an alternative to the known recycled material or processes for the preparation thereof.

Thus, in some embodiments, the thermoplastic is polyvinyl chloride (PVC) and is selected from polyvinyl chloride homopolymer and/or polyvinyl chloride copolymer, and the suitable solvent in the step of dissolving the thermoplastic polymer waste and/or thermoplastic copolymer waste to obtain a mixture of liquid and solids is one or more selected from chlorinated solvents; for example, from a chlorinated aromatic solvents; in some embodiments, the suitable solvent is chlorobenzene. In some embodiments, wherein the thermoplastic is polyvinyl chloride (PVC) and is selected from polyvinyl chloride homopolymer and/or polyvinyl chloride copolymer, the non-solvent is an alcohol non-solvent.

In some embodiments, the thermoplastic is polyvinyl chloride (PVC) and is selected from polyvinyl chloride homopolymer and/or polyvinyl chloride copolymer, and the suitable solvent in the step of dissolving the thermoplastic polymer waste and/or thermoplastic copolymer waste to obtain a mixture of liquid and solids is one or more selected from cyclic ether; for example, in some embodiments, the suitable solvent is selected from tetrahydrofuran and tetrahydropyran. In some embodiments, wherein the thermoplastic is polyvinyl chloride (PVC) and is selected from polyvinyl chloride homopolymer and/or polyvinyl chloride copolymer, the non-solvent is an alcohol non-solvent.

There is provided a process for recycling waste that is polyvinyl chloride (PVC) waste and is selected from polyvinyl chloride homopolymer waste and/or polyvinyl chloride copolymer waste, the process comprising:

dissolving the polyvinyl chloride homopolymer waste and/or polyvinyl chloride copolymer waste in one or more chlorinated solvent to obtain a mixture of liquid and solids; in some embodiments, the one or more chlorinated solvent is selected from a chlorinated aromatic solvent; in some embodiments, the one or more chlorinated solvent is chlorobenzene;

heating the mixture under acidic conditions then cooling the mixture to obtain a supernatant comprising polyvinyl chloride homopolymer in solution and/or polyvinyl chloride copolymer in solution and a solid waste residue; in some embodiments, heating said mixture under acidic conditions is made in the presence of a reducing agent;

separating the supernatant comprising dissolved polyvinyl chloride homopolymer and/or dissolved polyvinyl chloride copolymer from the solid waste residue;

optionally treating the supernatant with a filtration aid to remove insoluble gels;

contacting the supernatant comprising dissolved polyvinyl chloride homopolymer and/or dissolved polyvinyl chloride copolymer with a first portion of alcohol non-solvent to obtain precipitated polyvinyl chloride homopolymer and/or precipitated polyvinyl chloride copolymer and a first portion of alcohol waste solution;

separating the precipitated polyvinyl chloride homopolymer and/or precipitated polyvinyl chloride copolymer from the first portion of alcohol waste solution;

washing the precipitated polyvinyl chloride homopolymer and/or precipitated polyvinyl chloride copolymer with a second portion of alcohol non-solvent to obtain a washed polyvinyl chloride homopolymer and/or washed polyvinyl chloride copolymer and a second portion of alcohol waste solution;

separating the washed polyvinyl chloride homopolymer and/or washed polyvinyl chloride copolymer from the second portion of alcohol waste solution;

optionally washing the washed polyvinyl chloride homopolymer and/or washed polyvinyl chloride copolymer with a third portion of alcohol non-solvent to obtain a twice-washed polyvinyl chloride homopolymer and/or twice-washed polyvinyl chloride copolymer and a third portion of alcohol waste solution;

optionally separating the twice-washed polyvinyl chloride homopolymer and/or twice-washed polyvinyl chloride copolymer from the third portion of alcohol waste solution; and optionally drying the washed or twice-washed polyvinyl chloride homopolymer and/or washed or twice-washed polyvinyl chloride copolymer to obtain dried polyvinyl chloride homopolymer and/or dried polyvinyl chloride copolymer.

There is provided a process for recycling waste that is polyvinyl chloride (PVC) waste and is selected from polyvinyl chloride homopolymer waste and/or polyvinyl chloride copolymer waste, the process comprising:

dissolving the polyvinyl chloride homopolymer waste and/or polyvinyl chloride copolymer waste in one or more cyclic ether solvent to obtain a mixture of liquid and solids; in some embodiments, the one or more cyclic ether solvent is selected from tetrahydrofuran and tetrahydropyran; in some embodiments, the one or more cyclic ether solvent is tetrahydrofuran;

heating the mixture under acidic conditions then cooling the mixture to obtain a supernatant comprising polyvinyl chloride homopolymer in solution and/or polyvinyl chloride copolymer in solution and a solid waste residue; in some embodiments, heating said mixture under acidic conditions is made in the presence of a reducing agent;

separating the supernatant comprising dissolved polyvinyl chloride homopolymer and/or dissolved polyvinyl chloride copolymer from the solid waste residue;

optionally treating the supernatant with a filtration aid to remove insoluble gels;

contacting the supernatant comprising dissolved polyvinyl chloride homopolymer and/or dissolved polyvinyl chloride copolymer with a first portion of alcohol non-solvent to obtain precipitated polyvinyl chloride homopolymer and/or precipitated polyvinyl chloride copolymer and a first portion of alcohol waste solution;

separating the precipitated polyvinyl chloride homopolymer and/or precipitated polyvinyl chloride copolymer from the first portion of alcohol waste solution;

washing the precipitated polyvinyl chloride homopolymer and/or precipitated polyvinyl chloride copolymer with a second portion of alcohol non-solvent to obtain a washed polyvinyl chloride homopolymer and/or washed polyvinyl chloride copolymer and a second portion of alcohol waste solution;

separating the washed polyvinyl chloride homopolymer and/or washed polyvinyl chloride copolymer from the second portion of alcohol waste solution;

optionally washing the washed polyvinyl chloride homopolymer and/or washed polyvinyl chloride copolymer with a third portion of alcohol non-solvent to obtain a twice-washed polyvinyl chloride homopolymer and/or twice-washed polyvinyl chloride copolymer and a third portion of alcohol waste solution;

optionally separating the twice-washed polyvinyl chloride homopolymer and/or twice-washed polyvinyl chloride copolymer from the third portion of alcohol waste solution; and optionally drying the washed or twice-washed polyvinyl chloride homopolymer and/or washed or twice-washed polyvinyl chloride copolymer to obtain dried polyvinyl chloride homopolymer and/or dried polyvinyl chloride copolymer.

The one or more following embodiments can be used to describe the present disclosure in more detail, the embodiments can be taken alone or in any combination. The following embodiments can also be combined with one or more embodiments described above.

In some embodiments, the process is a process for recycling postindustrial or post-consumer polyvinyl chloride homopolymer waste and/or polyvinyl chloride copolymer waste that is polyvinyl chloride homopolymer waste and/or polyvinyl chloride copolymer waste obtained from industrial or domestic polymer waste.

In some embodiments, the said dissolving is carried out at a temperature of at least 70° C.; for example, ranging from about 70° C. to 130° C.; for example from about 80° C. to about 120° C.

In some embodiments, the dissolving is carried out at a temperature of at least 50° C.; for example, ranging from about 50° C. to 100° C.; for example, from about 60° C. to about 90° C. In some embodiments, the dissolving is carried out under normal pressure conditions.

In some embodiments, the alcohol non-solvent to obtain precipitated polyvinyl chloride homopolymer and/or precipitated polyvinyl chloride copolymer is one or more alcohol; for example, the one or more alcohol is selected from methanol and/or ethanol; in some embodiments, the one or more alcohol is methanol.

In some embodiments, prior to cooling the mixture to obtain a supernatant comprising polyvinyl chloride homopolymer and/or polyvinyl chloride copolymer and the solid waste residue, the process further comprises adding a base and heating the mixture under neutral conditions. In some embodiments, the base is calcium hydroxide.

In some embodiments, the step of heating the mixture comprises heating the mixture under acidic conditions is performed in the presence of a reducing agent, adding a base and heating the mixture under neutral conditions According to another aspect of the present disclosure, there is also provided recycled thermoplastic polymer and/or recycled thermoplastic copolymer prepared according to a process for recycling thermoplastic polymer waste and/or thermoplastic copolymer waste of the present disclosure, such as according to any other one or more aspects of the present disclosure.

According to another aspect of the present disclosure, there is also provided recycled polystyrene and/or recycled polystyrene copolymer prepared according to a process for recycling polystyrene waste and/or polystyrene copolymer waste of the present disclosure, such as according to the first and second aspect.

According to another aspect of the present disclosure, there is also provided a recycled polystyrene and/or recycled polystyrene copolymer:
  having a transmittance ranging from 80 to 99%; the transmittance being measured in a UV-VIS spectrum at 600 nm at 20° C. on solution comprising the recycled polystyrene and/or recycled polystyrene copolymer diluted in cymene, wherein the content of recycled polystyrene and/or recycled polystyrene copolymer is 20 wt. % of the total weight of the solution and wherein the reference solution for 100% of transmittance in a UV-VIS spectrum at 600 nm at 20° C. is a solution of virgin polystyrene homopolymer diluted in cymene, wherein the content of virgin polystyrene is 20 wt. % of the total weight of the reference solution; and/or
  comprising cymene, xylene, toluene, benzene or any combination thereof, wherein the total content of cymene, xylene, toluene, benzene or any combination thereof is less than 0.1 wt. % based on the total weight of the recycled polystyrene and/or recycled polystyrene copolymer; and/or
  having a total content of impurities of less than 0.5 wt. % based on the total weight of the recycled polystyrene and/or recycled polystyrene copolymer; for example, of less than 0.1 wt. %; and/or
  being produced by the process according to any other one or more aspects of the present disclosure.

In some embodiments, the recycled polystyrene and/or recycled polystyrene copolymer comprises cymene, xylene, toluene, benzene or any combination thereof, wherein the total content of cymene, xylene, toluene, benzene or any combination thereof is at least 100 ppm based on the total weight of the recycled polystyrene and/or recycled polystyrene copolymer; in some embodiments, the recycled polystyrene and/or recycled polystyrene copolymer comprises xylene, toluene, benzene or any combination thereof; for example, the recycled polystyrene and/or recycled polystyrene copolymer comprises cymene and/or xylene; for example, the recycled polystyrene comprises benzene.

It is understood that the presence of traces of the solvents used in the process according to the present disclosure is a signature that the recycled material has been prepared according to the process of the present disclosure.

In some embodiments, recycled polystyrene is having a transmittance ranging from 85 to 99%; the transmittance being measured in a UV-VIS spectrum at 600 nm at 20° C. on solution comprising the recycled polystyrene diluted in cymene, wherein the content of recycled polystyrene is 20 wt. % of the total weight of the solution; for example, ranging from 90 to 99%; for example, ranging from 95 to 99%; for example, ranging from 96 to 99%; for example, ranging from 97 to 99%.

By comparison, the virgin polystyrene homopolymer when measured in the same conditions have a transmittance of 100%. It was found that performing a UV-VIS spectrum at 600 nm on solution comprising the polystyrene and/or polystyrene copolymer diluted in cymene, wherein the content of polystyrene and/or polystyrene copolymer is 20 wt. % of the total weight of the solution, allows to distinguish recycled polystyrene from virgin polystyrene. For example, the virgin polystyrene will have transmittance of 100% whereas the recycled polystyrene and/or recycled polystyrene copolymer will have a transmittance of less than 100%. The transmittance of the recycled polystyrene and/or recycled polystyrene copolymer is dependent on the purification process performed; the higher the transmittance the higher purity.

The transmittance measurements are made at atmospheric pressure.

In an embodiment, the recycled polystyrene has a melt flow index of from 3 to 25 g/10 min measured according to ASTM D1238-13; or of from 2 to 12 g/10 min measured according to ASTM D1238-13.

In some embodiments, the recycled polystyrene and/or recycled polystyrene copolymer has an additive content of less than 5 wt. % based on the total weight of the recycled polystyrene and/or recycled polystyrene copolymer; in some embodiments, the additive content is less than 2.0 wt. %; in some embodiments, less than 1.0 wt. %, and in some embodiments, less than 0.5 wt. %; wherein the additives are selected from coloring agents, fillers, flame retardants, lubricants and plasticizers. The additive content are the additives remaining after the purification process. In the context of the present disclosure, the remaining additives include remaining fillers.

In some embodiments, the recycled polystyrene comprises less than 5 wt. % of filler, for example, less than 3 wt. %, less than 1 wt. %, or than 0.1 wt. %.

In some embodiments, the recycled polystyrene and/or recycled polystyrene copolymer is obtained by recycling polystyrene waste by involving a treatment with a solvent that is p-cymene and a hydrocarbon polystyrene non-solvent that is $C_6$-$C_8$ alkane or mixtures thereof; in some embodiments, the non-solvent is selected from hexane, heptane, or octane; for example, the polystyrene waste comprises polystyrene and/or polystyrene copolymer having an average molecular weight of 200,000 to 350,000 g/mol; for example of 230,000 to 260,000 g/mol.

In some embodiments, the recycled polystyrene and/or recycled polystyrene copolymer is transparent or white.

According to another aspect of the present disclosure, there is also provided a recycled thermoplastic polymer and/or recycled thermoplastic copolymer, wherein the thermoplastic is selected from polyethylene (PE) and polypropylene (PP):
- having a transmittance ranging from 80 to 99%; the transmittance being measured in a UV-VIS spectrum at 600 nm at 130° C. on solution comprising the recycled polyethylene and/or recycled polypropylene diluted in cymene, wherein the content of the recycled polyethylene and recycled polypropylene is 10 wt. % of the total weight of the solution and wherein the reference solution for 100% of transmittance in a UV-VIS spectrum at 600 nm at 130° C. is a solution of virgin ethylene homopolymer and/or virgin propylene homopolymer diluted in cymene, wherein the total content of virgin ethylene homopolymer and virgin propylene homopolymer is 10 wt. % of the total weight of the reference solution; and/or
- comprising cymene, xylene, toluene, ethylbenzene or any combination thereof, wherein the total content of cymene, xylene, toluene, benzene, ethylbenzene or any combination thereof is less than 0.1 wt. % based on the total weight of the recycled thermoplastic polymer and/or recycled thermoplastic copolymer; and/or
- having a total content of impurities of less than 0.5 wt. % based on the total weight of the recycled thermoplastic polymer and/or recycled thermoplastic copolymer; for example, of less than 0.1 wt. %; and/or
- being produced by the process of the present disclosure.

According to another aspect of the present disclosure, there is also provided a recycled thermoplastic polymer and/or recycled thermoplastic copolymer, wherein the thermoplastic is selected from polyethylene (PE) and polypropylene (PP):
- having a transmittance ranging from 80 to 99%; the transmittance being measured in a UV-VIS spectrum at 600 nm at 130° C. on solution comprising the recycled polyethylene and/or recycled polypropylene diluted in cymene, wherein the content of the recycled polyethylene and recycled polypropylene is 5 wt. % of the total weight of the solution and wherein the reference solution for 100% of transmittance in a UV-VIS spectrum at 600 nm at 130° C. is a solution of virgin ethylene homopolymer and/or virgin propylene homopolymer diluted in cymene, wherein the total content of virgin ethylene homopolymer and virgin propylene homopolymer is 5 wt. % of the total weight of the reference solution; and/or
- comprising cymene, xylene, toluene, ethylbenzene or any combination thereof, wherein the total content of cymene, xylene, toluene, benzene, ethylbenzene or any combination thereof is less than 0.1 wt. % based on the total weight of the recycled thermoplastic polymer and/or recycled thermoplastic copolymer; and/or
- having a total content of impurities of less than 0.5 wt. % based on the total weight of the recycled thermoplastic polymer and/or recycled thermoplastic copolymer; for example, of less than 0.1 wt. %; and/or
- being produced by the process of the present disclosure.

In some embodiments, the recycled polyethylene and/or recycled polypropylene comprises cymene, xylene, toluene, benzene, ethylbenzene or any combination thereof, wherein the total content of cymene, xylene, toluene, benzene, ethylbenzene or any combination thereof is at least 100 ppm based on the total weight of the recycled polyethylene and/or recycled polypropylene.

It is understood that the presence of traces of the solvents used in the process of the present disclosure can be a signature that the recycled material has been prepared according to the process of the present disclosure.

For the transmittance measurement, it is understood that the reference solution comprises a polymer of the same nature so that the reference solution contains virgin polyethylene homopolymer for the measurement of the transmittance of recycled polyethylene; the reference solution contains virgin polypropylene homopolymer for the measurement of the transmittance of recycled polypropylene; and the reference solution contains a blend of virgin ethylene homopolymer and virgin polypropylene homopolymer for the measurement of the transmittance of a blend of recycled polyethylene and recycled polypropylene wherein the respective content of polyethylene and polypropylene are the same in the reference solution and in the recycled blend of polyethylene and polypropylene.

The transmittance measurements are made at atmospheric pressure.

In some embodiments, the recycled polyethylene and/or recycled polypropylene is having a transmittance ranging from 85 to 99%; for example ranging from 90 to 99%.

According to another aspect of the present disclosure, there is also provided a recycled thermoplastic copolymer, wherein the thermoplastic is selected from acrylonitrile butadiene styrene copolymer (ABS) and acrylonitrile-styrene copolymer (SAN):
- having a transmittance ranging from 80 to 99%; the transmittance being measured in a UV-VIS spectrum at 600 nm at 20° C. on solution comprising the recycled acrylonitrile butadiene styrene copolymer or recycled acrylonitrile-styrene copolymer diluted in dichloroethane, wherein the content of the recycled acrylonitrile butadiene styrene copolymer or recycled acrylonitrile-styrene copolymer is 20 wt. % of the total weight of the solution and wherein the reference solution for 100% of transmittance in a UV-VIS spectrum at 600 nm at 20° C. is a solution of virgin acrylonitrile butadiene styrene copolymer or virgin acrylonitrile-styrene copolymer diluted in dichloroethane, wherein the content of virgin acrylonitrile butadiene styrene copolymer or virgin acrylonitrile-styrene copolymer is 20 wt. % of the total weight of the reference solution; and/or
- comprising chlorinated methane and/or chlorinated ethane, wherein the total content of chlorinated methane and chlorinated ethane is less than 0.1 wt. % based on the total weight of the recycled thermoplastic copolymer; in some embodiments, comprising dichloroethane, wherein the total content of dichloroethane is less than 0.1 wt. % based on the total weight of the recycled thermoplastic copolymer; and/or
- having a total content of impurities of less than 0.5 wt. % based on the total weight of the recycled thermoplastic copolymer; for example, of less than 0.1 wt. %; and/or
- being produced by the process of the present disclosure.

According to another aspect of the present disclosure, there is also provided a recycled thermoplastic copolymer, wherein the thermoplastic is selected from acrylonitrile butadiene styrene copolymer (ABS) and acrylonitrile-styrene copolymer (SAN):
  having a transmittance ranging from 80 to 99%; the transmittance being measured in a UV-VIS spectrum at 600 nm at 20° C. on solution comprising the recycled acrylonitrile butadiene styrene copolymer or recycled acrylonitrile-styrene copolymer diluted in dichloroethane, wherein the content of the recycled acrylonitrile butadiene styrene copolymer or recycled acrylonitrile-styrene copolymer is 20 wt. % of the total weight of the solution and wherein the reference solution for 100% of transmittance in a UV-VIS spectrum at 600 nm at 20° C. is a solution of virgin acrylonitrile butadiene styrene copolymer substantially free of cross-linked copolymer or virgin acrylonitrile-styrene copolymer substantially free of cross-linked copolymer diluted in dichloroethane, wherein the content of virgin acrylonitrile butadiene styrene copolymer or virgin acrylonitrile-styrene copolymer is 20 wt. % of the total weight of the reference solution; and/or
  comprising chlorinated methane and/or chlorinated ethane, wherein the total content of chlorinated methane and chlorinated ethane is less than 0.1 wt. % based on the total weight of the recycled thermoplastic copolymer; in some embodiments, comprising dichloroethane, wherein the total content of dichloroethane is less than 0.1 wt. % based on the total weight of the recycled thermoplastic copolymer; and/or
  having a total content of impurities of less than 0.5 wt. % based on the total weight of the recycled thermoplastic copolymer; for example, of less than 0.1 wt. %; and/or
  being produced by the process of the present disclosure.

In some embodiments, the recycled acrylonitrile butadiene styrene copolymer (ABS) or the recycled acrylonitrile-styrene copolymer (SAN) comprises chlorinated methane and/or chlorinated ethane, wherein the total content of chlorinated methane and/or chlorinated ethane is at least 100 ppm based on the total weight of the recycled acrylonitrile butadiene styrene copolymer (ABS) or the recycled acrylonitrile-styrene copolymer (SAN).

In some embodiments, the recycled acrylonitrile butadiene styrene copolymer (ABS) or the recycled acrylonitrile-styrene copolymer (SAN) comprises dichloroethane, wherein the total content of dichloroethane is at least 100 ppm based on the total weight of the recycled acrylonitrile butadiene styrene copolymer (ABS) or the recycled acrylonitrile-styrene copolymer (SAN).

It is understood that the presence of traces of the solvents used in the process of the present disclosure can be a signature that the recycled material has been prepared according to the process of the present disclosure.

For the transmittance measurement, it is understood that the reference solution comprises a polymer of the same nature so that the reference solution contains virgin acrylonitrile butadiene styrene copolymer for the measurement of the transmittance of recycled acrylonitrile butadiene styrene copolymer; and the reference solution contains virgin acrylonitrile-styrene copolymer for the measurement of the transmittance of recycled acrylonitrile-styrene copolymer.

The transmittance measurements are made at atmospheric pressure.

In some embodiments, the recycled acrylonitrile butadiene styrene copolymer or recycled acrylonitrile-styrene copolymer is having a transmittance ranging from 85 to 99%; for example, ranging from 90 to 99%.

According to another aspect of the present disclosure, there is also provided a recycled thermoplastic polymer and/or recycled thermoplastic copolymer, wherein the thermoplastic is polyvinyl chloride (PVC) selected from polyvinyl chloride homopolymer and/or polyvinyl chloride copolymer:
  having a transmittance ranging from 80 to 99%; the transmittance being measured in a UV-VIS spectrum at 600 nm at 30° C. on solution comprising the recycled polyvinyl chloride homopolymer and/or the recycled polyvinyl chloride copolymer diluted in chlorobenzene, wherein the content of the recycled polyvinyl chloride homopolymer and recycled polyvinyl chloride copolymer is about 10 wt. % of the total weight of the solution and wherein the reference solution for 100% of transmittance in a UV-VIS spectrum at 600 nm at 30° C. is a solution of virgin polyvinyl chloride homopolymer diluted in chlorobenzene, wherein the content of virgin polyvinyl chloride homopolymer is about 10 wt. % of the total weight of the reference solution; and/or
  comprising a chlorinated aromatic solvent, wherein the total content of chlorinated aromatic solvent is less than 0.1 wt. % based on the total weight of the recycled thermoplastic polymer and/or recycled thermoplastic copolymer; for example, comprising chlorobenzene, wherein the total content of chlorobenzene is less than 0.1 wt. % based on the total weight of the recycled thermoplastic polymer and/or recycled thermoplastic copolymer; and/or
  having a total content of impurities of less than 0.5 wt. % based on the total weight of the recycled thermoplastic copolymer; for example, of less than 0.1 wt. %; and/or
  being produced by the process of the present disclosure.

According to another aspect of the present disclosure, there is also provided a recycled thermoplastic polymer and/or recycled thermoplastic copolymer, wherein the thermoplastic is polyvinyl chloride (PVC) selected from polyvinyl chloride homopolymer and/or polyvinyl chloride copolymer:
  having a transmittance ranging from 80 to 99%; the transmittance being measured in a UV-VIS spectrum at 600 nm at 20° C. on solution comprising the recycled polyvinyl chloride homopolymer and/or the recycled polyvinyl chloride copolymer diluted in tetrahydrofuran, wherein the content of the recycled polyvinyl chloride homopolymer and recycled polyvinyl chloride copolymer is about 10 wt. % of the total weight of the solution and wherein the reference solution for 100% of transmittance in a UV-VIS spectrum at 600 nm at 20° C. under pressure is a solution of virgin polyvinyl chloride homopolymer diluted in tetrahydrofuran, wherein the content of virgin polyvinyl chloride homopolymer is about 10 wt. % of the total weight of the reference solution; and/or
  comprising tetrahydrofuran and/or tetrahydropyran, wherein the total content of tetrahydrofuran and/or tetrahydropyran is less than 0.1 wt. % based on the total weight of the recycled thermoplastic polymer and/or recycled thermoplastic copolymer; for example, comprising tetrahydrofuran, wherein the total content of tetrahydrofuran is less than 0.1 wt. % based on the total weight of the recycled thermoplastic polymer and/or recycled thermoplastic copolymer; and/or having a total content of impurities of less than 0.5 wt. % based on the total weight of the recycled thermoplastic copolymer; for example, of less than 0.1 wt. %; and/or being produced by the process of the present disclosure.

In some embodiments, the recycled polyvinyl chloride homopolymer and/or the recycled polyvinyl chloride copolymer comprises a chlorinated aromatic solvent, wherein the total content of chlorinated aromatic solvent is at least 100 ppm based on the total weight of the recycled polyvinyl chloride homopolymer and/or the recycled polyvinyl chloride copolymer.

In some embodiments, the recycled polyvinyl chloride homopolymer and/or the recycled polyvinyl chloride copolymer comprises chlorobenzene, wherein the total content of chlorobenzene is at least 100 ppm based on the total weight of the recycled polyvinyl chloride homopolymer and/or the recycled polyvinyl chloride copolymer.

In some embodiments, the recycled polyvinyl chloride homopolymer and/or the recycled polyvinyl chloride copolymer comprises tetrahydrofuran and/or tetrahydropyran, wherein the total content of tetrahydrofuran and/or tetrahydropyran is at least 100 ppm based on the total weight of the recycled polyvinyl chloride homopolymer and/or the recycled polyvinyl chloride copolymer.

In some embodiments, the recycled polyvinyl chloride homopolymer and/or the recycled polyvinyl chloride copolymer comprises tetrahydrofuran, wherein the total content of tetrahydrofuran is at least 100 ppm based on the total weight of the recycled polyvinyl chloride homopolymer and/or the recycled polyvinyl chloride copolymer.

It is understood that the presence of traces of the solvents used in the process according to the present disclosure can be a signature that the recycled material has been prepared according to the process of the present disclosure.

It is understood that the pressure conditions are the same for both the reference solution and the recycled material-containing solution.

In some embodiments, the recycled polyvinyl chloride homopolymer and/or the recycled polyvinyl chloride copolymer is having a transmittance ranging from 85 to 99%; for example, ranging from 90 to 99%.

According to another aspect of the present disclosure, there is also provided a use of the recycled thermoplastic polymers and/or recycled thermoplastics copolymers of the present disclosure for preparing a mixture comprising the recycled thermoplastic polymers and/or recycled thermoplastics copolymers and a virgin thermoplastic polymer and/or a virgin thermoplastic copolymer of the same nature. For example, the use of recycled PVC for preparing a mixture comprising recycled PVC and virgin PVC.

In some embodiments, the present disclosure provides the use of the recycled polystyrene copolymers of the present disclosure for preparing a mixture comprising the recycled polystyrene copolymer and a virgin polystyrene and/or a virgin polystyrene copolymer.

According to another aspect of the present disclosure, there is also provided a method of using the recycled polystyrene copolymers of the present disclosure, comprising mixing the recycled polystyrene copolymer with a virgin polystyrene and/or a virgin polystyrene copolymer.

Other features and advantages of the present disclosure will become apparent from the following detailed description. It should be understood, however, that the detailed description and the specific examples while indicating embodiments of the disclosure are given by way of illustration only since various changes and modifications within the spirit and scope of the disclosure will become apparent to those skilled in the art from this detailed description.

DRAWINGS

The present disclosure will now be described in greater detail with reference to the drawings in which.

DESCRIPTION OF VARIOUS EMBODIMENTS

Figure 1:
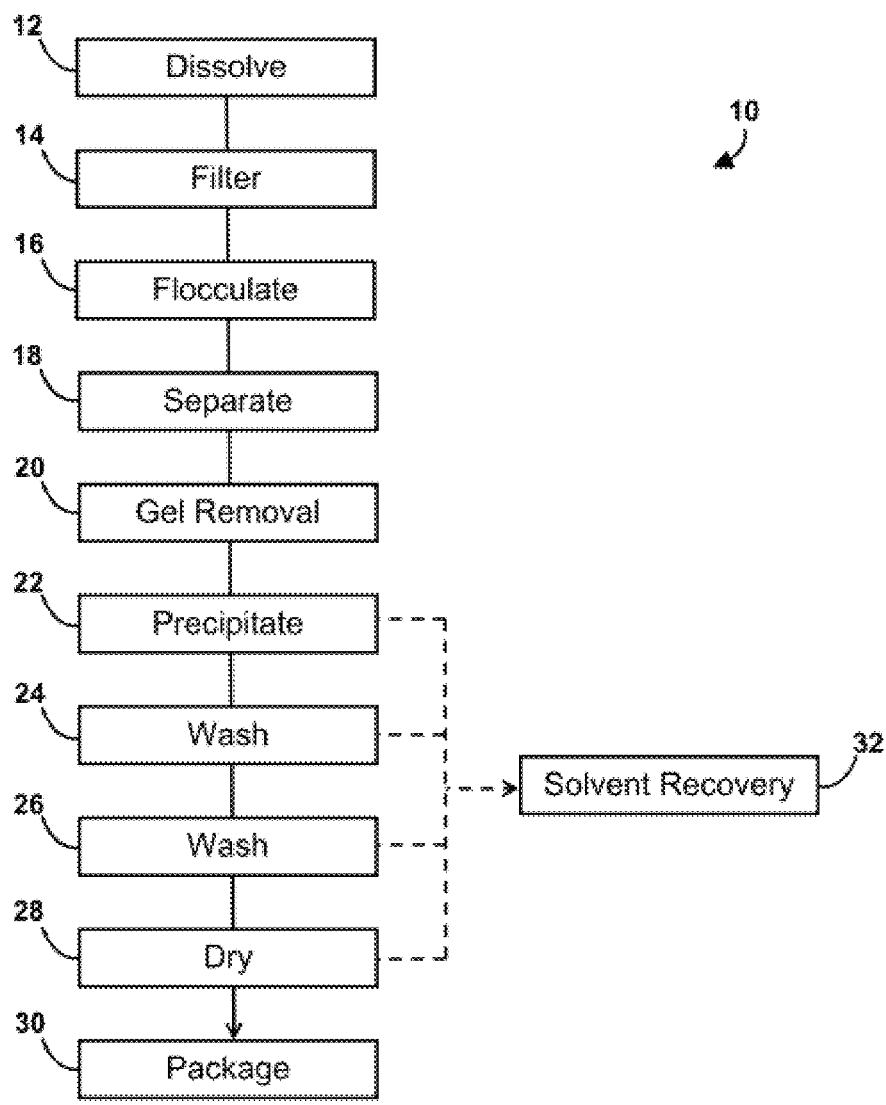
FIG. 1 shows a schematic diagram of a process according to an example of the present disclosure.

Unless otherwise indicated, the definitions and examples described in this and other sections are intended to be applicable to all examples and aspects of the present disclosure herein described for which they are suitable as would be understood by a person skilled in the art.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "and/or" as used herein means that the listed items are present, or used, individually or in combination. In effect, this term means that "at least one of" or "one or more" of the listed items is used or present.

The term "suitable" as used herein means that the selection of specific reagents or conditions will depend on the reaction being performed and the desired results, but nonetheless can generally be made by a person skilled in the art once all relevant information is known.

The term "additive" as used herein refers to chemicals added to a polymer and/or copolymer to modify at least one physical, biological and/or chemical property. Non-limitative examples of additives are coloring agents, fillers, flame retardants, lubricants and plasticizers.

The term "thermoplastic" as used herein in reference to a polymer or a copolymer means, for example, that the polymer or copolymer softens above a particular temperature (for example, a glass transition temperature, Tg) and solidifies upon cooling; that is, it displays thermoreversible behaviour. Examples of thermoplastic polymers can include but are not limited to polyethylene (PE), polypropylene (PP), polyvinyl chloride (PVC), acrylonitrile butadiene styrene copolymer (ABS), acrylonitrile-styrene copolymer (SAN) and polystyrene (PS).

The term "copolymer" as used herein refers, for example, to a polymer derived from more than one species of monomer.

The term "polystyrene copolymer" as used herein refers, for example, to a polymer obtained by polymerization of styrene and at least one additional monomer that is not styrene or at least one reactive polymer such as polybutadiene. For example, the additional monomer can be butadiene or another monomer (such as but not limited to isoprene or isobutylene) that polymerizes to produce a rubber or a combination of monomers such as butadiene and acrylonitrile. The term "polystyrene copolymer" as used herein includes block copolymers (such as but not limited to styrene-butadiene-styrene (SBS) triblock copolymers and Kraton™ triblock polymers as well as higher block copolymers such as pentablock copolymers comprising styrene and another monomer) as well as graft copolymers such as high impact polystyrene (HIPS). It will be appreciated by the person skilled in the art that methods to produce graft copolymers may also produce homopolymers of the monomers used in the process as a byproduct. For example, HIPS may, for example, contain homopolymeric polystyrene and polybutadiene in addition to the branched chains of the polystyrene-polybutadiene graft copolymer. Accordingly, the term "polystyrene copolymer" as used herein includes compositions comprising a polystyrene graft copolymer in combination with homopolymers of one or more of the monomers comprising the polystyrene graft copolymer.

The term "hydrocarbon non-solvent" as used herein refers, for example, to a hydrocarbon-based compound or a mixture thereof in which a thermoplastic polymer or thermoplastic copolymer is substantially insoluble. For example, the term "hydrocarbon polystyrene non-solvent" as used herein refers, for example, to a hydrocarbon-based compound or a mixture thereof in which polystyrene or polystyrene copolymer is substantially insoluble.

The selection of a suitable hydrocarbon non-solvent (e.g. a hydrocarbon polystyrene non-solvent) for the processes of the present disclosure can be made by a person skilled in the art. For example, it will be appreciated by a person skilled in the art that most non-polar additives typically found in polystyrene waste and/or polystyrene copolymer waste (e.g. hexabromocyclododecane and silicone oils) and cymene, xylene, toluene, benzene, ethylbenzene or any combination thereof, should be substantially soluble in the hydrocarbon polystyrene non-solvent under the conditions used in the processes of the present disclosure to obtain precipitated polystyrene and/or precipitated polystyrene copolymer as well as steps which comprise washing with the hydrocarbon polystyrene non-solvent. It will also be appreciated by a person skilled in the art that it may, for example, be useful to select a hydrocarbon polystyrene non-solvent having a boiling point that is around or slightly above the glass transition temperature (Tg) of the polystyrene waste and/or polystyrene copolymer waste being recycled in the processes of the present disclosure. However, it will further be appreciated by the skilled person that a hydrocarbon polystyrene non-solvent with a boiling point lower than the Tg of the polystyrene waste and/or polystyrene copolymer waste being recycled in the processes of the present disclosure can be used as a non-solvent if the pressure of the system is increased to push the boiling point of the hydrocarbon polystyrene non-solvent above the Tg of the polystyrene waste and/or polystyrene copolymer waste. For certain thermoplastic polymers or thermoplastic copolymers such as those comprising polyethylene or polypropylene, the hydrocarbon non-solvent can be the same as the suitable solvent used for dissolving but at a lower temperature.

As used in this disclosure, the singular forms "a", "an" and "the" include plural references unless the content clearly dictates otherwise. For example, an example including "a hydrocarbon polystyrene non-solvent" should be understood to present certain aspects with one hydrocarbon polystyrene non-solvent or two or more additional hydrocarbon polystyrene non-solvents. In examples comprising an "additional" or "second" component, such as an additional or second hydrocarbon polystyrene non-solvent, the second component as used herein is chemically different from the other components or first component. A "third" component is different from the other, first, and second components, and further enumerated or "additional" components are similarly different.

The term "xylene" as used herein includes o-xylene, m-xylene and p-xylene as well as mixtures thereof. For example, xylene can be o-xylene. For example, xylene can be m-xylene. For example, xylene can be p-xylene. For example, xylene can be mixtures of o-xylene, m-xylene and p-xylene.

The term "cymene" as used herein includes o-cymene, m-cymene and p-cymene as well as mixtures thereof. For example, cymene can be o-cymene. For example, cymene can be m-cymene. For example, cymene can be p-cymene. For example, the cymene can be mixtures of o-cymene, m-cymene and p-cymene.

Illustrative embodiments of the present disclosure are set herein below. Each statement and embodiment of the present disclosure so defined may be combined with any other embodiments unless clearly indicated to the contrary. For example, any feature/embodiment may be combined with any other feature or features or embodiments. Hereto, the present disclosure is captured by any one or any combination of one or more of the below numbered aspects and embodiments with any other statement and/or embodiments.

In an embodiment 1, the present disclosure provides a process for recycling waste that is thermoplastic polymer waste and/or thermoplastic copolymer waste, the process comprising:

dissolving the thermoplastic polymer waste and/or thermoplastic copolymer waste in a suitable solvent to obtain a mixture of liquid and solids;

heating the mixture under acidic conditions then cooling the mixture to obtain a supernatant comprising thermoplastic polymer in solution and/or thermoplastic copolymer in solution and a solid waste residue; in some embodiments, heating said mixture under acidic conditions is made in the presence of a reducing agent;

separating the supernatant comprising dissolved thermoplastic polymer and/or dissolved thermoplastic copolymer from the solid waste residue;

optionally treating the supernatant with a filtration aid to remove insoluble gels;

contacting the supernatant comprising dissolved thermoplastic polymer and/or dissolved thermoplastic copolymer with a first portion of non-solvent to obtain precipitated thermoplastic polymer and/or precipitated thermoplastic copolymer and a first portion of waste solution;

separating the precipitated thermoplastic polymer and/or precipitated thermoplastic copolymer from the first portion of waste solution;

washing the precipitated thermoplastic polymer and/or precipitated thermoplastic copolymer with a second portion of non-solvent to obtain a washed thermoplastic polymer and/or washed thermoplastic copolymer and a second portion of waste solution;

separating the washed thermoplastic polymer and/or washed thermoplastic copolymer from the second portion of waste solution;

optionally washing the washed thermoplastic polymer and/or washed thermoplastic copolymer with a third portion of non-solvent to obtain a twice-washed thermoplastic polymer and/or twice-washed thermoplastic copolymer and a third portion of waste solution;

optionally separating the twice-washed thermoplastic polymer and/or twice-washed thermoplastic copolymer from the third portion of waste solution; and optionally drying the washed or twice-washed thermoplastic polymer and/or washed or twice-washed thermoplastic copolymer to obtain dried thermoplastic polymer and/or dried thermoplastic copolymer.

In a further embodiment 2, the present disclosure provides the process according to embodiment 1, wherein the thermoplastic is selected from polyethylene (PE) polypropylene (PP), polyvinyl chloride (PVC), acrylonitrile butadiene styrene copolymer (ABS), acrylonitrile-styrene copolymer (SAN), polystyrene (PS) and blends of polyethylene (PE) and polypropylene (PP).

In a further embodiment 3, the present disclosure provides the process according to embodiment 1 or 2, wherein the process is a process for recycling postindustrial or postconsumer thermoplastic polymer waste that is thermoplastic polymer waste and/or thermoplastic copolymer waste obtained from industrial or domestic polymer waste.

In a further embodiment 4, the present disclosure provides the process according to any one of embodiments 1 to 3, wherein the step of washing the precipitated thermoplastic polymer and/or precipitated thermoplastic copolymer with a second portion of non-solvent to obtain washed thermoplastic polymer and/or washed thermoplastic copolymer and a second portion of waste solution, is selected from batch washing and continuous washing; in some embodiments, said step is a continuous washing.

In a further embodiment 5, the present disclosure provides the process according to any one of embodiments 1 to 4, wherein prior to cooling the mixture to obtain a supernatant comprising thermoplastic polymer in solution and/or thermoplastic copolymer in solution and the solid waste residue, the process further comprises adding a base and heating the mixture under neutral conditions; in some embodiments, the base is calcium hydroxide.

In a further embodiment 6, the present disclosure provides the process according to any one of embodiments 1 to 5, wherein the step of heating the mixture under acidic conditions is performed in the presence of a reducing agent, adding a base and heating the mixture under neutral conditions.

In a further embodiment 7, the present disclosure provides the process according to any one of embodiments 1 to 6, wherein the mixture comprises insoluble material having a particle size of 10 micrometers or greater and said process further comprises filtering said mixture to remove said insoluble material prior to heating said mixture under acidic conditions; for example, a particle size of 5 micrometers or greater; for example, a particle size of 1 micrometer or greater.

In a further embodiment 8, the present disclosure provides the process of embodiment 7, wherein the insoluble material is chosen from dust, sand, dirt, metal, wood, paper, pigment, protein, stickers, and polymers that are insoluble in the suitable solvent.

In a further embodiment 9, the present disclosure provides the process of embodiment 7 or 8 wherein the mixture is filtered through a filter chosen from a metal mesh filter, a polyolefin bag filter, a polyester bag filter, a cloth filter and a paper filter.

In a further embodiment 10, the present disclosure provides the process according to any one of embodiments 1 to 9, wherein the mixture comprises the thermoplastic polymer and/or thermoplastic copolymer in an amount equal to or less than about 50 wt. % based on the total weight of the mixture; for example from about 10 wt. % to about 50 wt. %; for example, in an amount of from about 20 wt. % to about 40 wt. %; for example, in an amount of from about 20 wt. % to about 30 wt. %; for example, in an amount of about 25 wt. %.

In a further embodiment 11, the present disclosure provides the process according to any one of embodiments 1 to 9, wherein the mixture comprises the thermoplastic polymer and/or thermoplastic copolymer in an amount of from about 35 wt. % to about 45 wt. %, based on the total weight of the mixture; in some embodiments, in an of about 40 wt. %.

In a further embodiment 12, the present disclosure provides the process according to any one of embodiments 1 to 11, wherein the mixture comprises thermoplastic polymer and/or thermoplastic copolymer, based on the total weight of said mixture.

In a further embodiment 13, the present disclosure provides the process according to any one of embodiments 1 to 12, wherein the acidic conditions comprise a pH of less than 5; for example, ranging from about 2 to about 5.

In a further embodiment 14, the present disclosure provides the process according to any one of embodiments 1 to 13, wherein the acidic conditions comprise a pH of from about 3.5 to about 4.5, for example, a pH of about 4.

In a further embodiment 15, the present disclosure provides the process according to any one of embodiments 1 to 14, wherein the acidic conditions are obtained by adding a mineral acid, an organic acid or combinations thereof to the mixture; in some embodiments, by adding one or more acid selected from HCl, $H_2SO_4$, acetic acid, formic acid and oxalic acid; for example, by adding formic acid.

In a further embodiment 16, the present disclosure provides the process according to any one of embodiments 1 to 15, wherein the acidic conditions are obtained by adding HCl to the mixture; in some embodiments, the HCl is added to the mixture in the form of a solution in methanol.

In a further embodiment 17, the present disclosure provides the process according to any one of embodiments 1 to 16, wherein the mixture is heated at a temperature of from 60° C. to 160° C.; for example, from 60 to 100° C. or from 110 to 160° C.

In a further embodiment 18, the present disclosure provides the process of any one of embodiments 1 to 17, wherein the mixture is heated at a temperature of about 60° C. to about 70° C. or about 70° C. to about 90° C.

In a further embodiment 19, the present disclosure provides the process of any one of embodiments 1 to 17, wherein the mixture is heated at a temperature of about 80° C.

In a further embodiment 20, the present disclosure provides the process according to any one of embodiments 1 to 19, wherein the mixture is heated for a time of 1 hour to 4 hours or about 2 hours.

In a further embodiment 21, the present disclosure provides the process of any one of embodiments 1 to 20, wherein the mixture is heated while agitating; in some embodiments, the agitating comprises stirring.

In a further embodiment 22, the present disclosure provides the process of any one of embodiments 1 to 21, wherein the reducing agent is a metal that is capable of being oxidized to a divalent or trivalent cation.

In a further embodiment 23, the present disclosure provides the process according to any one of embodiments 1 to 22, the heating of the mixture under acidic conditions being performed in the presence of a reducing agent, the process being wherein the reducing agent is zinc metal, aluminium metal, calcium metal or magnesium metal; in some embodiments, the reducing agent is zinc metal.

In a further embodiment 24, the present disclosure provides the process of any one of embodiments 23 or 24, wherein the reducing agent is added in the form of particles; in some embodiments, the particles are in the form of a powder.

In a further embodiment 25, the present disclosure provides the process according to any one of embodiments 1 to 24, wherein the cooling comprises allowing said mixture to return to ambient temperature and settle for a time to obtain said supernatant and said solid waste residue; in some embodiments, the ambient temperature is from about 15° C. to about 25° C.; for example, the ambient temperature is about 20° C.

In a further embodiment 26, the present disclosure provides the process according to embodiment 25, wherein said time is from about 2 hours to about 24 hours; in some embodiments, the time is from about 6 hours to about 18 hours or about 12 hours.

In a further embodiment 27, the present disclosure provides the process according to any one of embodiments 1 to 26, wherein the supernatant is separated from the solid waste residue by centrifugation, or by decantation, or by filtration; in some embodiments, the supernatant is separated from the solid waste residue by centrifugation.

In a further embodiment 28, the present disclosure provides the process according to any one of embodiments 1 to 27, wherein the supernatant is separated from the solid waste residue by filtration, and the filtration comprises:
treating a filter paper with a solution comprising polyacrylic acid, methanol and water to obtain a modified filter paper; and
filtering said supernatant through said modified filter paper.

In a further embodiment 29, the present disclosure provides the process according to embodiment 28, wherein the supernatant is treated with a filtration aid; in some embodiments, said filtration aid is a calcium, magnesium or aluminium oxide, hydroxide, carbonate or sulfate.

In a further embodiment 30, the present disclosure provides the process according to embodiment 29, wherein the filtration aid is a base; in some embodiments, the base is calcium hydroxide and/or the base is added in solid form.

In a further embodiment 31, the present disclosure provides the process according to embodiment 30, wherein the base is added to the supernatant until a pH of about 9 to about 10 is obtained.

In a further embodiment 32, the present disclosure provides the process of any one of embodiments 29 to 31, wherein the treatment comprises heating the supernatant with the filtration aid while agitating, followed by adding a non-solvent, ceasing the agitating, and allowing the mixture to return to ambient temperature and settle for a time to precipitate the insoluble gel from the supernatant; in some embodiments, adding the non-solvent includes adding said non-solvent to a content of less than 30 wt. % based on the total weight of the mixture comprising said supernatant and said non-solvent.

In a further embodiment 33, the present disclosure provides the process of embodiment 32, wherein the agitation comprises stirring.

In a further embodiment 34, the present disclosure provides the process of embodiment 32 or 33, wherein the supernatant and the filtration aid are heated at a temperature of from about 70° C. to about 100° C.; for example, from about 80° C. to about 90° C.; for example, of about 85° C.

In a further embodiment 35, the present disclosure provides the process of any one of embodiments 32 to 34, wherein the supernatant and the filtration aid are heated for a time of about 30 minutes to about 4 hours; for example for a time of about 1 hour to about 2 hours; in some embodiments for a time of about 90 minutes.

In a further embodiment 36, the present disclosure provides the process of any one of embodiments 32 to 35, wherein the mixture is allowed to settle for a time about 6 hours to about 24 hours; in some embodiments for a time of about 12 hours to about 16 hours.

In a further embodiment 37, the present disclosure provides the process according to any one of embodiments 1 to 36, wherein the supernatant is added to said first portion of non-solvent at the boiling point of said non-solvent and agitated for a time for diffusion of said suitable solvent from the supernatant into the non-solvent to proceed to a sufficient extent.

In a further embodiment 38, the present disclosure provides the process of embodiment 37, wherein the time is from about 5 minutes to about 10 minutes and/or in that the agitating comprises stirring with a mechanical stirrer.

In a further embodiment 39, the present disclosure provides the process of embodiment 37 or 38, wherein the ratio by volume of the first portion of non-solvent to the supernatant is from about 2:1 to about 4:1; in some embodiments, the ratio is about 3:1.

In a further embodiment 40, the present disclosure provides the process according to any one of embodiments 1 to 39, wherein the second portion of non-solvent is added to said precipitated thermoplastic polymer and/or said precipitated thermoplastic copolymer at the boiling point of said non-solvent and agitated for a time for diffusion of said suitable solvent, from the precipitated thermoplastic polymer and/or precipitated thermoplastic copolymer into the non-solvent to proceed to a sufficient extent.

In a further embodiment 41, the present disclosure provides the process according to embodiment 40, wherein the time is from about 1 minute to about 15 minutes, in some embodiments, about 2 minutes to 5 minutes, in some embodiments, about 10 minutes.

In a further embodiment 42, the present disclosure provides the process according to embodiment 40 or 41, wherein the ratio by volume of said second portion of non-solvent to said precipitated thermoplastic polymer and/or precipitated thermoplastic copolymer is from 1:2 to 2:1; for example, the ratio is about 1:1.

In a further embodiment 43, the present disclosure provides the process according to any one of embodiments 1 to 42, wherein said washed thermoplastic polymer and/or washed thermoplastic copolymer is washed with a third portion of non-solvent and said third portion of non-solvent is added to said washed thermoplastic polymer and/or washed thermoplastic copolymer at the boiling point of said non-solvent and agitated for a time for diffusion of said suitable solvent, from the washed thermoplastic polymer and/or washed thermoplastic copolymer into the non-solvent to proceed to a sufficient extent; in some embodiments, the time is from 1 minute to 10 minutes.

In a further embodiment 44, the present disclosure provides the process of embodiment 43, wherein the ratio by volume of said third portion of non-solvent to said washed thermoplastic polymer and/or washed thermoplastic copolymer is from 1:2 to 2:1

In a further embodiment 45, the present disclosure provides the process of any one of embodiments 1 to 44, wherein the washed or twice-washed thermoplastic polymer and/or the washed or twice-washed thermoplastic copolymer is dried for temperature and time for removal of remaining non-solvent to proceed to a sufficient extent; in some embodiments, the drying is carried out at a temperature of from about 75° C. to about 125° C.; for example, of about 100° C.

In a further embodiment 46, the present disclosure provides the process according to any one of embodiments 1 to 45, for recycling waste that is polystyrene waste and/or polystyrene copolymer waste, the process comprising:
  dissolving the polystyrene waste and/or polystyrene copolymer waste in cymene, xylene, toluene, benzene, ethylbenzene or any combination thereof, to obtain a mixture of liquid and solids;
  heating the mixture under acidic conditions, then cooling the mixture to obtain a supernatant comprising polystyrene in solution and/or polystyrene copolymer in solution and a solid waste residue; in some embodiments, heating said mixture under acidic conditions is made in the presence of a reducing agent;
  separating the supernatant comprising dissolved polystyrene and/or dissolved polystyrene copolymer from the solid waste residue;
  optionally treating the supernatant with a filtration aid to remove insoluble gels;
  contacting the supernatant comprising dissolved polystyrene and/or dissolved polystyrene copolymer with a first portion of hydrocarbon polystyrene non-solvent to obtain precipitated polystyrene and/or precipitated polystyrene copolymer and a first portion of hydrocarbon waste solution;
  separating the precipitated polystyrene and/or precipitated polystyrene copolymer from the first portion of hydrocarbon waste solution;
  washing the precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;
  separating the washed polystyrene and/or washed polystyrene copolymer from the second portion of hydrocarbon waste solution;
  optionally washing the washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;
  optionally separating the twice-washed polystyrene and/or twice-washed polystyrene copolymer from the third portion of hydrocarbon waste solution; and
  optionally drying the washed or twice-washed polystyrene and/or washed or twice-washed polystyrene copolymer to obtain dried polystyrene and/or dried polystyrene copolymer.

In a further embodiment 47, the present disclosure provides the process of embodiment 8 and 46, wherein said dissolving is performed at a temperature below 100° C. and wherein the polymers that are insoluble in cymene, xylene, toluene, benzene, ethylbenzene or any combination thereof, are chosen from low-density polyethylene (LDPE), high-density polyethylene (HDPE), polypropylene (PP), polyethylene terephthalate (PET) and polyvinyl chloride (PVC); in some embodiments, said dissolving is performed at a temperature below 90° C.

In a further embodiment 48, the present disclosure provides the process of embodiment 46 or 47, wherein the process is a process for recycling postindustrial or postconsumer polystyrene waste that is polystyrene waste and/or polystyrene copolymer waste obtained from industrial or domestic polymer waste process In a further embodiment 49, the present disclosure provides the process of any one of embodiments 46 to 48, wherein the waste is polystyrene copolymer waste.

In a further embodiment 50, the present disclosure provides the process of any one of embodiments 46 to 48 to, wherein the waste is expanded polystyrene waste, extruded polystyrene waste or a combination thereof.

In a further embodiment 51, the present disclosure provides the process of any one of embodiments 46 or 48, wherein the polystyrene copolymer waste is high impact polystyrene (HIPS) waste, styrene-butadiene block copolymer waste, styrene-butadiene random copolymer waste, Kraton™ waste, or combinations thereof.

In a further embodiment 52, the present disclosure provides the process of embodiment 51, wherein the polystyrene copolymer waste is high impact polystyrene (HIPS) waste.

In a further embodiment 53, the present disclosure provides the process of embodiment 51, wherein the polystyrene copolymer waste is styrene-butadiene block copolymer waste, optionally styrene-butadiene-styrene (SBS) triblock copolymer waste.

In a further embodiment 54, the present disclosure provides the process of embodiment 51, wherein the polystyrene copolymer waste is Kraton™ waste.

In a further embodiment 55, the present disclosure provides the process of embodiment 51, wherein the polystyrene copolymer waste is a combination of two, three or all four of high impact polystyrene (HIPS) waste, styrene-butadiene block copolymer waste, styrene-butadiene random copolymer waste and Kraton™ waste.

In a further embodiment 56, the present disclosure provides the process of any one of embodiments 46 to 55, wherein the dissolving is carried out at a temperature of from about 0° C. to about 100° C.

In a further embodiment 57, the present disclosure provides the process of any one of embodiments 46 to 55, wherein the dissolving is carried out at a temperature of from about 20° C. to about 30° C.

In a further embodiment 58, the present disclosure provides the process of any one of embodiments 46 to 55, wherein the dissolving is carried out at a temperature of from about 60° C. to about 70° C. or about 70° C. to about 90° C.

In a further embodiment 59, the present disclosure provides the process of any one of embodiments 46 to 55, wherein the dissolving is carried out at a temperature of from about 80° C. to about 85° C.

In a further embodiment 60, the present disclosure provides the process according to any one of embodiments 46 to 59, wherein the mixture comprises the polystyrene and/or polystyrene copolymer in an amount equal to or less than about 50 wt. %, based on the total weight of the mixture.

In a further embodiment 61, the present disclosure provides the process of any one of embodiments 46 to 60, wherein the mixture comprises the polystyrene and/or polystyrene copolymer in an amount of from about 10 wt. % to about 50 wt. %, based on the total weight of the mixture.

In a further embodiment 62, the present disclosure provides the process of any one of embodiments 46 to 60, wherein the mixture comprises the polystyrene and/or polystyrene copolymer in an amount of from about 20 wt. % to about 40 wt. %, based on the total weight of the mixture.

In a further embodiment 63, the present disclosure provides the process of any one of embodiments 46 to 60, wherein the mixture comprises the polystyrene and/or polystyrene copolymer in an amount of from about 20 wt. % to about 30 wt. %, based on the total weight of the mixture.

In a further embodiment 64, the present disclosure provides the process of any one of embodiments 46 to 60, wherein the mixture comprises the polystyrene and/or polystyrene copolymer in an amount of about 25 wt. %, based on the total weight of the mixture.

In a further embodiment 65, the present disclosure provides the process of any one of embodiments 46 to 60, wherein the mixture comprises the polystyrene and/or polystyrene copolymer in an amount of from about 35 wt. % to about 45 wt. %, based on the total weight of the mixture.

In a further embodiment 66, the present disclosure provides the process of any one of embodiments 46 to 60, wherein the mixture comprises the thermoplastic polymer and/or thermoplastic copolymer in an amount of about 40 wt. %, based on the total weight of the mixture; for example, the mixture comprises the polystyrene and/or polystyrene copolymer in an amount of about 40 wt. %, based on the total weight of the mixture.

In a further embodiment 67, the present disclosure provides the process of any one of embodiments 46 to 66, wherein the thermoplastic is polystyrene and the polystyrene waste and/or polystyrene copolymer waste is dissolved in cymene; in some embodiments, the cymene is p-cymene.

In a further embodiment 68, the present disclosure provides the process of any one of embodiments 46 to 66, wherein the thermoplastic is polystyrene and the polystyrene waste and/or polystyrene copolymer waste is dissolved in xylene; in some embodiments, the xylene is p-xylene.

In a further embodiment 69, the present disclosure provides the process of any one of embodiments 46 to 66, wherein the thermoplastic is polystyrene and the polystyrene waste and/or polystyrene copolymer waste is dissolved in toluene and/or in benzene.

In a further embodiment 70, the present disclosure provides the process of any one of embodiments 1 to 66, wherein the thermoplastic is polystyrene and the polystyrene waste and/or polystyrene copolymer waste is dissolved in ethylbenzene.

In a further embodiment 71, the present disclosure provides the process of any one of embodiments 46 to 70, wherein the non-solvent is hydrocarbon polystyrene non-solvent, in some embodiments, the hydrocarbon polystyrene non-solvent comprises, consists essentially of or consists of heptane.

In a further embodiment 72, the present disclosure provides the process of any one of embodiments 46 to 71, wherein the supernatant is added to the first portion of hydrocarbon polystyrene non-solvent at the boiling point of the hydrocarbon polystyrene non-solvent and agitated for a time for diffusion of the cymene, xylene, toluene, benzene, ethylbenzene or any combination thereof, from the supernatant into the hydrocarbon polystyrene non-solvent to proceed to a sufficient extent; in some embodiments, the time is from about 5 minutes to about 10 minutes.

In a further embodiment 73, the present disclosure provides the process of embodiment 72, wherein greater than about 90 wt. % of the cymene, xylene, toluene, benzene, ethylbenzene or any combination thereof, in the supernatant diffuses into the hydrocarbon polystyrene non-solvent, based on the total weight of the supernatant.

In a further embodiment 74, the present disclosure provides the process of any one of embodiments 72 or 73, wherein the ratio by volume of the first portion of hydrocarbon polystyrene non-solvent to the supernatant is from about 2:1 to about 4:1; in some embodiments, the ratio is about 3:1.

In a further embodiment 75, the present disclosure provides the process of any one of embodiments 46 to 74, wherein the precipitated polystyrene and/or precipitated polystyrene copolymer is separated from the first portion of hydrocarbon waste solution by a process comprising decanting the first portion of hydrocarbon waste solution from the precipitated polystyrene and/or precipitated polystyrene copolymer.

In a further embodiment 76, the present disclosure provides the process of any one of embodiments 46 to 75, wherein the second portion of hydrocarbon polystyrene non-solvent is added to the precipitated polystyrene and/or the precipitated polystyrene copolymer at the boiling point of the hydrocarbon polystyrene non-solvent and agitated for a time for diffusion of the cymene, xylene, toluene, benzene, ethylbenzene or any combination thereof, from the precipitated polystyrene and/or precipitated polystyrene copolymer into the hydrocarbon polystyrene non-solvent to proceed to a sufficient extent.

In a further embodiment 77, the present disclosure provides the process of embodiment 76, wherein the time is from about 1 minute to about 15 minutes.

In a further embodiment 78, the present disclosure provides the process of embodiment 76, wherein the time is about 10 minutes.

In a further embodiment 79, the present disclosure provides the process of embodiment 76, wherein the time is from about 2 minutes to about 5 minutes.

In a further embodiment 80, the present disclosure provides the process of any one of embodiments 76 to 79, wherein the agitating comprises stirring with a mechanical stirrer.

In a further embodiment 81, the present disclosure provides the process of any one of embodiments 76 to 80, wherein the washed polystyrene and/or washed polystyrene copolymer comprises less than about 0.3 wt. % cymene, xylene, toluene, benzene, ethylbenzene or any combination thereof.

In a further embodiment 82, the present disclosure provides the process of any one of embodiments 76 to 81, wherein the washed polystyrene and/or washed polystyrene copolymer comprises less than about 0.1 wt. % cymene, xylene, toluene, benzene, ethylbenzene or any combination thereof.

In a further embodiment 83, the present disclosure provides the process of any one of embodiments 46 to 82, wherein the ratio by volume of the second portion of hydrocarbon polystyrene non-solvent to the precipitated polystyrene and/or precipitated polystyrene copolymer is from about 1:2 to about 2:1; in some embodiments, the ratio is about 1:1.

In a further embodiment 84, the present disclosure provides the process of any one of embodiments 46 to 83, wherein the washed polystyrene and/or the washed polystyrene copolymer is separated from the second portion of hydrocarbon waste solution by a process comprising decanting the second portion of hydrocarbon waste solution from the washed polystyrene and/or washed polystyrene copolymer.

In a further embodiment 85, the present disclosure provides the process of any one of embodiments 46 to 84, wherein the washed polystyrene and/or washed polystyrene copolymer is washed with a third portion of hydrocarbon polystyrene non-solvent and the third portion of hydrocarbon polystyrene non-solvent is added to the washed polystyrene and/or washed polystyrene copolymer at the boiling point of the hydrocarbon polystyrene non-solvent and agitated for a time for diffusion of the cymene, xylene toluene, benzene, ethylbenzene or any combination thereof, from the washed polystyrene and/or washed polystyrene copolymer into the hydrocarbon polystyrene non-solvent to proceed to a sufficient extent.

In a further embodiment 86, the present disclosure provides the process of embodiment 85, wherein the time is from about 1 minute to about 10 minutes, or is about 5 minutes.

In a further embodiment 87, the present disclosure provides the process of any one of embodiments 85 or 86, wherein the agitating comprises stirring with a mechanical stirrer.

In a further embodiment 88, the present disclosure provides the process of any one of embodiments 46 to 87, wherein the twice-washed polystyrene and/or twice-washed polystyrene copolymer comprises less than about 0.1 wt. % cymene, xylene, toluene, benzene, ethylbenzene or any combination thereof.

In a further embodiment 89, the present disclosure provides the process of any one of embodiments 46 to 87, wherein the twice-washed polystyrene and/or twice-washed polystyrene copolymer comprises less than about 0.05 wt. % cymene, xylene, toluene, benzene, ethylbenzene of any combination thereof.

In a further embodiment 90, the present disclosure provides the process of any one of embodiments 46 to 89, wherein the ratio by volume of the third portion of hydrocarbon polystyrene non-solvent to the washed polystyrene and/or washed polystyrene copolymer is from about 1:2 to about 2:1; in some embodiments, the ratio is about 1:1.

In a further embodiment 91, the present disclosure provides the process of any one of embodiments 46 to 90, wherein the twice-washed polystyrene and/or twice-washed polystyrene copolymer is separated from the third portion of hydrocarbon waste solution by a process comprising decanting the third portion of hydrocarbon waste solution from the twice-washed polystyrene and/or twice-washed polystyrene copolymer.

In a further embodiment 92, the present disclosure provides the process of any one of embodiments 46 to 91, wherein after separating the washed or twice-washed polystyrene and/or washed or twice-washed polystyrene copolymer from the second or third portion of hydrocarbon waste solution and prior to drying, the process further comprises removing surplus hydrocarbon waste solution by wringing and/or compressing the washed or twice-washed polystyrene and/or washed or twice-washed polystyrene copolymer.

In a further embodiment 93, the present disclosure provides the process of any one of embodiments 46 to 92, wherein at least one of the first portion of hydrocarbon polystyrene non-solvent, the second portion of hydrocarbon polystyrene non-solvent and the third portion of hydrocarbon polystyrene non-solvent comprises, consists essentially of or consists of a hydrocarbon polystyrene non-solvent having a boiling point at 1 atm of pressure of from about 98° C. to about 110° C.

In a further embodiment 94, the present disclosure provides the process of any one of embodiments 46 to 93, wherein at least one of the first portion of hydrocarbon polystyrene non-solvent, the second portion of hydrocarbon polystyrene non-solvent and the third portion of hydrocarbon polystyrene non-solvent comprises, consists essentially of or consists of a hydrocarbon polystyrene non-solvent having a boiling point at 1 atm of pressure of from about 105° C. to about 110° C.

In a further embodiment 95, the present disclosure provides the process of any one of embodiments 46 to 94, wherein the first portion of hydrocarbon polystyrene non-solvent, the second portion of hydrocarbon polystyrene non-solvent and the third portion of hydrocarbon polystyrene non-solvent comprise, consist essentially of or consist of a $C_6$-$C_8$ alkane or a petroleum distillate.

In a further embodiment 96, the present disclosure provides the process of any one of embodiments 46 to 94, wherein the first portion of hydrocarbon polystyrene non-solvent, the second portion of hydrocarbon polystyrene non-solvent and the third portion of hydrocarbon polystyrene non-solvent comprise, consist essentially of or consist of a $C_6$-$C_8$ alkane.

In a further embodiment 97, the present disclosure provides the process of any one of embodiments 46 to 94, wherein the first portion of hydrocarbon polystyrene non-solvent, the second portion of hydrocarbon polystyrene non-solvent and the third portion of hydrocarbon polystyrene non-solvent comprise, consist essentially of or consist of a petroleum distillate.

In a further embodiment 98, the present disclosure provides the process of any one of embodiments 46 to 94, wherein the first portion of hydrocarbon polystyrene non-solvent, the second portion of hydrocarbon polystyrene non-solvent and the third portion of hydrocarbon polystyrene non-solvent comprise, consist essentially of or consist of heptane.

In a further embodiment 99, the present disclosure provides the process of any one of embodiments 46 to 98, wherein the first portion of hydrocarbon polystyrene non-solvent, the second portion of hydrocarbon polystyrene non-solvent and the third portion of hydrocarbon polystyrene non-solvent all are the same hydrocarbon polystyrene non-solvent.

In a further embodiment 100, the present disclosure provides the process of any one of embodiments 46 to 98, wherein the first portion of hydrocarbon polystyrene non-solvent, the second portion of hydrocarbon polystyrene non-solvent and the third portion of hydrocarbon polystyrene non-solvent are all different hydrocarbon polystyrene non-solvents.

In a further embodiment 101, the present disclosure provides the process of any one of embodiments 46 to 100, wherein the second portion of hydrocarbon polystyrene non-solvent and the third portion of hydrocarbon polystyrene non-solvent are the same hydrocarbon polystyrene non-solvent and the first portion of hydrocarbon polystyrene non-solvent is a different hydrocarbon polystyrene non-solvent.

In a further embodiment 102, the present disclosure provides the process of embodiment 101, wherein the second portion of hydrocarbon polystyrene non-solvent and the third portion of hydrocarbon polystyrene non-solvent comprise, consist essentially of or consist of heptane and the first portion of hydrocarbon polystyrene non-solvent comprises, consists essentially of or consists of hexane.

In a further embodiment 103, the present disclosure provides the process of any one of embodiments 46 to 102, wherein the washed or twice-washed polystyrene and/or the washed or twice-washed polystyrene copolymer is dried for temperature and time for removal of remaining hydrocarbon polystyrene non-solvent to proceed to a sufficient extent.

In a further embodiment 104, the present disclosure provides the process of embodiment 103, wherein the drying is carried out at a temperature of from about 75° C. to about 125° C.; in some embodiments, the temperature is of about 100° C.

In a further embodiment 105, the present disclosure provides the process of any one of embodiments 46 to 103, wherein the washed or twice-washed polystyrene and/or the washed or twice-washed polystyrene copolymer is dried using an infrared dryer for a time for removal of remaining hydrocarbon polystyrene non-solvent to proceed to a sufficient extent.

In a further embodiment 106, the present disclosure provides the process of any one of embodiments 46 to 103, wherein the washed or twice-washed polystyrene and/or the washed or twice-washed polystyrene copolymer is dried under vacuum for a time for removal of remaining hydrocarbon polystyrene non-solvent to proceed to a sufficient extent.

In a further embodiment 107, the present disclosure provides the process of any one of embodiments 46 to 106, wherein the polystyrene waste and/or polystyrene copolymer waste comprises polar impurities and/or polystyrene copolymer having a polystyrene content lower than about 70 wt. % and the process further comprises washing the polystyrene waste and/or the polystyrene copolymer waste with a polar organic solvent to remove the polar impurities and/or the polystyrene copolymer having a polystyrene content lower than about 70 wt. %.

In a further embodiment 108, the present disclosure provides the process of embodiment 107, wherein the polar organic solvent comprises, consists essentially of or consists of methanol or ethanol.

In a further embodiment 109, the present disclosure provides the process of embodiment 107, wherein the polar organic solvent comprises, consists essentially of or consists of methanol.

In a further embodiment 110, the present disclosure provides the process of embodiment 107, wherein the polar organic solvent comprises, consists essentially of or consists of ethanol.

In a further embodiment 111, the present disclosure provides the process of any one of embodiments 46 to 110, wherein the supernatant comprising polystyrene and/or polystyrene copolymer is added to the first portion of hydrocarbon polystyrene non-solvent.

In a further embodiment 112, the present disclosure provides the process of any one of embodiments 46 to 111, wherein the process further comprises:
contacting a first portion of polar organic solvent with the first portion of hydrocarbon waste solution to obtain a further portion of precipitated polystyrene copolymer and a fourth portion of hydrocarbon waste solution;
separating the further portion of precipitated polystyrene copolymer from the fourth portion of hydrocarbon waste solution;
washing the further portion of precipitated polystyrene copolymer with a second portion of polar organic solvent;
optionally repeating the washing; and
optionally drying the washed further portion of precipitated polystyrene copolymer to obtain a further portion of dried polystyrene copolymer.

In a further embodiment 113, the present disclosure provides the process of embodiment 112, wherein the first portion of polar organic solvent is added to the first portion of hydrocarbon waste solution.

In a further embodiment 114, the present disclosure provides the process of embodiment 112 or 113, wherein the first portion of polar organic solvent and the second portion of polar organic solvent comprise, consist essentially of or consist of an alcohol having one to five carbon atoms, optionally wherein the alcohol having one to five carbon atoms is methanol or ethanol.

In a further embodiment 115, the present disclosure provides the process of embodiment 112 or 113, wherein the first portion of polar organic solvent and the second portion of polar organic solvent comprise, consist essentially of or consist of methanol.

In a further embodiment 116, the present disclosure provides the process of any one of embodiments 112 to 115, wherein the waste comprises polystyrene copolymer waste and the further portion of precipitated polystyrene copolymer comprises a higher ratio of non-polystyrene:polystyrene than the ratio of the non-polystyrene to the polystyrene of the polystyrene copolymer waste.

In a further embodiment 117, the present disclosure provides the process of embodiment 116, wherein the non-polystyrene comprises polybutadiene.

In a further embodiment 118, the present disclosure provides the process of any one of embodiments 112 to 117, wherein the washing is repeated.

In a further embodiment 119, the present disclosure provides the process of any one of embodiments 112 to 118, wherein the washed further portion of polystyrene copolymer is dried for temperature and time for removal of remaining hydrocarbon polystyrene non-solvent and polar organic solvent to proceed to a sufficient extent.

In a further embodiment 120, the present disclosure provides the process of embodiment 119, wherein the drying is carried out at a temperature of from about 75° C. to about 125° C. or about 80° C.

In a further embodiment 121, the present disclosure provides the process of any one of embodiments 112 to 118, wherein the washed further portion of polystyrene copolymer is dried using an infrared dryer for a time for removal of remaining hydrocarbon polystyrene non-solvent and polar organic solvent to proceed to a sufficient extent.

In a further embodiment 122, the present disclosure provides the process of any one of embodiments 112 to 118, wherein the washed further portion of polystyrene copolymer is dried under vacuum for a time for removal of remaining hydrocarbon polystyrene non-solvent and polar organic solvent to proceed to a sufficient extent.

In a further embodiment 123, the present disclosure provides the process of any one of embodiments 46 to 122, wherein the process further comprises distilling the first portion of hydrocarbon waste solution, the second portion of hydrocarbon waste solution, the third portion of hydrocarbon waste solution and/or optionally the fourth portion of hydrocarbon waste solution under conditions to obtain cymene, xylene, toluene, benzene, ethylbenzene or any combination thereof, and/or hydrocarbon polystyrene non-solvent.

In a further embodiment 124, the present disclosure provides the process of embodiment 123, wherein the process further comprises recycling the cymene, xylene, toluene, benzene, ethylbenzene or any combination thereof, for use in the dissolving step.

In a further embodiment 125, the present disclosure provides the process of embodiment 123, wherein the process further comprises recycling the hydrocarbon polystyrene non-solvent for use in the contacting step, the first washing step and/or the second washing step.

In a further embodiment 126, the present disclosure provides the process of any one of embodiments 46 to 125, wherein the process further comprises processing the dried polystyrene and/or dried polystyrene copolymer under conditions to obtain polystyrene pellets and/or polystyrene copolymer pellets.

In a further embodiment 127, the present disclosure provides the process of embodiment 126, wherein the conditions to obtain the polystyrene pellets and/or polystyrene copolymer pellets comprise extruding the dried polystyrene and/or dried polystyrene copolymer at a temperature of from about 140° C. to about 160° C.

In a further embodiment 128, the present disclosure provides the process of embodiment 126 or 127, wherein the process further comprises packaging the polystyrene pellets and/or polystyrene copolymer pellets.

In a further embodiment 129, the present disclosure provides the process of any one of embodiments 46 to 128, wherein the process further comprises grinding the polystyrene waste and/or polystyrene copolymer waste prior to dissolving.

In a further embodiment 130, the present disclosure provides the process of any one of embodiments 1 to 129, wherein the dissolving and heating are carried out sequentially.

In a further embodiment 131, the present disclosure provides the process of any one of embodiments 1 to 130 wherein no filtration is performed wherein the dissolving and heating are carried out simultaneously.

In a further embodiment 132, the present disclosure provides the process of any one of embodiments 46 to 131, wherein the mixture is obtained at a first location and the process further comprises transporting the mixture to a second location wherein subsequent steps in the process are carried out.

In a further embodiment 133, the present disclosure provides the process of any one of embodiments 46 to 131, wherein the polystyrene waste and/or polystyrene copolymer waste is dissolved in the cymene, xylene, toluene, benzene, ethylbenzene or any combination thereof, in a container having a chamber containing the cymene, xylene, toluene, benzene, ethylbenzene or any combination thereof, and at least one opening to the chamber for adding the polystyrene waste and/or polystyrene copolymer waste to the cymene, xylene toluene, benzene, ethylbenzene or any combination thereof, and the process further comprises adding the polystyrene waste and/or polystyrene copolymer waste to the cymene, xylene, toluene, benzene, ethylbenzene or any combination thereof, contained in the chamber, optionally wherein the container further comprises a vent, optionally wherein the container further comprises a means to impel the polystyrene waste and/or polystyrene copolymer waste into the cymene, xylene, toluene, benzene, ethylbenzene or any combination thereof.

In a further embodiment 134, the present disclosure provides the process of embodiment 133, wherein the means to impel comprises a metallic grid inside the container.

In a further embodiment 135, the present disclosure provides the process of any one of embodiments 132 to 134, wherein the container further comprises a means to indicate when the capacity of the chamber has been reached.

In a further embodiment 136, the present disclosure provides the process of embodiment 135, wherein the means to indicate when the capacity of the container has been reached is an indicator light.

In a further embodiment 137, the present disclosure provides the process of embodiment 136, wherein the indicator light is connected to a float switch in the chamber.

In a further embodiment 138, the present disclosure provides the process of any one of embodiments 46 to 137, wherein the contacting and washing are carried out at a temperature of about 80° C. to about 105° C.

In a further embodiment 139, the present disclosure provides the process of any one of embodiments 46 to 138, wherein the contacting and washing are carried out at a temperature of about 85° C. to about 100° C.

In a further embodiment 140, the present disclosure provides the process of embodiment 139, wherein the contacting and washing are carried out at a temperature of about 80° C. to about 90° C. or about 85° C.

In a further embodiment 141, the present disclosure provides a recycled polystyrene and/or recycled polystyrene copolymer prepared according to a process for recycling polystyrene waste and/or polystyrene copolymer waste as defined in any one of embodiments 46 to 140.

In a further embodiment 142, the present disclosure provides a recycled polystyrene copolymer having a total content of additive(s) of less than 0.5 wt. %.

In a further embodiment 143, the present disclosure provides the recycled polystyrene copolymer of embodiment 142, wherein the recycled polystyrene copolymer has a content of additive(s) of less than 0.1 wt. %, or of about 0.07 wt. %.

In a further embodiment 144, the present disclosure provides a recycled polystyrene copolymer comprising cymene, xylene, toluene, benzene or any combination thereof, wherein the total content of cymene, xylene, toluene, benzene or any combination thereof is less than 0.1 wt. % based on the total weight of the recycled polystyrene copolymer; in some embodiments, the recycled polystyrene copolymer is of embodiment 142.

In a further embodiment 145, the present disclosure provides the recycled polystyrene copolymer of any one of embodiments 142 to 144, wherein the recycled polystyrene copolymer has been obtained by recycling a polystyrene copolymer waste by involving treatment with a solvent and a non-solvent.

In a further embodiment 146, the present disclosure provides the recycled polystyrene copolymer of any one of embodiments 142 to 144, wherein the recycled polystyrene copolymer has been obtained by recycling a polystyrene copolymer waste by involving treatment with a solvent that is selected from cymene, xylene, toluene, benzene, ethylbenzene and any combination thereof, and a hydrocarbon polystyrene non-solvent that is $C_6$-$C_8$ alkane or a petroleum distillate.

In a further embodiment 147, the present disclosure provides the recycled polystyrene copolymer of any one of embodiments 142 to 144, wherein the recycled polystyrene copolymer has been obtained by recycling polystyrene copolymer waste by involving treatment with a solvent that is selected from cymene, xylene, toluene, benzene, ethylbenzene and any combination thereof, and a hydrocarbon polystyrene non-solvent that is $C_6$-$C_8$ alkane or mixtures thereof.

In a further embodiment 148, the present disclosure provides the recycled polystyrene copolymer of any one of embodiments 142 to 144, wherein the recycled polystyrene copolymer has been obtained by recycling polystyrene copolymer waste by involving treatment with a solvent that is selected from cymene, xylene, toluene, benzene, ethylbenzene and any combination thereof, and a hydrocarbon polystyrene non-solvent that is hexane.

In a further embodiment 149, the present disclosure provides the recycled polystyrene copolymer of any one of embodiments 142 to 144, wherein the recycled polystyrene copolymer has been obtained by recycling polystyrene copolymer waste by involving treatment with a solvent that is selected from cymene, xylene, toluene, benzene, ethylbenzene and any combination thereof, and a hydrocarbon polystyrene non-solvent that is heptane.

In a further embodiment 150, the present disclosure provides the recycled polystyrene copolymer of any one of embodiments 142 to 144, wherein the recycled polystyrene copolymer has been obtained by recycling polystyrene copolymer waste by involving treatment with a solvent that is selected from cymene, xylene, toluene, benzene, ethylbenzene and any combination thereof, and a hydrocarbon polystyrene non-solvent that is octane.

In a further embodiment 151, the present disclosure provides the recycled polystyrene copolymer of any one of embodiments 145 to 150, wherein the solvent is cymene; in some embodiments, cymene is p-cymene.

In a further embodiment 152, the present disclosure provides the recycled polystyrene copolymer of any one of embodiments 145 to 150, wherein the solvent is xylene; in some embodiments, the xylene is p-xylene In a further embodiment 153, the present disclosure provides the recycled polystyrene copolymer of any one of embodiments 145 to 150, wherein the solvent is toluene and/or benzene.

In a further embodiment 154, the present disclosure provides the recycled polystyrene copolymer of any one of embodiments 145 to 150, wherein the solvent is ethylbenzene.

In a further embodiment 155, the present disclosure provides the e recycled polystyrene copolymer of any one of embodiments 142 to 154, wherein the recycled polystyrene copolymer is white, transparent or clear.

In a further embodiment 156, the present disclosure provides the recycled polystyrene copolymer of any one of embodiments 142 to 154, wherein the recycled polystyrene copolymer is at least substantially transparent.

In a further embodiment 157, the present disclosure provides the recycled polystyrene copolymer of any one of embodiments 142 to 154, wherein the recycled polystyrene copolymer is white.

In a further embodiment 158, the present disclosure provides the recycled polystyrene copolymer of any one of embodiments 142 to 157, wherein the recycled polystyrene copolymer has been obtained by:
  dissolving polystyrene copolymer waste in cymene, xylene, toluene, benzene, ethylbenzene or any combination thereof, to obtain a mixture;
  heating the mixture under acidic conditions in the presence of a reducing agent then cooling the mixture to obtain a supernatant comprising polystyrene copolymer and a solid waste residue;
  separating the supernatant comprising polystyrene copolymer from the solid waste residue;
  optionally treating the supernatant comprising polystyrene copolymer with a filtration aid to remove insoluble gels;
  contacting the supernatant comprising polystyrene copolymer with a first portion of hydrocarbon polystyrene non-solvent to obtain precipitated polystyrene copolymer and a first portion of hydrocarbon waste solution;
  separating the precipitated polystyrene copolymer from the first portion of hydrocarbon waste solution;
  washing the precipitated polystyrene copolymer with a second portion of hydrocarbon polystyrene non-solvent to obtain washed polystyrene copolymer and a second portion of hydrocarbon waste solution;
  separating the washed polystyrene copolymer from the second portion of hydrocarbon waste solution;
  optionally washing the washed polystyrene copolymer with a third portion of hydrocarbon polystyrene non-solvent to obtain twice-washed polystyrene copolymer and a third portion of hydrocarbon waste solution;
  optionally separating the twice-washed polystyrene copolymer from the third portion of hydrocarbon waste solution; and
  optionally drying the washed or twice-washed polystyrene copolymer to obtain dried polystyrene copolymer.

In a further embodiment 159, the present disclosure provides the recycled polystyrene copolymer of any one of embodiments 142 to 157, wherein the recycled polystyrene copolymer has been obtained by:
  dissolving the polystyrene waste and/or polystyrene copolymer waste in cymene, xylene, toluene, benzene, ethylbenzene or any combination thereof, to obtain a mixture;
  heating the mixture under acidic conditions in the presence of a reducing agent, adding a base and heating the mixture under neutral conditions then cooling the mixture to obtain a supernatant comprising polystyrene and/or polystyrene copolymer and a solid waste residue;
  separating the supernatant comprising polystyrene and/or polystyrene copolymer from the solid waste residue;
  optionally treating the supernatant with a filtration aid to remove insoluble gels;
  contacting the supernatant comprising polystyrene and/or polystyrene copolymer with a first portion of hydrocarbon polystyrene non-solvent to obtain precipitated polystyrene and/or precipitated polystyrene copolymer and a first portion of hydrocarbon waste solution;
  separating the precipitated polystyrene and/or precipitated polystyrene copolymer from the first portion of hydrocarbon waste solution;

washing the precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;

separating the washed polystyrene and/or washed polystyrene copolymer from the second portion of hydrocarbon waste solution;

optionally washing the washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;

optionally separating the twice-washed polystyrene and/or twice-washed polystyrene copolymer from the third portion of hydrocarbon waste solution; and optionally drying the washed or twice-washed polystyrene and/or washed or twice-washed polystyrene copolymer to obtain dried polystyrene and/or dried polystyrene copolymer.

In a further embodiment 160, the present disclosure provides the recycled polystyrene copolymer of embodiment 158 or 159, wherein the supernatant comprising polystyrene copolymer is added to the first portion of hydrocarbon polystyrene non-solvent.

In a further embodiment 161, the present disclosure provides the use of the recycled polystyrene copolymer as defined in any one of embodiments 141 to 160, for preparing a mixture comprising the recycled polystyrene copolymer and a virgin polystyrene and/or a virgin polystyrene copolymer.

In a further embodiment 162, the present disclosure provides the use of embodiment 161, wherein the mixture comprises at least about 10 wt. % of the recycled polystyrene copolymer based on the total weight of said mixture; for example at least 15 wt. %, for example, at least 20 wt. %; for example, at least 25 wt. %, for example, at least 30 wt. %; and for example, at least 40 wt. % or at least 50 wt. %, or at least 60 wt. %, or at least 70 wt. %, or at least 80 wt. %.

In a further embodiment 163, the present disclosure provides the use of embodiment 161, wherein the mixture comprises from about 1 wt. % to about 99 wt. % of the recycled polystyrene copolymer based on the total weight of said mixture; for example, from about 10 wt. % to about 95 wt. %; for example, from about 20 wt. % to about 90 wt. %, for example, from about 25 wt. % to about 85 wt. %, for example, from about 30 wt. % to about 80 wt. %.

In a further embodiment 164, the present disclosure provides the use of any one of embodiments 161 to 163, wherein the mixture comprises the recycled polystyrene copolymer and a virgin polystyrene.

In a further embodiment 165, the present disclosure provides the use of any one of embodiments 161 to 163, wherein the mixture comprises the recycled polystyrene copolymer and a virgin polystyrene copolymer.

In a further embodiment 166, the present disclosure provides the use of any one of embodiments 161 to 163, wherein the mixture comprises the recycled polystyrene copolymer, a virgin polystyrene and a virgin polystyrene copolymer.

In a further embodiment 167, the present disclosure provides the method of using the recycled polystyrene copolymer as defined in any one of embodiments 141 to 166, comprising mixing the recycled polystyrene copolymer with a virgin polystyrene and/or a virgin polystyrene copolymer.

In a further embodiment 168, the present disclosure provides the method of embodiment 167, wherein the mixture comprises at least about 10 wt. % of the recycled polystyrene copolymer based on the total weight of said mixture, for example, at least 15 wt. %, for example, at least 20 wt. %; for example, at least 25 wt. %, for example, at least 30 wt. %; for example, at least 40 wt. % or at least 50 wt. %, or at least 60 wt. %, or at least 70 wt. %, or at least 80 wt. %.

In a further embodiment 169, the present disclosure provides the method of embodiment 167, wherein the mixture comprises about 1 wt. % to about 99 wt. % of the recycled polystyrene copolymer based on the total weight of said mixture; for example, from about 10 wt. % to about 95 wt. %; for example, from about 20 wt. % to about 90 wt. %, for example, from about 25 wt. % to about 85 wt. %, for example, from about 30 wt. % to about 80 wt. %.

In a further embodiment 170, the present disclosure provides the method of any one of embodiments 167 to 169, wherein the mixture comprises the recycled polystyrene copolymer and a virgin polystyrene.

In a further embodiment 171, the present disclosure provides the method of any one of embodiments 167 to 169, wherein the mixture comprises the recycled polystyrene copolymer and a virgin polystyrene copolymer.

In a further embodiment 172, the present disclosure provides the method of any one of embodiments 167 to 169, wherein the mixture comprises the recycled polystyrene copolymer, a virgin polystyrene and a virgin polystyrene copolymer.

In a further embodiment 173, the present disclosure provides the recycled polystyrene and/or recycled polystyrene copolymer having a transmittance ranging from 80 to 99%; the transmittance being measured in a UV-VIS spectrum at 600 nm at 20° C. on solution comprising the recycled polystyrene and/or recycled polystyrene copolymer diluted in cymene, wherein the content of recycled polystyrene and/or recycled polystyrene copolymer is 20 wt. % of the total weight of the solution, and wherein the reference solution for 100% of transmittance in a UV-VIS spectrum at 600 nm at 20° C. is a solution of virgin polystyrene homopolymer diluted in cymene, wherein the content of virgin polystyrene is 20 wt. % of the total weight of the reference solution; in some embodiments, the polystyrene and/or recycled polystyrene copolymer is according to any one of embodiments 141 to 160.

In a further embodiment 174, the present disclosure provides the of the recycled polystyrene copolymer as defined in embodiment 173, for preparing a mixture comprising the recycled polystyrene copolymer and a virgin polystyrene and/or a virgin polystyrene copolymer.

In a further embodiment 175, the present disclosure provides the use according to embodiment 174, wherein the mixture comprises at least about 10 wt. % of the recycled polystyrene copolymer based on the total weight of said mixture, for example, at least 15 wt. %, for example, at least 20 wt. %; for example, at least 25 wt. %, for example, at least 30 wt. %; for example, at least 40 wt. % or at least 50 wt. %, or at least 60 wt. %, or at least 70 wt. %, or at least 80 wt. %.

In a further embodiment 176, the present disclosure provides the use according to embodiment 174 or 175, wherein the mixture comprises about 1 wt. % to about 99 wt. % of the recycled polystyrene copolymer based on the total weight of said mixture; for example, from about 10 wt. % to about 95 wt. %; for example, from about 20 wt. % to about 90 wt. %, for example, from about 25 wt. % to about 85 wt. %, and for example, from about 30 wt. % to about 80 wt. %.

In a further embodiment 177, the present disclosure provides the process according to any one of embodiments 1 to 45, for recycling waste that is thermoplastic polymer waste and/or thermoplastic copolymer waste, wherein the thermoplastic is selected from polyethylene (PE), and polypropylene (PP) the process comprising:

dissolving the thermoplastic polymer waste and/or thermoplastic copolymer waste in cymene, xylene, toluene, benzene, ethylbenzene or any combination thereof to obtain a mixture of liquid and solids;

heating the mixture under acidic conditions then cooling the mixture to obtain a supernatant comprising thermoplastic polymer in solution and/or thermoplastic copolymer in solution and a solid waste residue; in some embodiments, heating said mixture under acidic conditions is made in the presence of a reducing agent;

separating the supernatant comprising dissolved thermoplastic polymer and/or dissolved thermoplastic copolymer from the solid waste residue;

optionally treating the supernatant with a filtration aid to remove insoluble gels;

contacting the supernatant comprising dissolved thermoplastic polymer and/or dissolved thermoplastic copolymer with a first portion of alcohol non-solvent to obtain precipitated thermoplastic polymer and/or precipitated thermoplastic copolymer and a first portion of alcohol waste solution;

separating the precipitated thermoplastic polymer and/or precipitated thermoplastic copolymer from the first portion of alcohol waste solution;

washing the precipitated thermoplastic polymer and/or precipitated thermoplastic copolymer with a second portion of alcohol non-solvent to obtain a washed thermoplastic polymer and/or washed thermoplastic copolymer and a second portion of alcohol waste solution;

separating the washed thermoplastic polymer and/or washed thermoplastic copolymer from the second portion of alcohol waste solution;

optionally washing the washed thermoplastic polymer and/or washed thermoplastic copolymer with a third portion of alcohol non-solvent to obtain a twice-washed thermoplastic polymer and/or twice-washed thermoplastic copolymer and a third portion of alcohol waste solution;

optionally separating the twice-washed thermoplastic polymer and/or twice-washed thermoplastic copolymer from the third portion of alcohol waste solution; and optionally drying the washed or twice-washed thermoplastic polymer and/or washed or twice-washed thermoplastic copolymer to obtain dried thermoplastic polymer and/or dried thermoplastic copolymer.

In a further embodiment 178, the present disclosure provides the process of embodiment 177, wherein the process is a process for recycling postindustrial or post-consumer polyethylene waste that is polyethylene waste and/or polyethylene copolymer waste obtained from industrial or domestic polymer waste.

In a further embodiment 179, the present disclosure provides the process of embodiment 177, wherein the process is a process for recycling postindustrial or post-consumer polypropylene waste that is polypropylene waste and/or polypropylene copolymer waste obtained from industrial or domestic polymer waste.

In a further embodiment 180, the present disclosure provides the process of embodiment 177, wherein the process is a process for recycling postindustrial or post-consumer blends of polyethylene and polypropylene waste that are blends of polyethylene and polypropylene waste, wherein the polyethylene and/or the polypropylene can be either homopolymer or copolymer, the blends of polyethylene and polypropylene waste being obtained from industrial or domestic polymer waste.

In a further embodiment 181, the present disclosure provides the process of embodiment 177, wherein the process is a process for recycling postindustrial or post-consumer waste that is a blend of polyethylene and polypropylene waste obtained from industrial or domestic polymer waste.

In a further embodiment 182, the present disclosure provides the process of any one of embodiments 177 to 181, wherein the step of dissolving the thermoplastic waste and/or thermoplastic copolymer waste is performed in cymene, xylene, ethylbenzene, or any combination thereof; for example, in cymene, xylene or ethylbenzene; for example, in xylene and/or ethylbenzene; or in a mixture of benzene, toluene and xylene.

In a further embodiment 183, the present disclosure provides the process of any one of embodiments 177 to 182, wherein the dissolving is carried out at a temperature of at least 130° C.; in some embodiments, the temperature is ranging from about 130° C. to about 160° C.

In a further embodiment 184, the present disclosure provides the process of any one of embodiments 177 to 183, wherein the alcohol non-solvent to obtain precipitated thermoplastic polymer and/or precipitated thermoplastic copolymer is one or more alcohol; in some embodiments, the one or more alcohol is selected from methanol and ethanol; for example, the one or more alcohol is methanol.

In a further embodiment 185, the present disclosure provides the process of any one of embodiments 177 to 184, wherein the washed thermoplastic polymer and/or washed thermoplastic copolymer comprises less than about 0.3 wt. % cymene, xylene, toluene, benzene, ethylbenzene or any combination thereof, and/or wherein the twice-washed thermoplastic polymer and/or twice-washed thermoplastic copolymer comprises less than about 0.1 wt. % cymene, xylene, toluene, benzene, ethylbenzene or any combination thereof.

In a further embodiment 186, the present disclosure provides the process of any one of embodiments 177 to 185, wherein at least one of the first portion of alcohol non-solvent, said second portion of alcohol non-solvent and said third portion of alcohol non-solvent comprises, consists essentially of or consists of a alcohol non-solvent having a boiling point at 1 atm of pressure of from about 55° C. to about 95° C.; in some embodiments, having a boiling point at 1 atm of pressure of from about 60° C. to about 80° C.

In a further embodiment 187, the present disclosure provides the process according to any one of embodiments 1 to 45, for recycling waste that is acrylonitrile butadiene styrene copolymer (ABS) waste or acrylonitrile-styrene copolymer (SAN) waste, the process comprising:

dissolving the acrylonitrile butadiene styrene copolymer (ABS) waste or acrylonitrile-styrene copolymer (SAN) waste in one or more chlorinated solvent to obtain a mixture of liquid and solids; in some embodiments, the one or more chlorinated solvent is selected from chlorinated methane and/or chlorinated ethane; for example, the one or more chlorinated solvent is dichloroethane.

heating the mixture under acidic conditions then cooling the mixture to obtain a supernatant comprising acrylonitrile butadiene styrene copolymer in solution or acrylonitrile-styrene copolymer in solution and a solid waste residue; in some embodiments, heating said mixture under acidic conditions is made in the presence of a reducing agent;

separating the supernatant comprising dissolved acrylonitrile butadiene styrene copolymer or dissolved acrylonitrile-styrene copolymer from the solid waste residue;

optionally treating the supernatant with a filtration aid to remove insoluble gels;

contacting the supernatant comprising dissolved acrylonitrile butadiene styrene copolymer or dissolved acrylonitrile-styrene copolymer with a first portion of alcohol non-solvent to obtain precipitated acrylonitrile butadiene styrene copolymer or precipitated acrylonitrile-styrene copolymer and a first portion of alcohol waste solution;

separating the precipitated acrylonitrile butadiene styrene copolymer or precipitated acrylonitrile-styrene copolymer from the first portion of alcohol waste solution;

washing the precipitated acrylonitrile butadiene styrene copolymer or precipitated acrylonitrile-styrene copolymer with a second portion of alcohol non-solvent to obtain a washed acrylonitrile butadiene styrene copolymer or washed acrylonitrile-styrene copolymer and a second portion of alcohol waste solution;

separating the washed acrylonitrile butadiene styrene copolymer or washed acrylonitrile-styrene copolymer from the second portion of alcohol waste solution;

optionally washing the washed acrylonitrile butadiene styrene copolymer or washed acrylonitrile-styrene copolymer with a third portion of alcohol non-solvent to obtain a twice-washed acrylonitrile butadiene styrene copolymer or twice-washed acrylonitrile-styrene copolymer and a third portion of alcohol waste solution;

optionally separating the twice-washed acrylonitrile butadiene styrene copolymer or twice-washed acrylonitrile-styrene copolymer from the third portion of alcohol waste solution; and optionally drying the washed or twice-washed acrylonitrile butadiene styrene copolymer or washed or twice-washed acrylonitrile-styrene copolymer to obtain dried acrylonitrile butadiene styrene copolymer or dried acrylonitrile-styrene copolymer.

In a further embodiment 188, the present disclosure provides the process of embodiment 187, wherein the process is a process for recycling postindustrial or post-consumer acrylonitrile butadiene styrene copolymer waste or acrylonitrile-styrene copolymer waste that is acrylonitrile butadiene styrene copolymer waste or acrylonitrile-styrene copolymer waste obtained from industrial or domestic polymer waste.

In a further embodiment 189, the present disclosure provides the process of embodiment 187 or 188, wherein the dissolving is carried out at a temperature of at least 60° C.; in some embodiments, the temperature is ranging from about 60° C. to 100° C.; for example, from about 60° C. to about 90° C.

In a further embodiment 190, the present disclosure provides the process according to any one of embodiments 187 to 189, wherein the alcohol non-solvent to obtain precipitated acrylonitrile butadiene styrene copolymer polymer or precipitated acrylonitrile-styrene copolymer is one or more alcohol; in some embodiments, the one or more alcohol is selected from methanol and/or ethanol; for example, the one or more alcohol is methanol.

In a further embodiment 191, the present disclosure provides the process according to any one of embodiments 187 to 190, wherein prior to cooling the mixture to obtain a supernatant comprising acrylonitrile butadiene styrene copolymer or acrylonitrile-styrene copolymer and the solid waste residue, the process further comprises adding a base and heating the mixture under neutral conditions. In some embodiments, the base is calcium hydroxide.

In a further embodiment 192, the present disclosure provides the process according to any one of embodiments 187 to 191, wherein the step of heating the mixture comprises heating the mixture under acidic conditions is performed in the presence of a reducing agent, adding a base and heating the mixture under neutral conditions.

In a further embodiment 193, the present disclosure provides process according to any one of embodiments 1 to 45, for recycling waste that is polyvinyl chloride (PVC) waste and is selected from polyvinyl chloride homopolymer waste and polyvinyl chloride copolymer waste, the process comprising:

dissolving the polyvinyl chloride homopolymer waste and/or polyvinyl chloride copolymer waste in one or more chlorinated solvent to obtain a mixture of liquid and solids; in some embodiments, the one or more chlorinated solvent is selected from a chlorinated aromatic solvent; in some embodiments, the one or more chlorinated solvent is chlorobenzene.

heating the mixture under acidic conditions then cooling the mixture to obtain a supernatant comprising polyvinyl chloride homopolymer in solution and/or polyvinyl chloride copolymer in solution and a solid waste residue; in some embodiments, heating said mixture under acidic conditions is made in the presence of a reducing agent;

separating the supernatant comprising dissolved polyvinyl chloride homopolymer and/or dissolved polyvinyl chloride copolymer from the solid waste residue;

optionally treating the supernatant with a filtration aid to remove insoluble gels;

contacting the supernatant comprising dissolved polyvinyl chloride homopolymer and/or dissolved polyvinyl chloride copolymer with a first portion of alcohol non-solvent to obtain precipitated polyvinyl chloride homopolymer and/or precipitated polyvinyl chloride copolymer and a first portion of alcohol waste solution;

separating the precipitated polyvinyl chloride homopolymer and/or precipitated polyvinyl chloride copolymer from the first portion of alcohol waste solution;

washing the precipitated polyvinyl chloride homopolymer and/or precipitated polyvinyl chloride copolymer with a second portion of alcohol non-solvent to obtain a washed polyvinyl chloride homopolymer and/or washed polyvinyl chloride copolymer and a second portion of alcohol waste solution;

separating the washed polyvinyl chloride homopolymer and/or washed polyvinyl chloride copolymer from the second portion of alcohol waste solution;

optionally washing the washed polyvinyl chloride homopolymer and/or washed polyvinyl chloride copolymer with a third portion of alcohol non-solvent to obtain a twice-washed polyvinyl chloride homopolymer and/or twice-washed polyvinyl chloride copolymer and a third portion of alcohol waste solution;

optionally separating the twice-washed polyvinyl chloride homopolymer and/or twice-washed polyvinyl chloride copolymer from the third portion of alcohol waste solution; and optionally drying the washed or twice-washed polyvinyl chloride homopolymer and/or washed or twice-washed polyvinyl chloride copolymer to obtain dried polyvinyl chloride homopolymer and/or dried polyvinyl chloride copolymer.

In a further embodiment 194, the present disclosure provides process according to any one of embodiments 1 to 45, for recycling waste that is polyvinyl chloride (PVC) waste and is selected from polyvinyl chloride homopolymer waste and polyvinyl chloride copolymer waste, the process comprising:

dissolving the polyvinyl chloride homopolymer waste and/or polyvinyl chloride copolymer waste in one or more cyclic ether solvent to obtain a mixture of liquid and solids; in some embodiments, the one or more cyclic ether solvent is selected from tetrahydrofuran and tetrahydropyran; in some embodiments, the one or more chlorinated solvent is tetrahydrofuran.

heating the mixture under acidic conditions then cooling the mixture to obtain a supernatant comprising polyvinyl chloride homopolymer in solution and/or polyvinyl chloride copolymer in solution and a solid waste residue; in some embodiments, heating said mixture under acidic conditions is made in the presence of a reducing agent;

separating the supernatant comprising dissolved polyvinyl chloride homopolymer and/or dissolved polyvinyl chloride copolymer from the solid waste residue;

optionally treating the supernatant with a filtration aid to remove insoluble gels;

contacting the supernatant comprising dissolved polyvinyl chloride homopolymer and/or dissolved polyvinyl chloride copolymer with a first portion of alcohol non-solvent to obtain precipitated polyvinyl chloride homopolymer and/or precipitated polyvinyl chloride copolymer and a first portion of alcohol waste solution;

separating the precipitated polyvinyl chloride homopolymer and/or precipitated polyvinyl chloride copolymer from the first portion of alcohol waste solution;

washing the precipitated polyvinyl chloride homopolymer and/or precipitated polyvinyl chloride copolymer with a second portion of alcohol non-solvent to obtain a washed polyvinyl chloride homopolymer and/or washed polyvinyl chloride copolymer and a second portion of alcohol waste solution;

separating the washed polyvinyl chloride homopolymer and/or washed polyvinyl chloride copolymer from the second portion of alcohol waste solution;

optionally washing the washed polyvinyl chloride homopolymer and/or washed polyvinyl chloride copolymer with a third portion of alcohol non-solvent to obtain a twice-washed polyvinyl chloride homopolymer and/or twice-washed polyvinyl chloride copolymer and a third portion of alcohol waste solution;

optionally separating the twice-washed polyvinyl chloride homopolymer and/or twice-washed polyvinyl chloride copolymer from the third portion of alcohol waste solution; and optionally drying the washed or twice-washed polyvinyl chloride homopolymer and/or washed or twice-washed polyvinyl chloride copolymer to obtain dried polyvinyl chloride homopolymer and/or dried polyvinyl chloride copolymer.

In a further embodiment 195, the present disclosure provides the process of embodiment 193 or 194, wherein the process is a process for recycling postindustrial or postconsumer polyvinyl chloride homopolymer waste and/or polyvinyl chloride copolymer waste that is polyvinyl chloride homopolymer waste and/or polyvinyl chloride copolymer waste obtained from industrial or domestic polymer waste.

In a further embodiment 196, the present disclosure provides the process of embodiment 193, wherein the dissolving is carried out at a temperature of at least 110° C.; in some embodiments, ranging from about 110° C. to 160° C.; for example, from about 120° C. to about 160° C.

In a further embodiment 197, the present disclosure provides the process of embodiment 194, wherein the dissolving is carried out at a temperature of at least 50° C.; in some embodiments, ranging from about 50° C. to 100° C.; for example, from about 60° C. to about 90° C.

In a further embodiment 198, the present disclosure provides the process according to any one of embodiments 193 to 197, wherein the alcohol non-solvent to obtain precipitated polyvinyl chloride homopolymer and/or precipitated polyvinyl chloride copolymer is one or more alcohol; in some embodiments, the one or more alcohol is selected from methanol and ethanol; for example, the one or more alcohol is methanol.

In a further embodiment 199, the present disclosure provides the process according to any one of embodiments 193 to 198, wherein prior to cooling the mixture to obtain a supernatant comprising polyvinyl chloride homopolymer and/or polyvinyl chloride copolymer and the solid waste residue, the process further comprises adding a base and heating the mixture under neutral conditions; in some embodiments, the base is calcium hydroxide.

In a further embodiment 200, the present disclosure provides the process according to any one of embodiments 193 to 199, wherein the step of heating the mixture comprises heating the mixture under acidic conditions is performed in the presence of a reducing agent, adding a base and heating the mixture under neutral conditions.

In a further embodiment 201, the present disclosure provides a recycled thermoplastic polymer and/or recycled thermoplastic copolymer prepared according to the process of embodiments 1 to 45 or 177 to 200, process for recycling thermoplastic polymer waste and/or thermoplastic copolymer waste.

In a further embodiment 202, the present disclosure provides a recycled thermoplastic polymer and/or recycled thermoplastic copolymer, wherein the thermoplastic is selected from polyethylene (PE) and polypropylene (PP):

having a transmittance ranging from 80 to 99%; the transmittance being measured in a UV-VIS spectrum at 600 nm at 130° C. on solution comprising the recycled polyethylene and/or recycled polypropylene diluted in cymene, wherein the content of the recycled polyethylene and recycled polypropylene is 5 or 10 wt. % of the total weight of the solution and wherein the reference solution for 100% of transmittance in a UV-VIS spectrum at 600 nm at 130° C. is a solution of virgin ethylene homopolymer and/or virgin propylene homopolymer diluted in cymene, wherein the total content of virgin ethylene homopolymer and virgin propylene homopolymer is 5 or 10 wt. % of the total weight of the reference solution; and/or comprising cymene, xylene, toluene, benzene, ethylbenzene or any combination thereof, wherein the total content of cymene, xylene, toluene, benzene, ethylbenzene or any combination thereof is less than about 0.1 wt. % based on the total weight of the recycled thermoplastic polymer and/or recycled thermoplastic copolymer; and/or having a total content of impurities of less than 0.5 wt. % based on the total weight of the recycled thermoplastic polymer and/or recycled thermoplastic copolymer; for example, of less than 0.1 wt. %; and/or being produced by the process according to any one of the embodiments 177 to 186.

In a further embodiment 203, the present disclosure provides a recycled thermoplastic copolymer, wherein the thermoplastic is selected from acrylonitrile butadiene styrene copolymer (ABS) and acrylonitrile-styrene copolymer (SAN):

having a transmittance ranging from 80 to 99%; the transmittance being measured in a UV-VIS spectrum at 600 nm at 20° C. on solution comprising the recycled acrylonitrile butadiene styrene copolymer or recycled acrylonitrile-styrene copolymer diluted in dichloroethane, wherein the content of the recycled acrylonitrile butadiene styrene copolymer or recycled acrylonitrile-styrene copolymer is 20 wt. % of the total weight of the solution and wherein the reference solution for 100% of transmittance in a UV-VIS spectrum at 600 nm at 20° C. is a solution of virgin acrylonitrile butadiene styrene copolymer or virgin acrylonitrile-styrene copolymer diluted in dichloroethane, wherein the content of virgin acrylonitrile butadiene styrene copolymer or virgin acrylonitrile-styrene copolymer is 20 wt. % of the total weight of the reference solution; and/or comprising chlorinated methane and/or chlorinated ethane, wherein the total content of chlorinated methane and chlorinated ethane is less than about 0.1 wt. % based on the total weight of the recycled thermoplastic copolymer; in some embodiments, comprising dichloroethane, wherein the total content of dichloroethane is less than about 0.1 wt. % based on the total weight of the recycled thermoplastic copolymer; and/or having a total content of impurities of less than 0.5 wt. % based on the total weight of the recycled thermoplastic copolymer; for example, of less than 0.1 wt. %; and/or being produced by the process according to any one of embodiments 187 to 192.

In a further embodiment 204, the present disclosure provides a recycled thermoplastic polymer and/or recycled thermoplastic copolymer, wherein the thermoplastic is polyvinyl chloride (PVC) selected from polyvinyl chloride homopolymer and polyvinyl chloride copolymer:

having a transmittance ranging from 80 to 99%; the transmittance being measured in a UV-VIS spectrum at 600 nm at 30° C. on solution comprising the recycled polyvinyl chloride homopolymer and/or the recycled polyvinyl chloride copolymer diluted in chlorobenzene, wherein the content of the recycled polyvinyl chloride homopolymer and recycled polyvinyl chloride copolymer is 10 wt. % of the total weight of the solution and wherein the reference solution for 100% of transmittance in a UV-VIS spectrum at 600 nm at 30° C. is a solution of virgin polyvinyl chloride homopolymer diluted in chlorobenzene, wherein the content of virgin polyvinyl chloride homopolymer is 10 wt. % of the total weight of the reference solution; and/or comprising chlorinated methane and/or chlorinated ethane, wherein the total content of chlorinated aromatic solvent is less than about 0.1 wt. % based on the total weight of the recycled thermoplastic polymer and/or recycled thermoplastic copolymer; in some embodiments, comprising chlorobenzene, wherein the total content of chlorobenzene is less than about 0.1 wt. % based on the total weight of the recycled thermoplastic polymer and/or recycled thermoplastic copolymer; and/or having a total content of impurities of less than 0.5 wt. % based on the total weight of the recycled thermoplastic copolymer; for example, of less than 0.1 wt. %; and/or being produced by the process according to the first and/or to any one of embodiments 193 to 200.

In a further embodiment 205, the present disclosure provides a recycled thermoplastic polymer and/or recycled thermoplastic copolymer, wherein the thermoplastic is polyvinyl chloride (PVC) selected from polyvinyl chloride homopolymer and polyvinyl chloride copolymer:

having a transmittance ranging from 80 to 99%; the transmittance being measured in a UV-VIS spectrum at 600 nm at 20° C. under pressure on solution comprising the recycled polyvinyl chloride homopolymer and/or the recycled polyvinyl chloride copolymer diluted in tetrahydrofuran, wherein the content of the recycled polyvinyl chloride homopolymer and recycled polyvinyl chloride copolymer is 10 wt. % of the total weight of the solution and wherein the reference solution for 100% of transmittance in a UV-VIS spectrum at 600 nm at 20° C. under pressure is a solution of virgin polyvinyl chloride homopolymer diluted in tetrahydrofuran, wherein the content of virgin polyvinyl chloride homopolymer is 10 wt. % of the total weight of the reference solution; and/or comprising tetrahydrofuran and/or tetrahydropyran, wherein the total content of tetrahydrofuran and/or tetrahydropyran is less than about 0.1 wt. % based on the total weight of the recycled thermoplastic polymer and/or recycled thermoplastic copolymer; in some embodiments, comprising tetrahydrofuran, wherein the total content of tetrahydrofuran is less than about 0.1 wt. % based on the total weight of the recycled thermoplastic polymer and/or recycled thermoplastic copolymer; and/or having a total content of impurities of less than 0.5 wt. % based on the total weight of the recycled thermoplastic copolymer; for example, of less than 0.1 wt. %; and/or being produced by the process according to the first and/or to any one of embodiments 193 to 200.

In a further embodiment 206, the present disclosure provides the use of the recycled thermoplastic polymers and/or recycled thermoplastics copolymers of any one of embodiments 201 to 205 for preparing a mixture comprising the recycled thermoplastic polymers and/or recycled thermoplastics copolymers and a virgin thermoplastic polymer and/or a virgin thermoplastic copolymer of the same nature.

In a further embodiment 207, the present disclosure provides the use according to embodiment 206, wherein the mixture comprises at least about 10 wt. % of the recycled the recycled thermoplastic polymers and/or recycled thermoplastics copolymers based on the total weight of said mixture, for example, at least 15 wt. %, at least 20 wt. %; at least 25 wt. %, at least 30 wt. %; for example, at least 40 wt. % or at least 50 wt. %, or at least 60 wt. %, or at least 70 wt. %, or at least 80 wt. %.

In a further embodiment 208, the present disclosure provides the use according to embodiment 206 or 207, wherein the mixture comprises about 1 wt. % to about 99 wt. % of the recycled thermoplastic polymers and/or recycled thermoplastics copolymers based on the total weight of said mixture; for example from about 10 wt. % to about 95 wt. %; for example from about 20 wt. % to about 90 wt. %, for example from about 25 wt. % to about 85 wt. %, for example from about 30 wt. % to about 80 wt. %.

The below-presented examples are non-limitative and are used to better exemplify the processes of the present disclosure.

An exemplary process flow diagram for a process of the present disclosure is shown in FIG. 1.

The exemplified process 10 is a process for recycling waste that is polystyrene waste and/or polystyrene copolymer waste, however, the person skilled in the art will adapt this exemplified process to the other thermoplastics in accordance to the present disclosure without any difficulty. Referring to FIG. 1, in the exemplified process 10, polystyrene waste can be dissolved 12 in cymene, xylene, toluene, benzene, ethylbenzene or any combination thereof, to obtain a mixture. If, for example, the mixture comprises insoluble material having a particle size of 10 micrometers or greater, or a particle size of 5 micrometers or greater, or a particle size of 1 micrometer or greater, the mixture can then optionally be filtered 14 under conditions to remove the insoluble material. The mixture is then heated under acidic conditions optionally, in the presence of a reducing agent, and then cooled to obtain a supernatant comprising polystyrene in solution (i.e. dissolved polystyrene) and/or polystyrene copolymer in solution (i.e. dissolved polystyrene copolymer) and a flocculated 16 solid waste residue.

In some examples of the present application, the process can further comprise adding a base and heating the mixture under neutral conditions prior to cooling. The process then comprises separating 18 the supernatant comprising polystyrene and/or polystyrene copolymer from the solid waste residue. The process can optionally comprise treating the supernatant with a filtration aid to remove insoluble gels 20. The supernatant can then be contacted with (e.g. added to) 22 a first portion of hydrocarbon polystyrene non-solvent to obtain precipitated polystyrene and/or precipitated polystyrene copolymer and a first portion of hydrocarbon waste solution. The precipitated polystyrene and/or precipitated polystyrene copolymer can then be separated from the first portion of hydrocarbon waste solution (not shown). Then, the precipitated polystyrene and/or precipitated polystyrene copolymer can be washed 24 with a second portion of hydrocarbon polystyrene non-solvent to obtain washed polystyrene and/or washed polystyrene copolymer and a second portion of hydrocarbon waste solution. The washed polystyrene and/or washed polystyrene copolymer can then be separated from the second portion of hydrocarbon waste solution (not shown). The washed polystyrene and/or washed polystyrene copolymer can then optionally be washed 26 with a third portion of hydrocarbon polystyrene non-solvent to obtain twice-washed polystyrene and/or twice-washed polystyrene copolymer and a third portion of hydrocarbon waste solution. The twice-washed polystyrene and/or twice-washed polystyrene copolymer can then be separated from the third portion of hydrocarbon waste solution. Surplus hydrocarbon waste solution can then optionally be removed by wringing and/or compressing the washed (or twice-washed) polystyrene and/or washed (or twice-washed) polystyrene copolymer. The washed (or twice-washed) polystyrene and/or washed (or twice-washed) polystyrene copolymer can then optionally be dried 28 to obtain dried polystyrene and/or dried polystyrene copolymer. The dried polystyrene and/or dried polystyrene copolymer can then optionally be packaged 30, for example, the process can further comprise processing the dried polystyrene and/or dried polystyrene copolymer to obtain polystyrene pellets and/or polystyrene copolymer pellets and the polystyrene pellets and/or polystyrene copolymer pellets can be packaged 30. The cymene, xylene, toluene, benzene, ethylbenzene or any combination thereof, and/or the hydrocarbon polystyrene non-solvent can optionally be recovered 32, for example by a process comprising distilling the first portion of hydrocarbon waste solution, the second portion of hydrocarbon waste solution and/or the third portion of hydrocarbon waste solution to obtain cymene, xylene, toluene, benzene, ethylbenzene or any combination thereof, and/or hydrocarbon polystyrene non-solvent. The cymene, xylene, toluene, benzene, ethylbenzene or any combination thereof, can optionally be recycled for use in the dissolving 12. The hydrocarbon polystyrene non-solvent can optionally be recycled for use in the precipitating 22, the first washing 24 and/or the second washing 26.

For example, prior to cooling the mixture to obtain the supernatant comprising dissolved polystyrene and/or dissolved polystyrene copolymer and the solid waste residue, the process can further comprise adding a base and heating the mixture under neutral conditions. The base is any suitable base and can be selected by the person skilled in the art. For example, the base can be calcium hydroxide.

For example, the mixture can comprise insoluble material having a particle size of 10 micrometers or greater and the process can further comprise filtering the mixture to remove the insoluble material prior to heating the mixture under acidic conditions; in some embodiments, the insoluble material has a particle size of 5 micrometers or greater; for example, a particle size of 1 micrometer or greater. For example, the insoluble material can be chosen from dust, sand, dirt, metal, wood, paper, pigment, protein, stickers, polymers that are insoluble in cymene, xylene, toluene, benzene, ethylbenzene or any combination thereof. For example, the polymers that are insoluble in cymene, xylene, toluene, benzene, ethylbenzene or any combination thereof wherein the dissolving temperature is less than 100° C., for example, less than 90° C., can be chosen from low-density polyethylene (LDPE), high-density polyethylene (HDPE), polypropylene (PP), polyethylene terephthalate (PET) and polyvinyl chloride (PVC).

For example, the supernatant comprising dissolved polystyrene and/or dissolved polystyrene copolymer can be added to the first portion of hydrocarbon polystyrene non-solvent (i.e. the contacting comprises adding the supernatant comprising polystyrene and/or polystyrene copolymer to the first portion of hydrocarbon polystyrene non-solvent). For example, the supernatant comprising thermoplastic polymer and/or thermoplastic copolymer can be added to the first portion of hydrocarbon non-solvent (i.e. the contacting comprises adding the supernatant comprising thermoplastic polymer and/or thermoplastic copolymer to the first portion of hydrocarbon non-solvent).

The mixture can be filtered through any suitable filter, the selection of which can be made by a person skilled in the art. For example, the mixture can be filtered through a filter chosen from a metal mesh filter, a polyolefin bag filter, a polyester bag filter, a cloth filter and a paper filter.

The waste is any suitable thermoplastic polymer waste or thermoplastic copolymer waste, for example, any suitable polystyrene waste or polystyrene copolymer waste. For example, the waste can be a post-industrial waste, a post-consumer waste or a combination thereof. For example, the waste can be post-industrial waste. For example, the waste can be post-consumer waste. For example, the waste can be a combination of post-industrial waste and post-consumer waste. For example, the waste can be polystyrene waste. For example, the waste can be a combination of polystyrene waste and polystyrene copolymer waste. For example, the waste can be polystyrene copolymer waste.

The polystyrene waste can be any suitable polystyrene waste. For example, the polystyrene waste can be expanded polystyrene waste, extruded polystyrene waste or a combination thereof. For example, the polystyrene waste can be expanded polystyrene waste. For example, the polystyrene waste can be extruded polystyrene waste. For example, the polystyrene waste can be a combination of expanded polystyrene waste and extruded polystyrene waste.

The polystyrene copolymer waste can be any suitable polystyrene waste. For example, the polystyrene copolymer waste can be high impact polystyrene (HIPS) waste, styrene-butadiene block copolymer waste (e.g. poly(styrene-butadiene-styrene) (SBS) triblock copolymer waste), styrene-butadiene random copolymer waste, Kraton™ waste or combinations thereof. For example, the Kraton™ waste can be a copolymer of styrene and a rubber block such as butadiene, isoprene or a hydrogenated equivalent thereof. For example, the polystyrene copolymer waste can be high impact polystyrene (HIPS) waste. For example, the polystyrene copolymer waste can be styrene-butadiene block copolymer waste. For example, the polystyrene copolymer waste can be styrene-butadiene random copolymer waste. For example, the polystyrene copolymer waste can be poly(styrene-butadiene-styrene) (SBS) triblock copolymer waste. For example, the polystyrene copolymer waste can be Kraton™ waste. For example, the polystyrene copolymer waste can be a combination of two, three or all four of high impact polystyrene (HIPS) waste, styrene-butadiene block copolymer waste (e.g. poly(styrene-butadiene-styrene) (SBS) triblock copolymer waste), styrene-butadiene random copolymer waste and Kraton™ waste. For example, the polystyrene copolymer waste can be a combination of two or more of high impact polystyrene (HIPS) waste, styrene-butadiene block copolymer waste (e.g. styrene-butadiene-styrene (SBS) triblock copolymer waste), styrene-butadiene random copolymer waste and Kraton™ waste. It will also be appreciated by a person skilled in the art that the amount of non-styrenic polymer in the polystyrene copolymer may, for example, have an influence on the solubility of the polystyrene copolymer and can adapt the processes accordingly. For example, the process can optionally be used to separate polystyrene copolymer with a low PBU content (e.g. about 2 wt. % to about 10 wt. %) that will precipitate upon addition of the polystyrene non-solvent, from polystyrene copolymer with a high PBU content (for example a Kraton copolymer composed of 30 wt. % PS and 70 wt. % of PBU) because the polystyrene copolymer with a high PBU content will remain in solution in the hydrocarbon waste solution. For example, polystyrene copolymers having a non-polystyrene content (e.g. a PBU content) of about 30 wt. % or more can be soluble in non-polar solvents and can, for example, remain in solution during the contacting (e.g. adding) and/or washing steps.

The dissolving is carried out at a temperature and for a time to at least substantially dissolve the thermoplastic polymer and/or thermoplastic copolymer such as polystyrene and/or polystyrene copolymer in a suitable solvent such as cymene, xylene, toluene, benzene, ethylbenzene or any combination thereof, e.g. in the case of the polystyrene and/or polystyrene copolymer. For example, the dissolving can be carried out at a temperature of from about 0° C. to about 100° C. in the case of polystyrene waste and/or polystyrene copolymer waste. For example, polystyrene waste may be dissolved at temperatures lower than that used for dissolving waste comprising polystyrene copolymer waste. For example, the dissolving can be carried out at a temperature of from about 20° C. to about 30° C. For example, waste comprising polystyrene copolymer waste may be dissolved at temperatures greater than that used for dissolving waste that does not comprise polystyrene copolymer waste. For example, the dissolving can be carried out at a temperature of from about 70° C. to about 90° C. For example, the dissolving can be carried out at a temperature of from about 80° C. to about 85° C. For example, the dissolving can be carried out at a temperature of about 80° C. For example, the dissolving can be carried out at a temperature of about 85° C.

For example, the mixture can comprise the polystyrene and/or polystyrene copolymer in an amount equal to or less than about 50 wt. %, based on the total weight of the mixture. For example, the mixture can comprise the polystyrene and/or polystyrene copolymer in an amount of from about 10 wt. % to about 50 wt. %, based on the total weight of the mixture. For example, the mixture can comprise the polystyrene and/or polystyrene copolymer in an amount of from about 20 wt. % to about 40 wt. %, based on the total weight of the mixture. For example, the mixture can comprise the polystyrene and/or polystyrene copolymer in an amount of from about 20 wt. % to about 30 wt. %, based on the total weight of the mixture. For example, the mixture can comprise the polystyrene and/or polystyrene copolymer in an amount of about 25 wt. %, based on the total weight of the mixture. For example, the mixture can comprise the polystyrene and/or polystyrene copolymer in an amount of from about 35 wt. % to about 45 wt. %, based on the total weight of the mixture. For example, the mixture can comprise the polystyrene and/or polystyrene copolymer in an amount of about 40 wt. %, based on the total weight of the mixture.

For example, the thermoplastic polymer waste and/or thermoplastic copolymer waste such as polystyrene waste and/or polystyrene copolymer waste can be dissolved in a suitable solvent. For example, a suitable solvent has a solubility parameter similar to that of the thermoplastic polymer waste and/or thermoplastic copolymer waste such as polystyrene waste and/or polystyrene copolymer waste. The skilled person would also appreciate that in a recycling process, a suitable solvent may also advantageously be environmentally friendly, non-toxic and safe to handle while having a high flash point, recyclable with high purity and high yield of recovery and/or allow for purification steps. For example, suitable solvents for polystyrene waste and/or polystyrene copolymer waste can be non-volatile esters, diesters or carbonates, cymene, xylene, toluene, benzene, ethylbenzene or any combination thereof. For example, a suitable solvent can be cymene, xylene, toluene, benzene, ethylbenzene or any combination thereof. For example, the polystyrene waste and/or polystyrene copolymer waste can be dissolved in cymene. For example, the polystyrene waste and/or polystyrene copolymer waste can be dissolved in xylene. For example, the polystyrene waste and/or polystyrene copolymer waste can be dissolved in ethylbenzene. For example, the polystyrene waste and/or polystyrene copolymer waste can be dissolved in toluene. For example, the polystyrene waste and/or polystyrene copolymer waste can be dissolved in benzene.

Insoluble impurities less than 10 microns in size, or less than 1 micron in size, can still be present in the mixture even after the optional filtration described above. Examples of solid particles smaller than 10 microns, or less than 1 micron, can include organic and inorganic pigments such as carbon black and titanium oxide and organic pigment particles used in colorants dispersions. In the processes of the present disclosure, these small particles can be transformed into large flocks easily removed using, for example, decantation, centrifugation or filtration techniques after the heating and cooling steps. While not wishing to be limited by theory, for example, small particles of divalent or trivalent metals can be used as nucleation solids initiating flock formation. While not wishing to be limited by theory, monovalent metal ions may also be used but are less efficient than divalent and trivalent metal ions in the flocculation.

Indeed, in some embodiments of the present disclosure, the larger particles, such as the particles such as the particles or impurities having a size of 1 micrometer or greater can be removed by filtration. In any cases, the impurities or particles having a size or diameter of less than 1 micrometer are removed by flocculation.

For example, the acidic conditions can comprise a pH of less than 5. For example, the acidic conditions can comprise a pH of from about 2 to about 5. For example, the acidic conditions can comprise a pH of from about 3.5 to about 4.5. For example, the acidic conditions can comprise a pH of about 4.

The acidic conditions can be obtained by adding any suitable acid to the mixture. For example, the acidic conditions can be obtained by adding a mineral acid, an organic acid or combinations thereof to the mixture. For example, the acidic conditions can be obtained by adding a mineral acid to the mixture. For example, the acidic conditions can be obtained by adding an organic acid to the mixture. For example, the acidic conditions can be obtained by adding a combination of a mineral acid and an organic acid to the mixture. For example, the mineral acid can be HCl or $H_2SO_4$. For example, the organic acid can be acetic acid, formic acid or oxalic acid. For example, the mineral acid can be HCl or $H_2SO_4$ and the organic acid can be acetic acid, formic acid or oxalic acid. For example, the mineral acid can be HCl. For example, the acidic conditions can be obtained by adding HCl to the mixture. For example, the HCl can be added to the mixture in the form of a solution in methanol.

For example, the mixture can be heated at a temperature of from about 60° C. to about 100° C. For example, the mixture can be heated at a temperature of from about 70° C. to about 90° C. For example, the mixture can be heated at a temperature of about 80° C.

For example, the mixture can be heated for a time of about 1 hour to about 4 hours. For example, the mixture can be heated for a time of about 2 hours.

For example, the mixture can be heated while agitating. The agitation can be carried out using any suitable means, the selection of which can be made by a person skilled in the art. For example, the agitating can comprise stirring.

For example, the reducing agent can be a metal that is capable of being oxidized to a divalent or trivalent cation. For example, the reducing agent can be zinc metal, aluminium metal, calcium metal or magnesium metal. For example, the reducing agent can be aluminium metal. For example, the reducing agent can be zinc metal. For example, the reducing agent can be added in the form of particles. For example, the particles can be in the form of a powder.

For example, the cooling can comprise allowing the mixture to return to ambient temperature and settle for a time to obtain the supernatant and the solid waste residue. For example, the ambient temperature can be from about 15° C. to about 25° C. For example, the ambient temperature can be about 20° C. For example, the time can be from about 2 hours to about 24 hours. For example, the time can be from about 6 hours to about 18 hours. For example, the time can be for about 12 hours.

The supernatant can be separated from the solid waste residue by any suitable means, the selection of which can be made by a person skilled in the art. For example, the supernatant can be separated from the solid waste residue by centrifugation. For example, the supernatant can be separated from the solid waste residue by decantation. For example, the supernatant can be separated from the solid waste residue by filtration. For example, the filtration can comprise the use a filter having, for example, a mesh or pore size that is finer than the filter used for the separation (e.g. filtration) of the insoluble material having a particle size of 10 micrometers or greater from the mixture; in some embodiments, the insoluble material has a particle size of 5 micrometers or greater, for example, a particle size of 1 micrometer or greater.

For example, the filtration can comprise:
    treating a filter paper with a solution comprising polyacrylic acid, methanol and water to obtain a modified filter paper; and
    filtering the supernatant through the modified filter paper.

After flocculation and filtration, for example, on modified filters the supernatant does not contain any significant solid or insoluble material and the polymer can optionally be recovered using precipitation with a hydrocarbon non-solvent like hexane or heptane. Alternatively, the supernatant can contain insoluble gels. For example, cross-linked or reticulated polystyrene copolymer is not soluble in aromatic solvents e.g. cymene, xylene, toluene, benzene, ethylbenzene or any combination thereof. For example, the insoluble gels can comprise cross-linked or reticulated polystyrene copolymer. Accordingly, in some examples, the process first comprises treating the supernatant with a filtration aid to remove such insoluble gels.

For example, the filtration aid can be calcium, magnesium or aluminium oxide, hydroxide, carbonate or sulfate. For example, the filtration aid can be a base. For example, the filtration aid (e.g. the base) can be added in solid form. For example, the filtration aid can be calcium hydroxide. For example, the base can be added to the supernatant until a pH of about 9 to about 10 is obtained.

For example, the treatment can comprise heating the supernatant with the filtration aid while agitating, followed by adding a hydrocarbon polystyrene non-solvent, ceasing the agitating, and allowing the mixture to return to ambient temperature and settle for a time to precipitate the insoluble gel from the supernatant. For example, the agitation can comprise stirring.

For example, the supernatant and the filtration aid can be heated at a temperature of from about 70° C. to about 100° C. For example, the supernatant and the filtration aid can be heated at a temperature of from about 80° C. to about 90° C. For example, the supernatant and the filtration aid can be heated at a temperature of about 85° C.

For example, the supernatant and the filtration aid can be heated for a time of about 30 minutes to about 4 hours. For example, the supernatant and the filtration aid can be heated for a time of about 1 hour to about 2 hours. For example, the supernatant and the filtration aid can be heated for a time of about 90 minutes.

For example, the mixture can be allowed to settle for a time of about 6 hours to about 24 hours. For example, the mixture can be allowed to settle for a time about 12 hours to about 16 hours.

For example, the hydrocarbon non-solvent, for example the hydrocarbon polystyrene non-solvent can be any suitable hydrocarbon non-solvent, for example, any suitable hydrocarbon polystyrene non-solvent. For example, the hydrocarbon polystyrene non-solvent can comprise, consist essentially of or consist of heptane or a mixture of heptane isomers.

The insoluble gel can be separated from the supernatant by any suitable means, the selection of which can be made by a person skilled in the art.

For example, the insoluble gel can be removed from the supernatant by a process comprising centrifugation. The conditions for centrifugation are any suitable conditions and can be selected by a person skilled in the art. For example, the centrifugation can be carried out for a time of about 1 minute to about 30 minutes or for about 10 minutes at a rate of from about 3,000 rpm to about 5,000 rpm or about 4,000 rpm.

For example, the insoluble gel can be removed from the supernatant by a process comprising filtration. For example, the filtration can comprise:
  treating a filter paper with a solution comprising polyacrylic acid, methanol and water to obtain a modified filter paper; and
  filtering the supernatant through the modified filter paper.

For example, the insoluble gel can be removed from the supernatant by a process comprising decantation.

For example, the supernatant can be added to the first portion of hydrocarbon polystyrene non-solvent at the boiling point of the hydrocarbon polystyrene non-solvent and agitated for a time for diffusion of the cymene, xylene toluene, benzene, ethylbenzene or any combination thereof, from the supernatant into the hydrocarbon polystyrene non-solvent to proceed to a sufficient extent. For example, the time can be from about 5 minutes to about 10 minutes. The agitating can comprise any suitable means, the selection of which can be made by a person skilled in the art. For example, the agitating can comprise stirring with a mechanical stirrer.

For example, greater than about 90 wt. % of the cymene, xylene, toluene, benzene, ethylbenzene or any combination thereof, in the supernatant can diffuse into the hydrocarbon polystyrene non-solvent, based on the total weight of the supernatant.

For example, the ratio by volume of the first portion of hydrocarbon polystyrene non-solvent to the supernatant can be from about 2:1 to about 4:1. For example, the ratio by volume of the first portion of hydrocarbon polystyrene non-solvent to the supernatant can be about 3:1.

The precipitated polystyrene and/or precipitated polystyrene copolymer can be separated from the first portion of hydrocarbon waste solution by any suitable means, the selection of which can be made by a person skilled in the art. For example, the precipitated polystyrene and/or precipitated polystyrene copolymer can be separated from the first portion of hydrocarbon waste solution by a process comprising decanting the first portion of hydrocarbon waste solution from the precipitated polystyrene and/or precipitated polystyrene copolymer.

For example, a second portion of hydrocarbon polystyrene non-solvent can be added to the precipitated polystyrene and/or the precipitated polystyrene copolymer at the boiling point of the hydrocarbon polystyrene non-solvent and agitated for a time for diffusion of the cymene, xylene, toluene, benzene, ethylbenzene or any combination thereof, from the precipitated polystyrene and/or precipitated polystyrene copolymer into the hydrocarbon polystyrene non-solvent to proceed to a sufficient extent. For example, the time can be from about 1 minute to about 15 minutes. For example, the time can be about 10 minutes. For example, the time can be from about 2 minutes to about 5 minutes. The agitating can comprise any suitable means, the selection of which can be made by a person skilled in the art. For example, the agitating can comprise stirring with a mechanical stirrer.

For example, the washed polystyrene and/or washed polystyrene copolymer can comprise less than about 0.3 wt. % cymene, xylene, toluene, benzene, ethylbenzene or any combination thereof. For example, the washed polystyrene and/or washed polystyrene copolymer can comprise less than about 0.1 wt. % cymene, xylene, toluene, benzene, ethylbenzene or any combination thereof.

For example, the ratio by volume of the second portion of hydrocarbon polystyrene non-solvent to the precipitated polystyrene and/or precipitated polystyrene copolymer can be from about 1:2 to about 2:1. For example, the ratio by volume of the second portion of hydrocarbon polystyrene non-solvent to the precipitated polystyrene and/or precipitated polystyrene copolymer can be about 1:1.

The washed polystyrene and/or washed polystyrene copolymer can be separated from the second portion of hydrocarbon waste solution by any suitable means, the selection of which can be made by a person skilled in the art. For example, the washed polystyrene and/or the washed polystyrene copolymer can be separated from the second portion of hydrocarbon waste solution by a process comprising decanting the second portion of hydrocarbon waste solution from the washed polystyrene and/or washed polystyrene copolymer.

For example, the washed polystyrene and/or washed polystyrene copolymer can be washed with a third portion of hydrocarbon polystyrene non-solvent and the third portion of hydrocarbon polystyrene non-solvent can be added to the washed polystyrene and/or washed polystyrene copolymer at the boiling point of the hydrocarbon polystyrene non-solvent and agitated for a time for diffusion of the cymene, xylene, toluene, benzene, ethylbenzene or any combination thereof, from the washed polystyrene and/or washed polystyrene copolymer into the hydrocarbon polystyrene non-solvent to proceed to a sufficient extent. For example, the time can be from about 1 minute to about 10 minutes. For example, the time can be about 5 minutes. The agitating can comprise any suitable means, the selection of which can be made by a person skilled in the art. For example, the agitating can comprise stirring with a mechanical stirrer.

For example, the twice-washed polystyrene and/or twice-washed polystyrene copolymer can comprise less than about 0.1 wt. % cymene, xylene, toluene, benzene, ethylbenzene or any combination thereof. For example, the twice-washed polystyrene and/or twice-washed polystyrene copolymer can comprise less than about 0.05 wt. % cymene, xylene, toluene, benzene, ethylbenzene or any combination thereof.

For example, the ratio by volume of the third portion of hydrocarbon polystyrene non-solvent to the washed polystyrene and/or washed polystyrene copolymer can be from about 1:2 to about 2:1. For example, the ratio by volume of the third portion of hydrocarbon polystyrene non-solvent to the washed polystyrene and/or washed polystyrene copolymer can be about 1:1.

The twice-washed polystyrene and/or twice-washed polystyrene copolymer can be separated from the third portion of hydrocarbon waste solution by any suitable means, the selection of which can be made by a person skilled in the art. For example, the twice-washed polystyrene and/or twice-washed polystyrene copolymer can be separated from the third portion of hydrocarbon waste solution by a process comprising decanting the third portion of hydrocarbon waste solution from the twice-washed polystyrene and/or twice-washed polystyrene copolymer.

For example, after separating the washed (or twice-washed) polystyrene and/or washed (or twice-washed) polystyrene copolymer from the second (or third, as the case may be) portion of hydrocarbon waste solution and prior to drying, the process can further comprise removing surplus hydrocarbon waste solution by wringing and/or compressing the washed (or twice-washed) polystyrene and/or washed (or twice-washed) polystyrene copolymer.

For example, at least one of the first portion of hydrocarbon polystyrene non-solvent, the second portion of hydrocarbon polystyrene non-solvent and the third portion of hydrocarbon polystyrene non-solvent can comprise, consist essentially of or consist of a hydrocarbon polystyrene non-solvent having a boiling point at 1 atm of pressure of from about 98° C. to about 110° C.

For example, at least one of the first portion of hydrocarbon polystyrene non-solvent, the second portion of hydrocarbon polystyrene non-solvent and the third portion of hydrocarbon polystyrene non-solvent can comprise, consist essentially of or consist of a hydrocarbon polystyrene non-solvent having a boiling point at 1 atm of pressure of from about 105° C. to about 110° C.

For example, the first portion of hydrocarbon polystyrene non-solvent, the second portion of hydrocarbon polystyrene non-solvent and the third portion of hydrocarbon polystyrene non-solvent can comprise, consist essentially of or consist of a $C_6$-$C_8$ alkane or a petroleum distillate.

For example, the first portion of hydrocarbon polystyrene non-solvent, the second portion of hydrocarbon polystyrene non-solvent and the third portion of hydrocarbon polystyrene non-solvent can comprise, consist essentially of or consist of a $C_6$-$C_8$ alkane.

For example, the first portion of hydrocarbon polystyrene non-solvent, the second portion of hydrocarbon polystyrene non-solvent and the third portion of hydrocarbon polystyrene non-solvent can comprise, consist essentially of or consist of a petroleum distillate.

For example, the first portion of hydrocarbon polystyrene non-solvent, the second portion of hydrocarbon polystyrene non-solvent and the third portion of hydrocarbon polystyrene non-solvent can comprise, consist essentially of or consist of heptane.

For example, the first portion of hydrocarbon polystyrene non-solvent, the second portion of hydrocarbon polystyrene non-solvent and the third portion of hydrocarbon polystyrene non-solvent can all be the same hydrocarbon polystyrene non-solvent.

For example, the first portion of hydrocarbon polystyrene non-solvent, the second portion of hydrocarbon polystyrene non-solvent and the third portion of hydrocarbon polystyrene non-solvent can all be different hydrocarbon polystyrene non-solvents.

For example, the second portion of hydrocarbon polystyrene non-solvent and the third portion of hydrocarbon polystyrene non-solvent can be the same hydrocarbon polystyrene non-solvent and the first portion of hydrocarbon polystyrene non-solvent can be a different hydrocarbon polystyrene non-solvent.

For example, the second portion of hydrocarbon polystyrene non-solvent and the third portion of hydrocarbon polystyrene non-solvent can comprise, consist essentially of or consist of heptane and the first portion of hydrocarbon polystyrene non-solvent can comprise, consist essentially of or consist of hexane.

For example, the washed or twice-washed polystyrene and/or washed or twice-washed polystyrene copolymer can be dried to obtain dried polystyrene and/or dried polystyrene copolymer.

The washed or twice-washed polystyrene and/or the washed or twice-washed polystyrene copolymer can be dried by any suitable means, the selection of which can be made by a person skilled in the art. For example, the washed or twice-washed polystyrene and/or the washed or twice-washed polystyrene copolymer can be dried for temperature and time for removal of remaining hydrocarbon polystyrene non-solvent to proceed to a sufficient extent. For example, the drying can be carried out at a temperature of from about 75° C. to about 125° C. For example, the drying can be carried out at a temperature of about 100° C. For example, the washed or twice-washed polystyrene and/or the washed or twice-washed polystyrene copolymer can be dried using an infrared dryer for a time for removal of remaining hydrocarbon polystyrene non-solvent to proceed to a sufficient extent. For example, the washed or twice-washed polystyrene and/or the washed or twice-washed polystyrene copolymer can be dried under vacuum for a time for removal of remaining hydrocarbon polystyrene non-solvent to proceed to a sufficient extent.

For example, the polystyrene waste and/or polystyrene copolymer waste can comprise polar impurities and/or polystyrene copolymer having a polystyrene content lower than about 70 wt. % and the process can further comprise washing the polystyrene waste and/or the polystyrene copolymer waste with a polar organic solvent to remove the polar impurities and/or the polystyrene copolymer having a polystyrene content lower than about 70 wt. %. For example, the polar organic solvent can comprise, consist essentially of or consist of methanol or ethanol. For example, the polar organic solvent can comprise, consist essentially of or consist of methanol. For example, the polar organic solvent can comprise, consist essentially of or consist of ethanol.

For example, the process can further comprise:
  contacting a first portion of polar organic solvent with the first portion of hydrocarbon waste solution to obtain a further portion of precipitated polystyrene copolymer and a fourth portion of hydrocarbon waste solution;
  separating the further portion of precipitated polystyrene copolymer from the fourth portion of hydrocarbon waste solution;
  washing the further portion of precipitated polystyrene copolymer with a second portion of polar organic solvent;
  optionally repeating the washing; and
  optionally drying the washed further portion of precipitated polystyrene copolymer to obtain a further portion of dried polystyrene copolymer.

For example, the first portion of polar organic solvent can be added to the first portion of hydrocarbon waste solution (i.e. the contacting comprises adding the first portion of polar organic solvent to the first portion of hydrocarbon waste solution).

For example, the portion of polar organic solvent and the second portion of polar organic solvent can comprise, consist essentially of or consist of an alcohol having one to five carbon atoms. For example, the alcohol having one to five carbon atoms can be methanol or ethanol. For example, the first portion of polar organic solvent and the second portion of polar organic solvent can comprise, consist essentially of or consist of methanol.

For example, when the waste comprises polystyrene copolymer waste, the further portion of precipitated polystyrene copolymer can comprise a higher ratio of non-polystyrene:polystyrene than the ratio of the non-polystyrene to the polystyrene of the polystyrene copolymer waste. For example, the non-polystyrene can comprise polybutadiene.

For example, the washing can be repeated.

For example, the washed further portion of polystyrene copolymer can be dried for temperature and time for removal of remaining hydrocarbon polystyrene non-solvent and polar organic solvent to proceed to a sufficient extent. The drying can be carried out by any suitable means, the selection of which can be made by a person skilled in the art. For example, the drying can be carried out at a temperature of from about 75° C. to about 125° C. For example, the drying can be carried out at a temperature of about 80° C. For example, the washed further portion of polystyrene copolymer can be dried using an infrared dryer for a time for removal of remaining hydrocarbon polystyrene non-solvent and polar organic solvent to proceed to a sufficient extent. For example, the washed further portion of polystyrene copolymer can be dried under vacuum for a time for removal of remaining hydrocarbon polystyrene non-solvent and polar organic solvent to proceed to a sufficient extent.

For example, the process can further comprise distilling the first portion of hydrocarbon waste solution, the second portion of hydrocarbon waste solution, the third portion of hydrocarbon waste solution and/or optionally the fourth portion of hydrocarbon waste solution under conditions to obtain cymene, xylene, toluene, benzene, ethylbenzene or any combination thereof and/or hydrocarbon polystyrene non-solvent.

For example, the process can further comprise recycling the cymene, xylene, toluene, benzene, ethylbenzene or any combination thereof, for use in the dissolving step. For example, the process can further comprise recycling the hydrocarbon polystyrene non-solvent for use in the contacting (e.g. adding step), the first washing step and/or the second washing step.

For example, the process can further comprise processing the dried polystyrene and/or dried polystyrene copolymer under conditions to obtain polystyrene pellets and/or polystyrene copolymer pellets. The conditions to obtain the polystyrene pellets and/or polystyrene copolymer pellets can be any suitable conditions, the selection of which can be made by the person skilled in the art. For example, the conditions to obtain the polystyrene pellets and/or polystyrene copolymer pellets can comprise extruding the dried polystyrene and/or dried polystyrene copolymer at a temperature of from about 140° C. to about 160° C.

For example, the process can further comprise packaging the polystyrene pellets and/or polystyrene copolymer pellets.

For example, the process can further comprise grinding the polystyrene waste and/or polystyrene copolymer waste prior to dissolving.

For example, in the processes of the present disclosure, the dissolving and heating can be carried out sequentially. For example, alternatively, dissolving and heating can be carried out simultaneously.

For example, the mixture can be obtained at a first location and the process can further comprise transporting the mixture to a second location wherein subsequent steps in the process are carried out.

For example, the polystyrene waste and/or polystyrene copolymer waste can be dissolved in the cymene, xylene, toluene, benzene, ethylbenzene or any combination thereof, in a container having a chamber containing the cymene, xylene or ethylbenzene and at least one opening to the chamber for adding the polystyrene waste and/or polystyrene copolymer waste to the cymene, xylene, toluene, benzene, ethylbenzene or any combination thereof, and the process can further comprise adding the polystyrene waste and/or polystyrene copolymer waste to the cymene, xylene, toluene, benzene, ethylbenzene or any combination thereof contained in the chamber. For example, the container can further comprise a vent. For example, the container can further comprise a means to impel the polystyrene waste and/or polystyrene copolymer waste into the cymene, xylene toluene, benzene, ethylbenzene or any combination thereof. For example, the means to impel can comprise a metallic grid inside the container. For example, the container can further comprise a means to indicate when the capacity of the chamber has been reached. For example, the means to indicate when capacity of the container has been reached can be an indicator light. For example, the indicator light can be connected to a float switch in the chamber.

For example, the contacting and washing (i.e. both the first and the optional second washing, if present) can be carried out at a temperature of about 80° C. to about 105° C. For example, the contacting and washing can be carried out at a temperature of about 85° C. to about 100° C. For example, the contacting and washing can be carried out at a temperature of about 80° C. to about 90° C. or about 85° C. For example, the hydrocarbon polystyrene non-solvent can be heptane and the contacting and washing (i.e. both the first and the optional second washing, if present) can be carried out at a temperature of about 80° C. to about 105° C., about 85° C. to about 100° C., about 80° C. to about 90° C. or about 85° C.

There is also provided recycled polystyrene and/or recycled polystyrene copolymer prepared according to a process for recycling polystyrene waste and/or polystyrene copolymer waste of the present disclosure.

For example, the recycled polystyrene and/or recycled polystyrene copolymer can have a melt flow index of less than about 30 g/10 min. For example, the recycled polystyrene can have a melt flow index of from about 3 to about 25 g/10 min. For example, the recycled polystyrene can have a melt flow index of from about 1 to about 15 g/10 min. For example, the recycled polystyrene can have a melt flow index of from about 10 to about 15 g/10 min. For example, the recycled polystyrene can have a melt flow index of from about 5 to about 12 g/10 min. For example, the recycled polystyrene can have a melt flow index of from about 2 to about 12 g/10 min. For example, the recycled polystyrene can have a melt flow index of less than about 15 g/10 min. For example, the recycled polystyrene can have a melt flow index of less than about 12 g/10 min.

For example, the recycled polystyrene and/or recycled polystyrene copolymer is having a transmittance ranging from 80 to 99%; the transmittance being measured in a UV-VIS spectrum at 600 nm at 20° C. on solution comprising the recycled polystyrene and/or recycled polystyrene copolymer diluted in cymene, wherein the content of recycled polystyrene and/or recycled polystyrene copolymer is 20 wt. % of the total weight of the solution, and wherein the reference solution for 100% of transmittance in a UV-VIS spectrum at 600 nm at 20° C. is a solution of virgin polystyrene homopolymer diluted in cymene, wherein the content of virgin polystyrene is 20 wt. % of the total weight of the reference solution; in some embodiments, the content of virgin polystyrene ranges from 85 to 99%; for example, the content of virgin polystyrene is ranging from 90 to 99%; from 95 to 99% and in some embodiments, the content of virgin polystyrene is ranging from 96 to 99% or 97 to 99%.

There is also provided a recycled polystyrene and/or recycled polystyrene copolymer having a total content of additive(s) of less than 0.5 wt. %

For example, the recycled polystyrene and/or recycled polystyrene copolymer can have a content of additive(s) of less than 0.1 wt. %. For example, the recycled polystyrene and/or recycled polystyrene copolymer can have a content of additive(s) of about 0.07 wt. %.

For example, the recycled polystyrene and/or recycled polystyrene copolymer can have been obtained by recycling a polystyrene waste and/or polystyrene copolymer waste by involving treatment with a solvent and a non-solvent.

For example, the recycled polystyrene and/or recycled polystyrene copolymer can have been obtained by recycling a polystyrene waste and/or polystyrene copolymer waste by involving treatment with a solvent that is cymene, xylene, toluene, benzene, ethylbenzene or any combination thereof, and a hydrocarbon polystyrene non-solvent that is $C_6$-$C_8$ alkane or a petroleum distillate.

For example, the recycled polystyrene and/or recycled polystyrene copolymer can have been obtained by recycling polystyrene waste and/or polystyrene copolymer waste by involving treatment with a solvent that is cymene, xylene, toluene, benzene, ethylbenzene or any combination thereof, and a hydrocarbon polystyrene non-solvent that is $C_6$-$C_8$ alkane or mixtures thereof.

For example, the recycled polystyrene and/or recycled polystyrene copolymer can have been obtained by recycling polystyrene waste and/or polystyrene copolymer waste by involving treatment with a solvent that is cymene, xylene, toluene, benzene, ethylbenzene or any combination thereof, and a hydrocarbon polystyrene non-solvent that is hexane.

For example, the recycled polystyrene and/or recycled polystyrene copolymer can have been obtained by recycling polystyrene waste and/or polystyrene copolymer waste by involving treatment with a solvent that is cymene, xylene, toluene, benzene, ethylbenzene or any combination thereof, and a hydrocarbon polystyrene non-solvent that is hexane.

For example, the recycled polystyrene and/or recycled polystyrene copolymer can have been obtained by recycling polystyrene waste and/or polystyrene copolymer waste by involving treatment with a solvent that is cymene, xylene, toluene, benzene, ethylbenzene or any combination thereof, and a hydrocarbon polystyrene non-solvent that is octane.

For example, the solvent can be cymene.
For example, the solvent can be xylene.
For example, the solvent can be toluene.
For example, the solvent can be benzene.
For example, the solvent can be ethylbenzene.
For example, the solvent can be the BTX fraction of petroleum wherein BTX is a mixture of benzene, toluene and xylene.
For example, the solvent can be the BTEX fraction of petroleum wherein BTX is a mixture of benzene, toluene, ethylbenzene and xylene For example, the recycled polystyrene and/or recycled polystyrene copolymer can be white, transparent or clear. For example, the recycled polystyrene and/or recycled polystyrene copolymer can be at least substantially transparent. For example, the recycled polystyrene and/or recycled polystyrene copolymer can be white.

For example, the recycled polystyrene and/or recycled polystyrene copolymer can have been obtained by:
dissolving polystyrene waste and/or polystyrene copolymer waste in cymene, xylene, toluene, benzene, ethylbenzene or any combination thereof, to obtain a mixture;
heating the mixture under acidic conditions optionally, in the presence of a reducing agent, then cooling the mixture to obtain a supernatant comprising dissolved polystyrene and/or dissolved polystyrene copolymer and a solid waste residue;
separating the supernatant comprising dissolved polystyrene and/or dissolved polystyrene copolymer from the solid waste residue;
optionally treating the supernatant comprising dissolved polystyrene and/or dissolved polystyrene copolymer with a filtration aid to remove insoluble gels;
contacting (e.g. adding) the supernatant comprising dissolved polystyrene and/or dissolved polystyrene copolymer to a first portion of hydrocarbon polystyrene non-solvent to obtain precipitated polystyrene and/or precipitated polystyrene copolymer and a first portion of hydrocarbon waste solution;
separating the precipitated polystyrene and/or precipitated polystyrene copolymer from the first portion of hydrocarbon waste solution;
washing the precipitated polystyrene and/or precipitated polystyrene copolymer with a second portion of hydrocarbon polystyrene non-solvent to obtain a washed polystyrene and/or washed polystyrene copolymer and a second portion of hydrocarbon waste solution;
separating the washed polystyrene and/or washed polystyrene copolymer from the second portion of hydrocarbon waste solution;
optionally washing the washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;
optionally separating the twice-washed polystyrene and/or twice-washed polystyrene copolymer from the third portion of hydrocarbon waste solution; and
optionally drying the washed or twice-washed polystyrene and/or the washed or twice-washed polystyrene copolymer to obtain dried polystyrene and/or dried polystyrene copolymer.

For example, the recycled polystyrene and/or recycled polystyrene copolymer can have been obtained by:
dissolving polystyrene waste and/or polystyrene copolymer waste in cymene, xylene, toluene, benzene, ethylbenzene or any combination thereof, to obtain a mixture;
heating the mixture under acidic conditions; optionally, the heating is performed in the presence of a reducing agent, adding a base and heating the mixture under neutral conditions then cooling the mixture to obtain a supernatant comprising dissolved polystyrene and/or dissolved polystyrene copolymer and a solid waste residue;
separating the supernatant comprising dissolved polystyrene and/or dissolved polystyrene copolymer from the solid waste residue;

optionally treating the supernatant comprising dissolved polystyrene and/or dissolved polystyrene copolymer with a filtration aid to remove insoluble gels;

contacting (e.g. adding) the supernatant comprising dissolved polystyrene and/or dissolved polystyrene copolymer to a first portion of hydrocarbon polystyrene non-solvent to obtain precipitated polystyrene and/or precipitated polystyrene copolymer and a first portion of hydrocarbon waste solution;

separating the precipitated polystyrene and/or precipitated polystyrene copolymer from the first portion of hydrocarbon waste solution;

washing the precipitated polystyrene and/or precipitated polystyrene copolymer with a second portion of hydrocarbon polystyrene non-solvent to obtain washed polystyrene and/or washed polystyrene copolymer and a second portion of hydrocarbon waste solution;

separating the washed polystyrene and/or washed polystyrene copolymer from the second portion of hydrocarbon waste solution;

optionally washing the washed polystyrene and/or washed polystyrene copolymer with a third portion of hydrocarbon polystyrene non-solvent to obtain twice-washed polystyrene and/or twice-washed polystyrene copolymer and a third portion of hydrocarbon waste solution;

optionally separating the twice-washed polystyrene and/or twice-washed polystyrene copolymer from the third portion of hydrocarbon waste solution; and optionally drying the washed or twice-washed polystyrene and/or washed or twice-washed polystyrene copolymer to obtain dried polystyrene copolymer.

There is also provided a use of the recycled polystyrenes and/or recycled polystyrene copolymers of the present disclosure for preparing a mixture comprising the recycled polystyrene and/or recycled polystyrene copolymer and a virgin polystyrene and/or a virgin polystyrene copolymer.

There is also provided a method of using the recycled polystyrenes and/or recycled polystyrene copolymers of the present disclosure, comprising mixing the recycled polystyrene and/or recycled polystyrene copolymer with a virgin polystyrene and/or a virgin polystyrene copolymer.

For example, the mixture can comprise at least about 10 wt. % of the recycled polystyrene and/or recycled polystyrene copolymer. For example, the mixture can comprise at least about 15 wt. % of the recycled polystyrene and/or recycled polystyrene copolymer. For example, the mixture can comprise at least about 20 wt. % of the recycled polystyrene and/or recycled polystyrene copolymer. For example, the mixture can comprise about 1 wt. % to about 50 wt. % of the recycled polystyrene and/or recycled polystyrene copolymer. For example, the mixture can comprise about 5 wt. % to about 50 wt. % of the recycled polystyrene and/or recycled polystyrene copolymer. For example, the mixture can comprise about 5 wt. % to about 30 wt. % of the recycled polystyrene and/or recycled polystyrene copolymer.

For example, the mixture can comprise the recycled polystyrene and/or recycled polystyrene copolymer and a virgin polystyrene. For example, the mixture can comprise the recycled polystyrene and/or recycled polystyrene copolymer and a virgin polystyrene copolymer. For example, the mixture can comprise the recycled polystyrene and/or recycled polystyrene copolymer, a virgin polystyrene and a virgin polystyrene copolymer.

EXAMPLES

Figure 3:
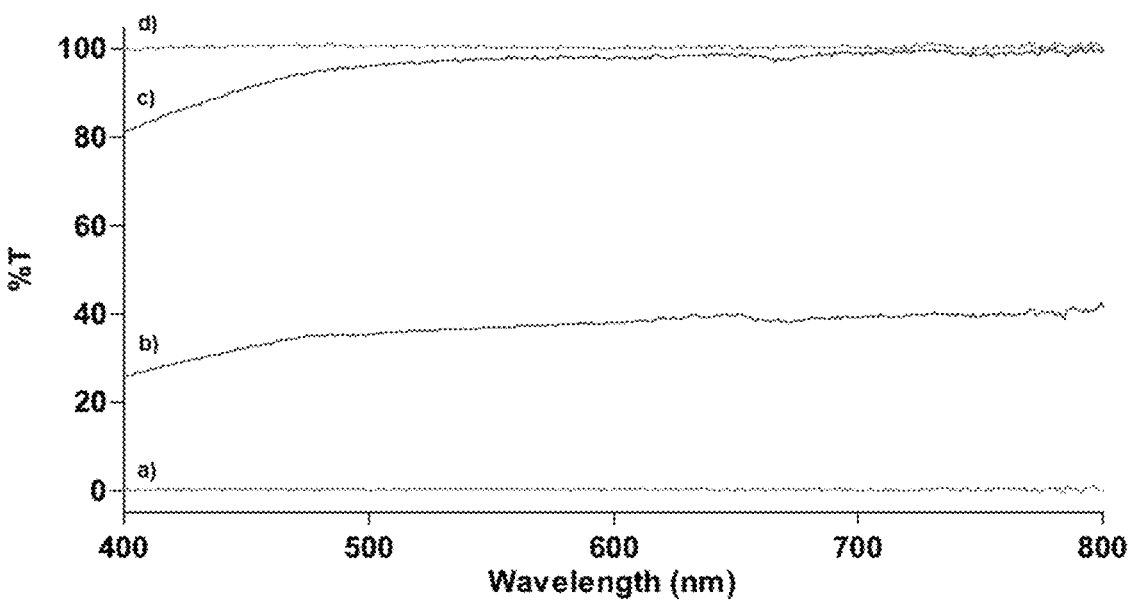
FIG. 3 shows UV-Visible spectra of filtered Post-consumer EPS using different purification techniques.

Example 1: Purification and Recycling of Post-Consumer Expanded Polystyrene (PC-EPS) Waste Realized without Using a Flocculation Step A solution of expanded polystyrene (EPS), with a polystyrene (PS) concentration of about 20 wt. %, was prepared by dissolving 40 g of post-consumer EPS in 160 g of p-cymene. A black homogeneous solution was obtained after heating with stirring one hour at 80 degrees C. The black PS solution was left standing, without stirring, one hour at room temperature to allow deposition of most solid particles. An attempt of taking a UV-VIS spectrum of this PC-EPS solution failed, since the entire light beam emitted from the spectrometer was absorbed by the small suspended solid particles, the transmittance for this solution at 600 nm is 0%, FIG. 3 curve a. Centrifugation, at 4000 rpm for 10 minutes, was used to remove most of the black fine solid particles dispersed in PS solution. FIG. 3 curve b, presents the visible absorption spectrum from 400 to 800 nm of the 20 wt. % PC-EPS solution after centrifugation, the transmittance at 600 nm is 39%. FIG. 3 curve d, presents the UV-VIS spectrum of pure PS 20 wt. % dissolved in p-cymene. Pure PS is transparent in the 400 to 800 nm region of the UV-VIS spectrum, the transmittance at 600 nm is 100%. The analysis were done at a temperature of 20° C. and under atmospheric pressure.

Example 2: Purification and Recycling of Post-Consumer Expanded Polystyrene Waste Realized with the Use of a Flocculation Step A solution of expanded polystyrene (EPS), with a polystyrene (PS) concentration of about 20 wt. %, was prepared by dissolving 4.1 g of post-consumer EPS in 16 g of p-cymene. The solution was filtered with a Whatman™ filter paper having a pore size of 11 microns, to remove solid impurities larger than 10 micrometers, like sticker and dust particles. Following the first filtration, the PS solution in p-cymene had a yellow-grey color and was not transparent indicating the presence of small solid particles in suspension. The small solid particles were transformed into large flocks easily removed using decantation, centrifugation or filtration techniques by the following flocculation method. The flocculation involved firstly, an acidification step of the PS cymene solution to a pH of 4 with 1.2 g of a diluted HCl solution (1 g of HCl 35% (w/w) in 9 g of methanol). Another mineral acid like sulfuric acid, or an organic acid like acetic or oxalic, or a mixture of mineral and organic acid in any proportion may also be used for the acidification step. Secondly, the PS solution was contacted with 1 g of zinc powder. Another reducing metal like aluminum, calcium or magnesium may also be used. The solution was heated to 65° C., with magnetic stirring, for 2 h under reducing conditions. The stirring was stopped and the solution was allowed to return to room temperature over a period of 6 hours. The flocculation resulted in the formation of a grey precipitate at the flask bottom and the PS cymene solution above the precipitate was almost colorless and transparent. FIG. 3 curve c, presents the UV-VIS spectrum of the PC-EPS 20 wt. % solution, it shows a very low absorption between 400 and 800 nm, with a transmittance of 97% at 600 nm at 20° C. and is very close to that of pure PS solution (FIG. 3 curve d). The polystyrene/p-cymene solution was added to heptane (although any other suitable hydrocarbon polystyrene non-solvent may be used) under conditions to obtain precipitated polystyrene and the precipitated polystyrene was washed with additional portions of heptane (although any other suitable hydrocarbon polystyrene non-solvent may be used) under conditions to obtain twice-washed polystyrene. The precipitation and the washing were carried out at a temperature of about 85° C. to about 100° C. The twice-washed polystyrene white paste was dried for 4 days at 100° C. Recycled PS, 4 g, was recovered as a crystal clear solid.

Example 3: Purification and Recycling of High Impact Polystyrene (HIPS) Wastes from Yoghurt Cups Post-consumer HIPS flakes from colored yoghurt cups (20 g) were dissolved at 80° C. in 50 g of p-cymene. The solution was filtered with a Whatman filter paper having a pore size of 11 microns, to remove solid impurities larger than 10 micrometers, like sticker and dust particles. Following the first filtration, the HIPS solution in p-cymene had a green color and was not transparent indicating the presence of small solid pigment particles and insoluble polymer gel in suspension. The small solid particles and polymeric gel were transformed into large flocks easily removed using decantation, centrifugation or filtration techniques by the following flocculation method. The HIPS solution was acidified to a pH of 4 as described in Example 1, 1 g of zinc powder was added and, the solution was heated with stirring for 2 h at 80° C. Another mineral acid like sulfuric acid, or an organic acid like acetic or oxalic, or a mixture of mineral and organic acid in any proportion may also be used for the acidification step and another reducing metal like aluminum, calcium or magnesium may also be used in place of the zinc. After standing for 12 h at 20° C., green flocks formed and separated at the flask bottom. A Whatman filter paper, with a pore size of 11 microns was wetted with a polyacrylic acid solution (1 g of PAA 35% in water plus 9 g of methanol). This modified filter paper was used to filter the HIPS solution and allowed the separation of a green solid from a pink transparent HIPS solution in p-cymene. The pink HIPS solution in p-cymene (50 ml) was then added to 150 ml of heptane. A white paste of HIPS precipitated at the bottom of the flask. The upper layer of solvents was removed by decantation and the precipitated high impact polystyrene was washed with additional portions of heptane (although any suitable hydrocarbon polystyrene non-solvent may be used for the precipitation and washing steps) under conditions to obtain twice-washed high impact polystyrene. The precipitation and the washing were carried out at a temperature of about 85° C. to about 100° C. The washing solvents were combined and methanol (30 ml) was added to the solution obtained after the precipitation of HIPS resulting in the formation of an additional white precipitate. This precipitate was washed twice with pure methanol and dried for 2 days at 80° C. This white solid 1.09 g was a PS-PBU copolymer with PBU content higher than that of the starting HIPS material according to NMR analysis (4% of PBU+ 96% of PS). The precipitated white HIPS paste was dried for 4 days at 100° C. Dry, recycled HIPS, 15 g, was recovered as a white solid. The $^1H$ and $^{13}C$ NMR analysis showed a content of 97.4% of styrene and 2.6% of PBU. The FTIR spectra of the white solid corresponds to that of isotactic PS. The x-ray fluorescence (XRF) spectroscopic results for the post-consumer HIPS flakes were the following in wt. %: C=91.3, H=7.67, O=0.39, Ti=0.55, Al=0.01, Ca=0.01, Na=traces, Cu=0.01, Fe=0.01, Zn=0.01, S=traces, Cl=traces, Si=traces. The x-ray fluorescence spectroscopic results of the purified HIPS were the following in wt. %: C=92.2, H=7.73, O=0.05, Ti=0.03, Al=traces, Ca=traces, Na=traces, Cu=traces, Fe=traces, Zn=traces, S=traces, Cl=traces, Si=0.03. These XRF results are indicative of an element purity of 99.93% for the recycled HIPS.

Example 4: Purification and Recycling of Post-Consumer PS and HIPS Pots

Post-consumer plastic pot flakes (40 g), obtained from Vogt and Eslava recycling companies, were dissolved in 160 g of p-xylene at 85° C. The solution was filtered using an Inox sieve with openings of 0.250 mm (60 meshes), to remove large impurities like sticker and dust particles. The weight of this first solid fraction removed was 5.95 g (different portions of the solid were analyzed and identified as containing PE, PP or PET using FTIR spectroscopy). Following the first filtration, the PS and HIPS solution in p-xylene had a green color and was not transparent indicating the presence of small solid pigment particles and insoluble polymer gel in suspension. The small solid particles and polymeric gel were transformed into large flocks easily removed using decantation, centrifugation or filtration techniques by the following method. The PS and HIPS solution was acidified to a pH of 4 as in Example 1, 1 g of zinc powder was added and, the solution was heated with stirring for 2 h at 80° C. Another mineral acid like sulfuric acid, or an organic acid like acetic or oxalic, or a mixture of mineral and organic acid in any proportion may also be used for the acidification step and another reducing metal like aluminum, calcium or magnesium may also be used in place of the zinc. After standing for 12 h at 20° C., green flocks formed and separated at the flask bottom. A Whatman filter paper, with a pore size of 11 microns was used to filter the PS and HIPS solution and allowed the separation of a green solid from a pink transparent PS and HIPS solution in p-xylene. The weight of this second solid fraction was 1.58 g. Calcium hydroxide (1 g) was then added to the PS and HIPS solution. The solution was stirred and heated at 85° C. for 90 minutes and heptane (68 g) was added slowly to the hot xylene solution. Stirring and heating were stopped and the solution was left to return to room temperature overnight. The calcium hydroxide and undissolved reticulated HIPS gel were removed using centrifugation (10 minutes at 4,000 rpm). The weight of this third solid fraction was 3.2 g (this solid was identified as atactic PS using FTIR spectroscopy). The light green PS and HIPS solution in p-xylene (228 g) was added to 240 g of heptane. A white paste of PS and HIPS precipitated at the bottom of the flask. The upper layer of solvents was removed by decantation and the precipitated PS and HIPS were washed with additional portions of heptane (2×100 g) (although any other suitable polystyrene non-solvent may be used) under conditions to obtain twice-washed PS and HIPS. The precipitation and the washing were carried out at a temperature of about 85° C. to about 100° C. A PS and HIPS white solid was obtained after vacuum drying (25.6 g). The white solid was identified as containing atactic polystyrene using FTIR spectroscopy. The PBU content was about 2.6%. This low concentration does not allow identification with FTIR as the bands relating to the about 97% PS content would mask those of the PBU.

Example 5: Purification and Recycling of Expanded Polystyrene Post-Consumer Waste A solution of expanded polystyrene (EPS), with a polystyrene (PS) concentration of about 20 wt. %, was prepared by dissolving 4.1 g of post-consumer EPS in 16 g of ethylbenzene. The solution was filtered with a Whatman filter paper having a pore size of 11 microns. The yellow-grey solution was acidified to a pH of 4 with 1.2 g of a diluted HCl solution (1 g of HCl 35% (w/w) in 9 g of methanol) and 1 g of zinc powder was added. The solution was heated to 65° C., with magnetic stirring, for 2 h. The stirring was stopped and the solution was allowed to return to room temperature. After 6 hours at 20° C., a grey precipitate formed at the flask bottom and the PS solution above was colorless and transparent. After PS precipitation with 50 ml of heptane and washing with heptane, the white PS paste was dried 4 days at 100° C. Recycled PS, 4 g, was recovered as a crystal clear solid.

Example 6: Purification and Recycling of Expanded Polystyrene Post-Consumer Waste A solution of expanded polystyrene (EPS), with a polystyrene (PS) concentration of about 20%, was prepared by dissolving 40 g of post-consumer EPS fish boxes in 160 g of ethylbenzene. Then, zinc (1 g) and formic acid (1 g, 96% in water) was added to dissolve the EPS under reducing conditions. The solution was heated at 85° C., with stirring, for 60 minutes and then calcium hydroxide was added to neutralize the formic acid, and stirring was continued for one hour at 85° C. The stirring was stopped and the solution was allowed to return to room temperature over a period of 6 hours. The flocculation resulted in the formation of a grey precipitate at the flask bottom and the PS solution above the precipitate was colorless and transparent. The solid was separated from the polystyrene/ethylbenzene solution using centrifugation (10 minutes at 4000 rpm) and then decantation. The solid residue (4.89 g), obtained at the bottom of centrifugation tubes was composed of zinc salts, calcium hydroxide, dirt and plastic pieces. The added zinc and calcium salts having a weight of 3.14 g were subtracted from the weight of solid residue giving a net weight of 1.75 g for all impurities combined in post-consumer fish boxes EPS. The polystyrene/ethylbenzene solution was added to 240 g of heptane (although any other suitable hydrocarbon polystyrene non-solvent may be used) under conditions to obtain precipitated polystyrene and the precipitated polystyrene was washed with additional portions of heptane (although any other suitable hydrocarbon polystyrene non-solvent may be used) under conditions to obtain twice-washed polystyrene. The precipitation and washing of polystyrene in heptane were carried out at 85° C. The twice-washed polystyrene white paste was dried under vacuum for 4 hours at 100° C. Recycled PS, 33.88 g, was recovered as a crystal clear solid.

Example 7: Purification and Recycling of Post-Consumer Polystyrene and High Impact Polystyrene (HIPS) Waste Post-consumer shredded polystyrene plastic pots (40 g), obtained from Vogt and Eslava recycling companies, were dissolved in 160 g of ethylbenzene in one hour at 85° C. with stirring in the presence of zinc and formic acid as in Example 5. After PS dissolution, calcium hydroxide (1 g) was added to neutralize formic acid and the stirring was continued one hour at 85° C. The stirring was stopped and the solution was allowed to return to room temperature over a period of 6 hours. The flocculation resulted in the formation of a grey precipitate at the flask bottom and the PS solution had a brown color and was not transparent. The solution was poured into centrifugation tubes and the grey precipitate was washed twice with heptane (2×10 ml). The solid residue was dried for 4 h at 100° C. under vacuum; the weight of this first solid was 5.27 g. Centrifugation of the solution resulted in the formation of compacted solid residue at the tube bottom and an almost transparent solution above the solid. Decantation allowed separation of the liquid phase from the solid residue. The solid residue at the tube bottom was suspended in 5 ml of heptane followed by a second centrifugation. The washing solutions were combined and added to the PS solution in ethylbenzene. The solid residue, obtained after centrifugation, was dried for 4 h at 100° C. under vacuum; the weight of this centrifugation solid was 10.65 g. The polystyrene/ethylbenzene solution was added to 240 g of heptane (although any other suitable hydrocarbon polystyrene non-solvent may be used) under conditions to obtain precipitated polystyrene and the precipitated polystyrene was washed twice with additional portions (100 ml) of heptane (although any other suitable hydrocarbon polystyrene non-solvent may be used) under conditions to obtain twice-washed polystyrene. The precipitation and washing of polystyrene in heptane were carried out at 85° C. The twice-washed polystyrene white paste was dried under vacuum for 4 hours at 100° C. Recycled PS, 20.82 g, was recovered as a white solid.

Example 8: Purification and Recycling of Post-Consumer Polystyrene and High Impact Polystyrene (HIPS) Waste in a Mix of Plastics Waste Post-consumer non-shredded plastics waste mix with polystyrene plastic pots (40 g), obtained from Veolia recycling company, was dissolved in 160 g of ethylbenzene over one hour at 85° C. with stirring in the presence of zinc and formic acid as in Example 5. After PS dissolution, calcium hydroxide (1 g) was added to neutralize formic acid and the stirring was continued one hour at 85° C. The stirring was stopped and the solution was allowed to return to room temperature over a period of 6 hours. Due to the presence of a significant amount of insoluble plastic, a coarse filtration was used to separate the insoluble plastics from the polystyrene/ethylbenzene solution and was washed with ethylbenzene (20 g) and the washing solution was added to the polystyrene/ethylbenzene solution (although this filtration step is optional). The flocculation resulted in the formation of a grey precipitate at the flask bottom and the PS solution had a green color and was not transparent. The solution was poured in centrifugation tubes and the grey precipitate with all the insoluble plastics was washed twice with heptane (2×25 ml). The solid residue and the insoluble plastics were dried 4 h at 100° C. under vacuum; the weight of this first solid was 6.95 g. Centrifugation of the solution resulted in formation of compacted solid residue at the tube bottom and an almost transparent solution above the solid. Decantation allowed separation of the liquid phase from the solid residue. The solid residue at the tube bottom was suspended in 5 ml of heptane followed by a second centrifugation. The washing solutions were combined and added to the PS solution in ethylbenzene. The solid residue, obtained after centrifugation, was dried for 4 h at 100° C. under vacuum; the weight of this centrifugation solid was 8.17 g. The polystyrene/ethyl benzene solution was added to 240 g of heptane (although any other suitable hydrocarbon polystyrene non-solvent may be used) under conditions to obtain precipitated polystyrene and the precipitated polystyrene was washed twice with additional portions (100 ml) of heptane (although any other suitable hydrocarbon polystyrene non-solvent may be used) under conditions to obtain twice-washed polystyrene. The precipitation and washing of polystyrene in heptane were carried out at 85° C. The twice-washed polystyrene white paste was dried under vacuum for 4 hours at 100° C. Recycled PS, 24.58 g, was recovered as a white solid.

Example 9: Purification and Recycling of Post-Consumer Acrylonitrile-Butadiene-Styrene Copolymer (ABS)

Figure 4:
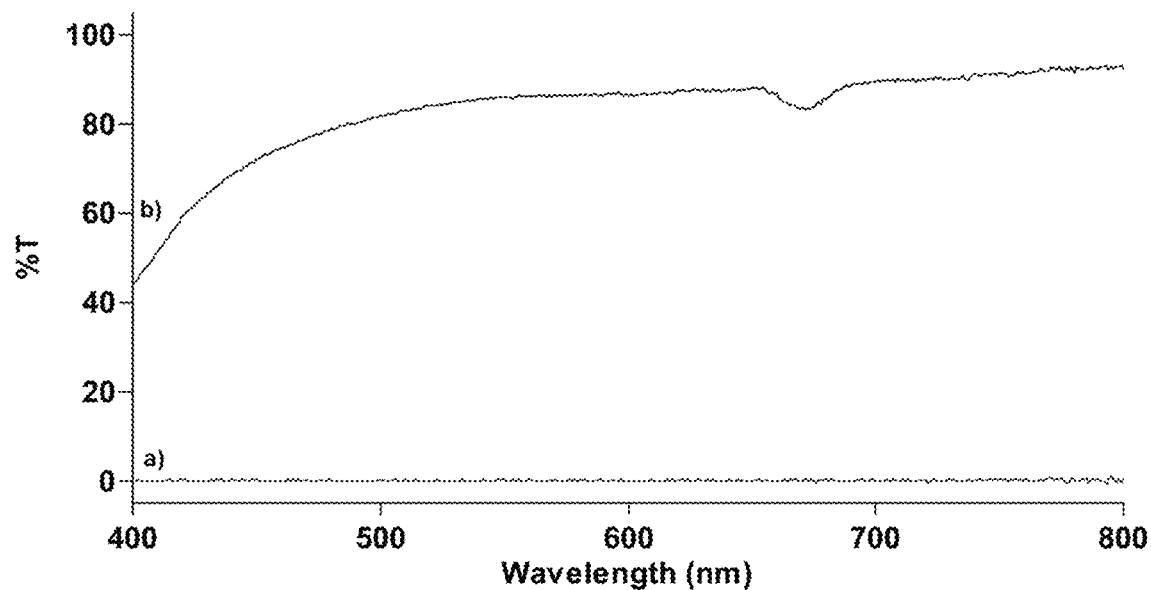
FIG. 4 shows UV-VIS spectra of filtered post-consumer ABS 20 wt % solution after different purification techniques.

A solution of post-consumer acrylonitrile-butadiene-styrene copolymer (ABS, used BIC hand razor), having an ABS concentration of about 20 wt. %, was prepared by dissolving 30.9 g of post-consumer ABS in 124 g of 1,2-dichloroethane, with stirring at 80 C for 2 hours. The solution was filtered with a Whatman™ filter paper having a pore size of 11 microns, to remove solid impurities larger than 11 micrometers. Following the filtration, the ABS solution in 1,2-dichloroethane (DCE) had a blue color and was not transparent indicating the presence of small solid particles in suspension. FIG. 4 curve a presents the UV-VIS spectrum of this filtered ABS blue solution, the transmittance at 600 nm is 0%. The small solid particles were transformed into large flocks easily removed by centrifugation using the following flocculation method. Formic acid (96%, 2 g) and zinc powder (1 g) were added to the ABS solution and stirred at 80° C. for 2 hours. The stirring was stopped and the solution was allowed to return to room temperature over a period of 6 hours. The flocculation resulted in the formation of a blue precipitate at the flask bottom and the ABS solution in DCE was centrifuged 10 minutes at 4000 rpm. The supernatant solution was separated from the blue solid particles using decantation. FIG. 4 curve b presents the UV-VIS spectrum of this flocculated and centrifuged ABS solution, the transmittance at 600 nm is 88%.

The ABS solution in 1,2-dichloroethane was added to 200 g of methanol at 60 degrees C. to obtain precipitated polystyrene and the precipitated ABS polystyrene copolymer was washed with two additional portions (100 g) of methanol (although any other suitable alcohol polystyrene copolymer non-solvent may be used) under conditions to obtain twice-washed ABS polystyrene copolymer. The precipitation and the washing were carried out at a temperature of about 80° C. The twice-washed white ABS paste with light blue colour was dried for 4 hours under vacuum at 120° C. Recycled PC-ABS, 27.67 g corresponding to a recovery yield of 89.5 wt. %, was recovered as a light blue white solid.

Example 10: Purification and Recycling of LDPE from Post-Consumer Waste

Figure 5:
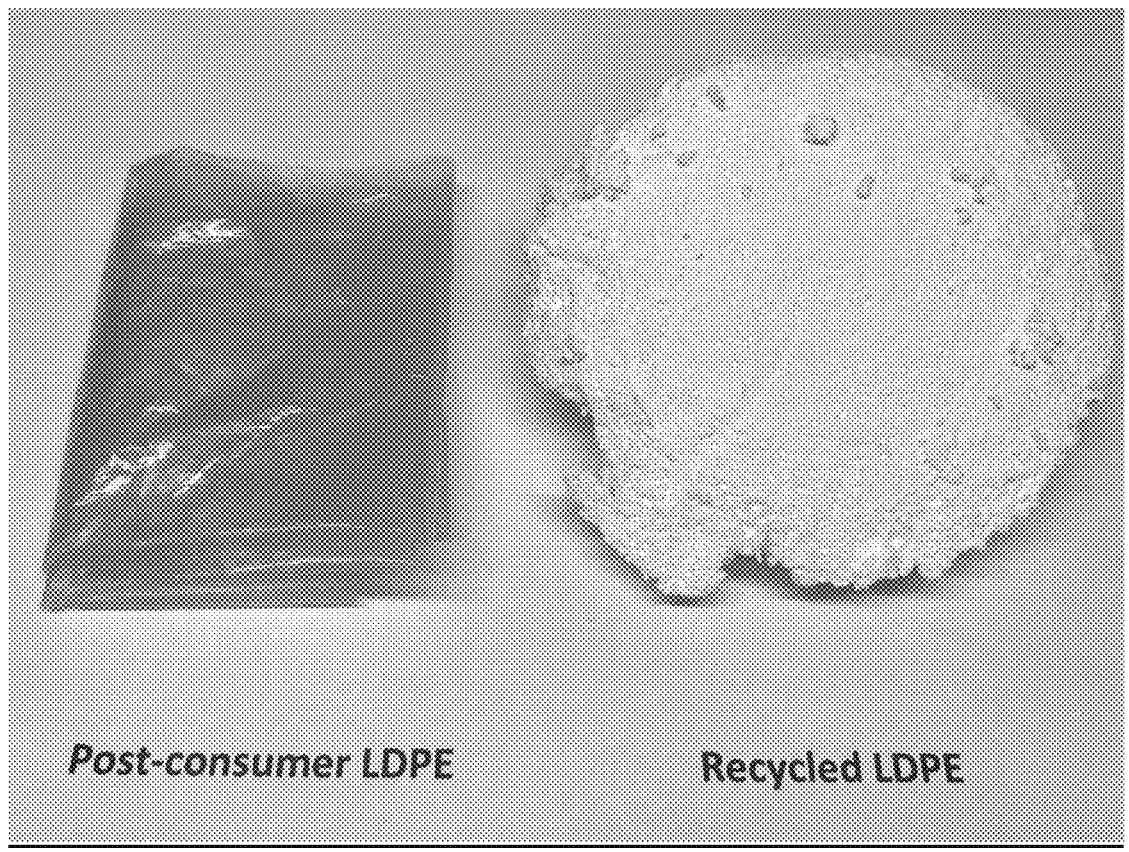
FIG. 5 shows photos of post-consumer LDPE before and after recycling as described in Example 10.

A solution of low density polyethylene (LDPE), with a polyethylene (PE) concentration of about 5 wt. %, was prepared by dissolving 10.4 g of post-consumer LDPE in 190 g of ethylbenzene. The solution was heated with stirring at 130° C. for 1 h to complete dissolution of LDPE. Magnesium metal (0.5 g) was added to the yellow grey LDPE solution and five drops of 50% formic acid were added for acidification purpose. The stirring was stopped and the solution was left one hour at 130° C. A grey precipitate formed at the flask bottom and the LDPE solution was slowly added to 200 ml of stirred hot methanol. The precipitated LDPE was washed twice with 100 ml of hot methanol. The white LDPE paste was dried 4 hours at 100° C. under vacuum. Recycled LDPE, 9.9 g yield of 95%, was recovered as a white solid. FIG. 5 presents photos of the post-consumer LDPE used for this experiment and that of the white LDPE recycled solid recovered.

Example 11 Characterization of the Recycled Polystyrene and/or the Recycled Polystyrene Copolymer Obtained According to the Inventive Process Materials.

Toluene (99.9%), ethyl-benzene (99%), p-xylene (99%), p-cymene (99%), heptane (HPLC grade, 99%), 1,2-dichloro ethane (99%), tetrahydrofuran (99%), zinc powder (98%), formic acid (96%), acetic acid (99%), oxalic acid (99%), methanol (99%) and pure polystyrene (Mw of 350,000) were bought from Aldrich. Pure PS (20 g) was dissolved in 80 g of p-cymene. UV-VIS spectra were taken in 1 cm path quartz cell.

Post-consumer EPS solution were obtained by dissolving 20 g of post-consumer EPS fish boxes or EPS fruit boxes in 80 g of pure solvent. Post-consumer plastic pot flakes were obtained from Vogt and Eslava recycling companies. Post-consumer HIPS from yogurt pots were sorted out manually from bags of mixed plastics pots send for recycling. Post-consumer ABS was obtained from used blue BIC hand razor. Post-consumer LDPE was obtained from used LDPE film.

Techniques.

UV-VIS spectra were recorded using an Agilent Cary 60 spectrophotometer.

FTIR measurements were carried out using a Nicolet iS10 FT-IR spectrophotometer from Thermo Fisher Scientific. Centrifugations were carried using a BKC-TL41V centrifuge from Biobase Biodustry (Shandong) Co LTD.

NMR, XRF, ICP, GC, GPC and hydrogen and carbon chemical analysis were performed by Total Research & Technology analytical laboratory at Feluy.

Results

Figure 2:
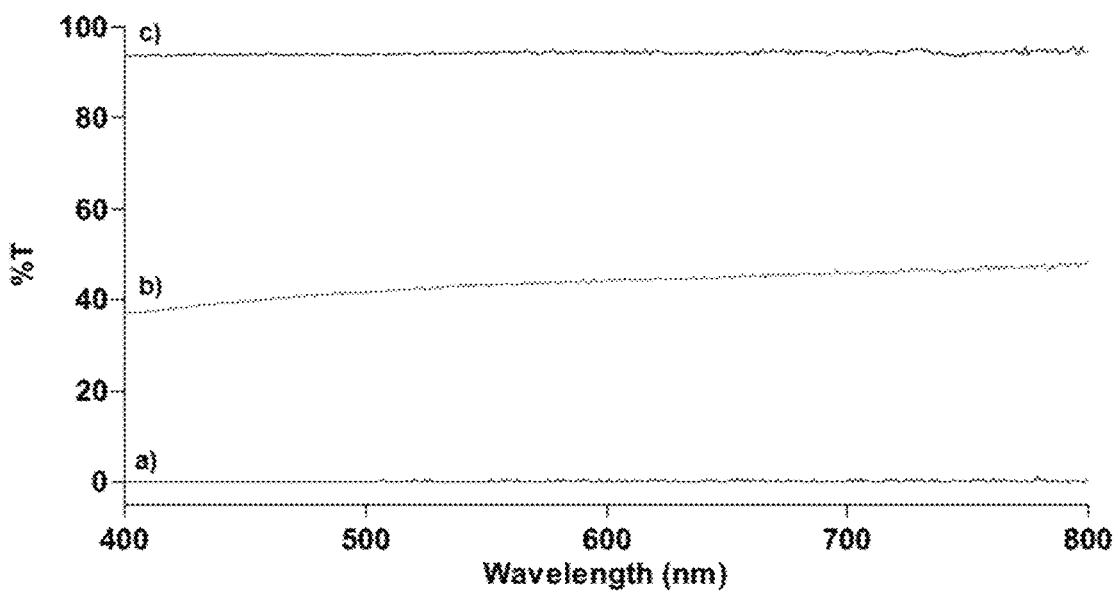
FIG. 2 shows UV-Visible Spectra of filtered of Post-consumer EPS at different concentrations of PS

FIG. 2 is given as reference and is presenting UV-Visible Spectra of filtered of Post-consumer EPS, with a filter having pore size of 3 microns, at different concentrations. Typically, PC-EPS solutions are contaminated with about 0.1 wt. % of small suspended solid particles having a diameter of less than one micron in size, wherein:

Curve a); Solution of PC-EPS in cymene, 20 wt. %. Transmittance at 600 nm at 20° C. is 0% due to light scattering by suspended solid particles.

Curve b); Solution of curve "a" diluted by a factor 10, with 90% of solid particles removed and a PS concentration reduced to 2%, (Transmittance at 600 nm at 20° C.=44%).

Curve c); Solution of curve "a" diluted by a factor 100, with 99% of solid particles removed and a PS concentration reduced to 0, 2% (Transmittance at 600 nm at 20° C.=94%).

The filtration was performed with a filter with a pore size of 3 micrometer. As it is shown by the analysis of FIG. 2, the transmittance is a function on the solid impurities, with a size smaller than 3 micrometers, dispersed in the solution containing PC-EPS. In curve a) the content of solid impurities remaining in the filtered solution of 20 wt. % PC-EPS is too high to allow the light to be transmitted. The dilution of the solution reduces the content of suspended solid impurities and therefore allows the light to be transmitted.

FIG. 3 is presenting UV-Visible spectra of filtered Post-consumer EPS 20 wt. % solution, after using different purification techniques; wherein:

Curve a); Filtered solution of PC-EPS in cymene, 20 wt. %. Transmittance at 600 nm at 20° C. is 0% due to light scattering by suspended solid particles (same solution as curve a in FIG. 2).

Curve b); Solution of curve "a" centrifugated 10 minutes at 4000 RPM. Transmittance at 600 nm at 20° C. is 38%.

Curve c); Solution of curve "a" after performing the inventive process i.e. flocculation and centrifugation given in example 2 (10 minutes at 4000 RPM). Transmittance at 600 nm at 20° C. is 97%.

Curve d); Solution of virgin PS in cymene, 20 wt. %. Used as a reference.

FIG. 4 is presenting UV-Visible spectra of filtered Post-consumer ABS 20 wt. % solution, after using different purification techniques; wherein:

Curve a); Filtered solution of PC-ABS in 1,2-dichloro ethane, 20 wt. %. Transmittance at 600 nm at 20° C. is 0% due to light scattering by suspended solid particles.

Curve b); Solution of curve "a" flocculated and centrifugated 10 minutes at 4000 RPM. Transmittance at 600 nm at 20° C. is 88%.

FIG. 5 is presenting photos of Post-consumer LDPE before and after recycling as described in Example 10.

From the transmittance data it can be seen that the inventive process allows the removal of more than 99% of impurities (i.e. solid particles). This is a considerable and surprising improvement by comparison to the prior art techniques illustrated in curve b). The invention allows to produce a recycled polystyrene and/or recycled polystyrene copolymer with a higher degree of purity which brings it close to virgin polystyrene and/or polystyrene copolymer.

While the present disclosure has been described with reference to what are presently considered to be the preferred examples, it is to be understood that the disclosure is not limited to the disclosed examples. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

The invention claimed is:

1. A method of use of a reducing agent, said method comprising:
contacting a thermoplastic polymer waste and/or a thermoplastic copolymer waste with said reducing agent for recycling said thermoplastic polymer waste and/or said thermoplastic copolymer waste, wherein said reducing agent is a metal that is capable of being oxidized to a divalent or trivalent cation, and wherein said thermoplastic is selected from polyethylene (PE), polypropylene (PP), polyvinyl chloride (PVC), acrylonitrile butadiene styrene copolymer (ABS), acrylonitrile-styrene copolymer (SAN), polystyrene (PS) and blends of polyethylene (PE) and polypropylene (PP).

2. The method of claim 1, wherein said reducing agent is zinc metal, aluminium metal, calcium metal or magnesium metal.

3. The method of claim 1, wherein said reducing agent is zinc metal.

4. The method of claim 1, wherein said reducing agent is aluminium metal.

5. The method of claim 1, wherein said reducing agent is calcium metal.

6. The method of claim 1, wherein said reducing agent is or magnesium metal.

7. The method of claim 1, wherein said reducing agent is in the form of particles.

8. The method of claim 1, wherein said reducing agent is in the form of a powder.

9. The method of claim 1, wherein said reducing agent is used under acidic conditions.

10. The method of claim 1, wherein said reducing agent is used under basic conditions.

11. The method of claim 1, wherein said reducing agent is used together with a base.

12. The method of claim 11, wherein said base is calcium hydroxide.

13. The method of claim 1, wherein the waste is post-consumer polystyrene waste that is polystyrene waste and/or polystyrene copolymer waste obtained from industrial or domestic polymer waste process.

14. The method of claim 1, wherein the waste is polystyrene copolymer waste.

15. The method of claim 1, wherein the waste is expanded polystyrene waste, extruded polystyrene waste or a combination thereof.

16. The method of claim 1, wherein the waste is polystyrene copolymer waste is high impact polystyrene (HIPS) waste, styrene-butadiene block copolymer waste, styrene-butadiene random copolymer waste, a waste comprising a copolymer of styrene and a rubber block, or combinations thereof.

17. The method of claim 16, wherein the polystyrene copolymer waste is high impact polystyrene (HIPS) waste.

18. The method of claim 16, wherein the polystyrene copolymer waste is styrene-butadiene block copolymer waste, optionally styrene-butadiene-styrene (SBS) triblock copolymer waste.

19. The method of claim 16, wherein the polystyrene copolymer waste is the waste comprising the copolymer of styrene and the rubber block, optionally the rubber block comprises polybutadiene, polyisoprene, hydrogenated polybutadiene, or hydrogenated polyisoprene.

20. The method of claim 16, wherein the polystyrene copolymer waste is a combination of two, three or all four of high impact polystyrene (HIPS) waste, styrene-butadiene block copolymer waste, styrene-butadiene random copolymer waste and the waste comprising the copolymer of styrene and the rubber block.

21. The method of claim 1, wherein the thermoplastic is selected from polyethylene (PE) and polypropylene (PP).

22. The method of claim 1, wherein the waste is acrylonitrile butadiene styrene copolymer (ABS) waste or acrylonitrile-styrene copolymer (SAN) waste.

23. The method of claim 1, wherein the waste is polyvinyl chloride (PVC) waste and is selected from polyvinyl chloride homopolymer waste and/or polyvinyl chloride copolymer waste.

24. The method of claim 1, wherein the waste is polyvinyl chloride (PVC) waste and is selected from polyvinyl chloride homopolymer waste and polyvinyl chloride copolymer waste.

25. The method of claim 23, wherein the waste is postindustrial or post-consumer polyvinyl chloride homopolymer waste and/or polyvinyl chloride copolymer waste that is polyvinyl chloride homopolymer waste and/or polyvinyl chloride copolymer waste obtained from industrial or domestic polymer waste.

\* \* \* \* \*